United States Patent
Hassan

(10) Patent No.: US 11,659,041 B2
(45) Date of Patent: May 23, 2023

(54) SYSTEMS AND METHODS FOR REMOTE PRESENCE

(71) Applicant: Blue Ocean Robotics ApS, Odense (DK)

(72) Inventor: Scott W. Hassan, Menlo Park, CA (US)

(73) Assignee: Blue Ocean Robotics ApS, Odense (DK)

( * ) Notice: Subject to any disclaimer, the term of this patent is extended or adjusted under 35 U.S.C. 154(b) by 0 days.

(21) Appl. No.: 16/212,395

(22) Filed: Dec. 6, 2018

(65) Prior Publication Data

US 2019/0116228 A1 Apr. 18, 2019

Related U.S. Application Data

(63) Continuation of application No. 15/850,679, filed on Dec. 21, 2017, now abandoned, which is a
(Continued)

(51) Int. Cl.
*H04L 67/125* (2022.01)
*H04L 65/1083* (2022.01)
(Continued)

(52) U.S. Cl.
CPC ......... *H04L 67/125* (2013.01); *G05D 1/0038* (2013.01); *H04L 65/1083* (2013.01); *H04L 67/104* (2013.01); *G05D 2201/0211* (2013.01)

(58) Field of Classification Search
CPC . H04L 41/046; H04L 12/403; H04L 12/2803; H04L 12/423; H04L 65/00;
(Continued)

(56) References Cited

U.S. PATENT DOCUMENTS 5,448,569 A 9/1995 Huang et al.
5,465,083 A * 11/1995 Okamoto ................ G06F 21/83
340/5.54

(Continued)

FOREIGN PATENT DOCUMENTS

EP 1175034 A2 1/2002

OTHER PUBLICATIONS

"Less-Skilled Pilot Decision Support", Rohacs et al. , Aircraft Engineering and Aerospace Technology, vol. 91 · No. 5 · 2019 · pp. 790-802.*
(Continued)

*Primary Examiner* — Michael Won
(74) *Attorney, Agent, or Firm* — Donald Lecher; Butzel Long

(57) ABSTRACT

Remote presence systems and methods are presented. In one embodiment, a system may comprise a pilot workstation comprising a pilot computing station having a display, a microphone, a camera oriented to capture images of the pilot, a network connectivity subsystem, and a master input device such as a keyboard, mouse, or joystick. The pilot network connectivity subsystem may be operatively coupled to an electromechanically mobile workstation comprising a mobile base interconnected to a head component. The mobile workstation may comprise a display, a microphone, a camera oriented to capture images of nearby people and structures, and a workstation network connectivity subsystem that preferably is operatively coupled to the pilot network connectivity subsystem. Preferably by virtue of the system components, the pilot is able to remotely project a virtual presence of himself in the form of images, sound, and motion of the mobile workstation at the location of the mobile workstation.

2 Claims, 55 Drawing Sheets

Related U.S. Application Data continuation of application No. 15/391,597, filed on Dec. 27, 2016, now abandoned, which is a continuation of application No. 15/006,036, filed on Jan. 25, 2016, now abandoned, which is a continuation of application No. 14/035,223, filed on Sep. 24, 2013, now abandoned.

(60) Provisional application No. 61/705,625, filed on Sep. 25, 2012, provisional application No. 61/744,378, filed on Sep. 24, 2012.

(51) Int. Cl.
*H04L 67/104* (2022.01)
*G05D 1/00* (2006.01)

(58) Field of Classification Search
CPC ... H04L 67/00; H04L 65/1083; H04L 67/125; H04L 67/104; G05D 1/0038; G05D 2201/0211
USPC .................................. 708/223, 208
See application file for complete search history.

(56) References Cited

U.S. PATENT DOCUMENTS

| | | | |
|---|---|---|---|
| 5,654,959 A | | 8/1997 | Baker et al. |
| 5,986,644 A * | | 11/1999 | Herder ............... G06F 3/03543 273/148 B |
| 6,270,040 B1 * | | 8/2001 | Katzer ................. A63H 19/24 201/19 |
| 6,273,771 B1 * | | 8/2001 | Buckley ............. B63H 21/213 114/144 RE |
| 6,292,660 B1 | | 9/2001 | Hartless et al. |
| 6,604,075 B1 * | | 8/2003 | Brown ................ H04M 3/4938 704/270.1 |
| 6,768,721 B1 | | 7/2004 | Schmitz et al. |
| 7,031,726 B2 | | 4/2006 | Cheng |
| 7,123,917 B2 | | 10/2006 | Kalhan et al. |
| 7,408,899 B1 | | 8/2008 | Latvakoski |
| 7,643,051 B2 * | | 1/2010 | Sandberg ............... H04N 7/142 348/14.02 |
| 7,720,572 B2 * | | 5/2010 | Ziegler ................. B25J 5/007 713/153 |
| 7,768,959 B1 | | 8/2010 | Chen et al. |
| 7,873,377 B1 | | 1/2011 | Cocos |
| 8,045,996 B2 | | 10/2011 | Brunner et al. |
| 8,078,207 B2 | | 12/2011 | Burns et al. |
| 8,204,029 B2 | | 6/2012 | Stephenson et al. |
| 8,233,452 B2 | | 7/2012 | Makhijani et al. |
| 8,233,453 B2 | | 7/2012 | Ohta |
| 8,238,268 B1 | | 8/2012 | Shmidt |
| 8,265,793 B2 * | | 9/2012 | Cross ..................... H04W 4/70 700/259 |
| 8,270,369 B1 | | 9/2012 | Chang |
| 8,737,351 B2 | | 5/2014 | Forte et al. |
| 8,751,043 B2 | | 6/2014 | Guo et al. |
| 8,774,982 B2 * | | 7/2014 | Oakley .................. B64C 27/08 701/2 |
| 8,843,244 B2 * | | 9/2014 | Phillips ............... G05D 1/0094 701/2 |
| 8,848,608 B1 | | 9/2014 | Addepalli et al. |
| 8,964,550 B1 | | 2/2015 | Chhabra |
| 9,195,256 B2 * | | 11/2015 | Robbins ................... G05G 1/01 |
| 9,344,935 B2 | | 5/2016 | Hassan |
| 9,375,843 B2 * | | 6/2016 | Wang ................... G05D 1/0038 |
| 9,554,508 B2 * | | 1/2017 | Balutis .................... B25J 5/007 |
| 9,842,192 B2 * | | 12/2017 | Wang ..................... G06F 19/00 |
| 10,230,538 B2 * | | 3/2019 | Killian ............... H04L 12/282 |
| 10,313,731 B1 * | | 6/2019 | Krishnan .......... H04N 21/43615 |
| 10,328,897 B1 * | | 6/2019 | Nabbe ................ G06F 21/305 |
| 10,736,154 B2 * | | 8/2020 | Jensen ................... H04Q 9/00 |
| 11,092,964 B2 * | | 8/2021 | Kunzi ................... G08G 5/0069 |
| 2001/0030658 A1 * | | 10/2001 | Rosenberg ............. G06F 3/038 715/701 |
| 2001/0052006 A1 * | | 12/2001 | Barker .................... H04L 41/22 709/223 |
| 2002/0023118 A1 * | | 2/2002 | Peled ....................... G06F 9/52 718/104 |
| 2002/0068588 A1 | | 6/2002 | Yoshida et al. |
| 2002/0085516 A1 | | 7/2002 | Bridgelall |
| 2002/0085719 A1 | | 7/2002 | Crosbie |
| 2002/0112070 A1 * | | 8/2002 | Ellerbrock .......... H04L 12/5601 709/223 |
| 2002/0131378 A1 | | 9/2002 | Korinek et al. |
| 2003/0076785 A1 | | 4/2003 | Purpura |
| 2003/0078784 A1 * | | 4/2003 | Jordan ................. H04N 21/478 704/275 |
| 2003/0093187 A1 * | | 5/2003 | Walker ............... B64D 45/0059 701/1 |
| 2003/0219001 A1 | | 11/2003 | de Prado Pavon et al. |
| 2004/0039817 A1 | | 2/2004 | Lee et al. |
| 2004/0090924 A1 | | 5/2004 | Giaimo et al. |
| 2004/0148411 A1 | | 7/2004 | Blawat et al. |
| 2004/0227731 A1 * | | 11/2004 | Gould Bear .......... G06F 1/1632 345/160 |
| 2004/0260562 A1 * | | 12/2004 | Kujirai ................. G01C 21/3608 704/275 |
| 2005/0003827 A1 | | 1/2005 | Whelan |
| 2005/0037787 A1 | | 2/2005 | Bachner, III et al. |
| 2005/0046584 A1 * | | 3/2005 | Breed .................. G06F 3/0219 340/13.31 |
| 2005/0047344 A1 | | 3/2005 | Seol |
| 2005/0058112 A1 | | 3/2005 | Lahey et al. |
| 2005/0134716 A1 | | 6/2005 | Vice |
| 2005/0135310 A1 | | 6/2005 | Cromer et al. |
| 2005/0197136 A1 | | 9/2005 | Friday et al. |
| 2005/0256616 A1 * | | 11/2005 | Rhoads .................. H04L 67/327 701/1 |
| 2006/0029061 A1 | | 2/2006 | Pister et al. |
| 2006/0068782 A1 | | 3/2006 | Kuriyama |
| 2006/0072507 A1 | | 4/2006 | Chandra et al. |
| 2006/0094400 A1 | | 5/2006 | Beachem et al. |
| 2006/0104232 A1 | | 5/2006 | Gidwani |
| 2006/0176169 A1 | | 8/2006 | Doolin et al. |
| 2006/0227761 A1 | | 10/2006 | Scott et al. |
| 2006/0229090 A1 | | 10/2006 | LaDue |
| 2006/0292996 A1 | | 12/2006 | Malasani et al. |
| 2007/0008918 A1 | | 1/2007 | Stanforth |
| 2007/0010898 A1 * | | 1/2007 | Hosek ................. G05B 19/4185 700/2 |
| 2007/0061041 A1 | | 3/2007 | Zweig |
| 2007/0064092 A1 * | | 3/2007 | Sandbeg ................ H04N 7/142 348/14.02 |
| 2007/0085822 A1 | | 4/2007 | Lagnado |
| 2007/0105600 A1 | | 5/2007 | Mohanty et al. |
| 2007/0109993 A1 | | 5/2007 | Beach |
| 2007/0140163 A1 | | 6/2007 | Meier et al. |
| 2007/0177549 A1 | | 8/2007 | Lo et al. |
| 2007/0192910 A1 * | | 8/2007 | Vu ........................ B25J 19/06 700/245 |
| 2007/0201420 A1 | | 8/2007 | Tejaswini et al. |
| 2007/0240163 A1 | | 10/2007 | Conrad et al. |
| 2007/0243832 A1 | | 10/2007 | Park et al. |
| 2007/0250212 A1 | | 10/2007 | Halloran et al. |
| 2007/0258508 A1 | | 11/2007 | Werb et al. |
| 2008/0062940 A1 | | 3/2008 | Othmer et al. |
| 2008/0113666 A1 | | 5/2008 | Monte et al. |
| 2008/0123682 A1 | | 5/2008 | Yackoski et al. |
| 2008/0136972 A1 * | | 6/2008 | Blankenburg ....... H04N 21/485 348/734 |
| 2008/0186917 A1 | | 8/2008 | Wu et al. |
| 2008/0192699 A1 | | 8/2008 | Rue |
| 2008/0198811 A1 | | 8/2008 | Deshpande et al. |
| 2008/0215766 A1 | | 9/2008 | Stobbe et al. |
| 2008/0273486 A1 | | 11/2008 | Pratt et al. |
| 2008/0285520 A1 | | 11/2008 | Forte et al. |
| 2008/0310371 A1 | | 12/2008 | Russell |
| 2009/0011773 A1 | | 1/2009 | Balachandran et al. |
| 2009/0103503 A1 | | 4/2009 | Chhabra et al. |
| 2009/0154426 A1 | | 6/2009 | Perraud et al. |

(56) References Cited

U.S. PATENT DOCUMENTS

| | | | |
|---|---|---|---|
| 2009/0165114 A1* | 6/2009 | Baum | H04L 12/2803 726/12 |
| 2009/0219849 A1 | 9/2009 | Alpert et al. | |
| 2009/0281676 A1 | 11/2009 | Beavis et al. | |
| 2009/0286534 A1 | 11/2009 | Garg et al. | |
| 2009/0290555 A1 | 11/2009 | Alpert et al. | |
| 2010/0004802 A1* | 1/2010 | Bodin | G05D 1/0038 701/11 |
| 2010/0010672 A1* | 1/2010 | Wang | B25J 19/005 700/259 |
| 2010/0076600 A1* | 3/2010 | Cross | H04N 7/15 700/264 |
| 2010/0080163 A1 | 4/2010 | Krishnamoorthi et al. | |
| 2010/0118830 A1 | 5/2010 | Stephenson et al. | |
| 2010/0123598 A1* | 5/2010 | Brodersen | G08C 19/28 340/12.22 |
| 2010/0157864 A1 | 6/2010 | Salomone et al. | |
| 2010/0214082 A1 | 8/2010 | Covaro et al. | |
| 2010/0229194 A1* | 9/2010 | Blanchard | G06F 3/038 725/39 |
| 2010/0302968 A1 | 12/2010 | Lu et al. | |
| 2010/0317371 A1 | 12/2010 | Westerinen et al. | |
| 2011/0006991 A1* | 1/2011 | Elias | G06F 1/1662 345/168 |
| 2011/0013552 A1 | 1/2011 | Ali et al. | |
| 2011/0021231 A1 | 1/2011 | Burns et al. | |
| 2011/0096739 A1 | 4/2011 | Heidari et al. | |
| 2011/0128378 A1 | 6/2011 | Raji | |
| 2011/0141970 A1 | 6/2011 | Juan et al. | |
| 2011/0172822 A1 | 7/2011 | Ziegler et al. | |
| 2011/0189995 A1 | 8/2011 | Tinnakornsrisuphap et al. | |
| 2011/0211511 A1 | 9/2011 | Bakthavathsalu | |
| 2011/0222448 A1 | 9/2011 | Ofek et al. | |
| 2011/0222523 A1 | 9/2011 | Fu et al. | |
| 2011/0223885 A1 | 9/2011 | Salkintzis et al. | |
| 2011/0228751 A1 | 9/2011 | Takagi et al. | |
| 2011/0261206 A1* | 10/2011 | Thomas | G05B 15/02 348/159 |
| 2011/0282962 A1 | 11/2011 | Suzuki | |
| 2011/0288684 A1* | 11/2011 | Farlow | G05D 1/0038 700/264 |
| 2012/0046818 A1* | 2/2012 | Nettleton | E21F 17/00 701/23 |
| 2012/0083924 A1* | 4/2012 | Jones | B25J 9/08 700/258 |
| 2012/0191246 A1* | 7/2012 | Roe | B25J 13/003 700/259 |
| 2012/0224743 A1 | 9/2012 | Rodriquez | |
| 2012/0226344 A1 | 9/2012 | Shirokaze | |
| 2013/0138337 A1* | 5/2013 | Pack | G05D 1/0274 701/409 |
| 2013/0142062 A1 | 6/2013 | Dinan | |
| 2013/0150012 A1 | 6/2013 | Chhabra et al. | |
| 2013/0198685 A1* | 8/2013 | Bernini | G16H 40/63 715/800 |
| 2013/0242940 A1 | 9/2013 | Jones et al. | |
| 2013/0279411 A1 | 10/2013 | Gassend | |
| 2013/0279472 A1 | 10/2013 | Gassend | |
| 2013/0279479 A1 | 10/2013 | Gassend | |
| 2013/0288675 A1 | 10/2013 | Gassend | |
| 2013/0288686 A1 | 10/2013 | Chou | |
| 2013/0343352 A1 | 12/2013 | Hassan | |
| 2013/0345718 A1* | 12/2013 | Crawford | A61B 34/70 606/130 |
| 2014/0075330 A1* | 3/2014 | Kwon | G06F 3/038 715/750 |
| 2014/0128115 A1 | 5/2014 | Siomina et al. | |
| 2014/0336854 A1* | 11/2014 | Salmon | B63B 17/00 701/21 |
| 2015/0019670 A1* | 1/2015 | Redmann | H04N 21/4788 709/207 |
| 2015/0094854 A1* | 4/2015 | Cross | H04L 67/10 700/257 |
| 2015/0231784 A1* | 8/2015 | Yamauchi | G05D 1/0088 901/1 |
| 2015/0283701 A1* | 10/2015 | Izhikevich | G05D 1/0022 700/250 |
| 2015/0346722 A1* | 12/2015 | Herz | G01S 19/13 701/2 |
| 2016/0129597 A1* | 5/2016 | Wang | B25J 19/005 700/259 |
| 2016/0167234 A1* | 6/2016 | Angle | G06Q 10/1095 701/2 |
| 2017/0285631 A1* | 10/2017 | Bethke | G08G 5/0069 |
| 2019/0068394 A1* | 2/2019 | Dawes | H04L 12/2834 |
| 2019/0311632 A1* | 10/2019 | Hochwarth | H04W 12/08 |
| 2021/0264911 A1* | 8/2021 | Yae | G06F 3/167 |

OTHER PUBLICATIONS

"Final Office Action dated Jun. 21, 2018", U.S. Appl. No. 13/858,898, (25 pages).

"International Search Report and Written Opinion dated Jun. 17, 2013", International Patent Application No. PCT/US2013/035678, International Filing Date: Apr. 8, 2013 , (33 pages).

"Non Final Office Action dated Jul. 12, 2018" , U.S. Appl. No. 15/296,975 , (9 pages).

"Non Final Office Action dated Jul. 13, 2018" , U.S. Appl. No. 15/660,886 , (34 pages).

"Non Final Office Action dated Jun. 22, 2017", U.S. Appl. No. 15/391,597 , (10 pages).

Final Office Action dated Jul. 30, 2019, U.S. Appl. No. 16/231,072, (26 pages).

Non Final Office Action dated Jul. 29, 2019, U.S. Appl. No. 16/157,218, (24 pages).

* cited by examiner

SYSTEMS AND METHODS FOR REMOTE PRESENCE

RELATED APPLICATION DATA

The present application is a continuation application of U.S. patent application Ser. No. 15/850,679, filed on Dec. 21, 2017, which is a continuation of U.S. patent application Ser. No. 15/391,597, filed on Dec. 27, 2016 now abandoned, which is a continuation application of U.S. patent application Ser. No. 15/006,036, filed on Jan. 25, 2016 now abandoned, which is a continuation application of U.S. patent application Ser. No. 14/035,223 filed on Sep. 24, 2013 now abandoned, which claims the benefit under 35 U.S.C. § 119 to U.S. Provisional Application Ser. No. 61/744,378 filed Sep. 24, 2012 and U.S. Provisional Application Ser. No. 61/705,625 filed Sep. 25, 2012. The foregoing applications are hereby incorporated by reference into the present application in their entirety.

FIELD OF THE INVENTION

The present invention relates generally to telecommunication systems, and more particularly to remote presence systems wherein a remotely-positioned pilot may utilize an electromechanically mobile workstation local to another work environment to virtually participate in that environment.

BACKGROUND

The notion of telepresence via the use of remotely located electromechanical systems, such as the CanadaArm utilized on the second launch of the NASA Space Shuttle in 1981, has been around for decades, and now plays a role in many marketplaces, from shopping to surgery. Further, with the onset of video conferencing in many forms, from high-end and high-expense systems like those available from the telepresence division of Cisco Systems, Inc., to the nearly free systems available on almost any personal computer by the Skype division of Microsoft Corporation, people are becoming more and more interested in utilizing video conferencing techniques to communicate and share information. More recently, a marketplace known as "remote presence" has evolved, wherein certain aspects of electromechanical telepresence and video conferencing may be combined. A typical remote presence system will involve a pilot workstation, such as a laptop having specific hardware, software, and network connectivity, positioned in a first location usually at least somewhat remote from a second location wherein an electromechanically movable portion of the remote presence system is configured to assist the pilot in being "virtually present" in the second location. Typically this involves facilitating remote navigation of the system local to the second location from the first location while also facilitating real-time or near real-time video conferencing through the remote presence system. Several systems have entered the marketplace, but have had limited success due to various factors, including their complexity, expense, focus on two-wheeled balancing, lack of network connectivity robustness, operational noise level, and/or suboptimal user interface configurations. There is a need for an effective and affordable remote presence system that can be used and relied upon for modern business demands.

SUMMARY OF THE INVENTION

Remote presence systems and methods are presented. In one embodiment, a system may comprise a pilot workstation comprising a pilot computing station having a display, a microphone, a camera oriented to capture images of the pilot, a network connectivity subsystem, and a master input device such as a keyboard, mouse, or joystick. The pilot network connectivity subsystem may be operatively coupled to an electromechanically mobile workstation comprising a mobile base interconnected to a head component. The mobile workstation may comprise a display, a microphone, a camera oriented to capture images of nearby people and structures, and a workstation network connectivity subsystem that preferably is operatively coupled to the pilot network connectivity subsystem. Preferably by virtue of the system components, the pilot is able to remotely project a virtual presence of himself in the form of images, sound, and motion of the mobile workstation at the location of the mobile workstation.

One embodiment is directed to a remote presence system, comprising a remote mobile workstation comprising a controller and a drive system; and a pilot workstation operatively coupled to the remote mobile workstation in a pier-to-pier network configuration such that commands from a pilot operating a first master input device comprising the pilot workstation are communicated to the remote mobile workstation and utilized to navigate the drive system with commands from the controller; wherein the controller of the remote mobile workstation is configured such that navigation commands from the first master input device will be ignored if navigation commands from a second master input device comprising the pilot workstation are instituted.

DETAILED DESCRIPTION

Figure 1A:
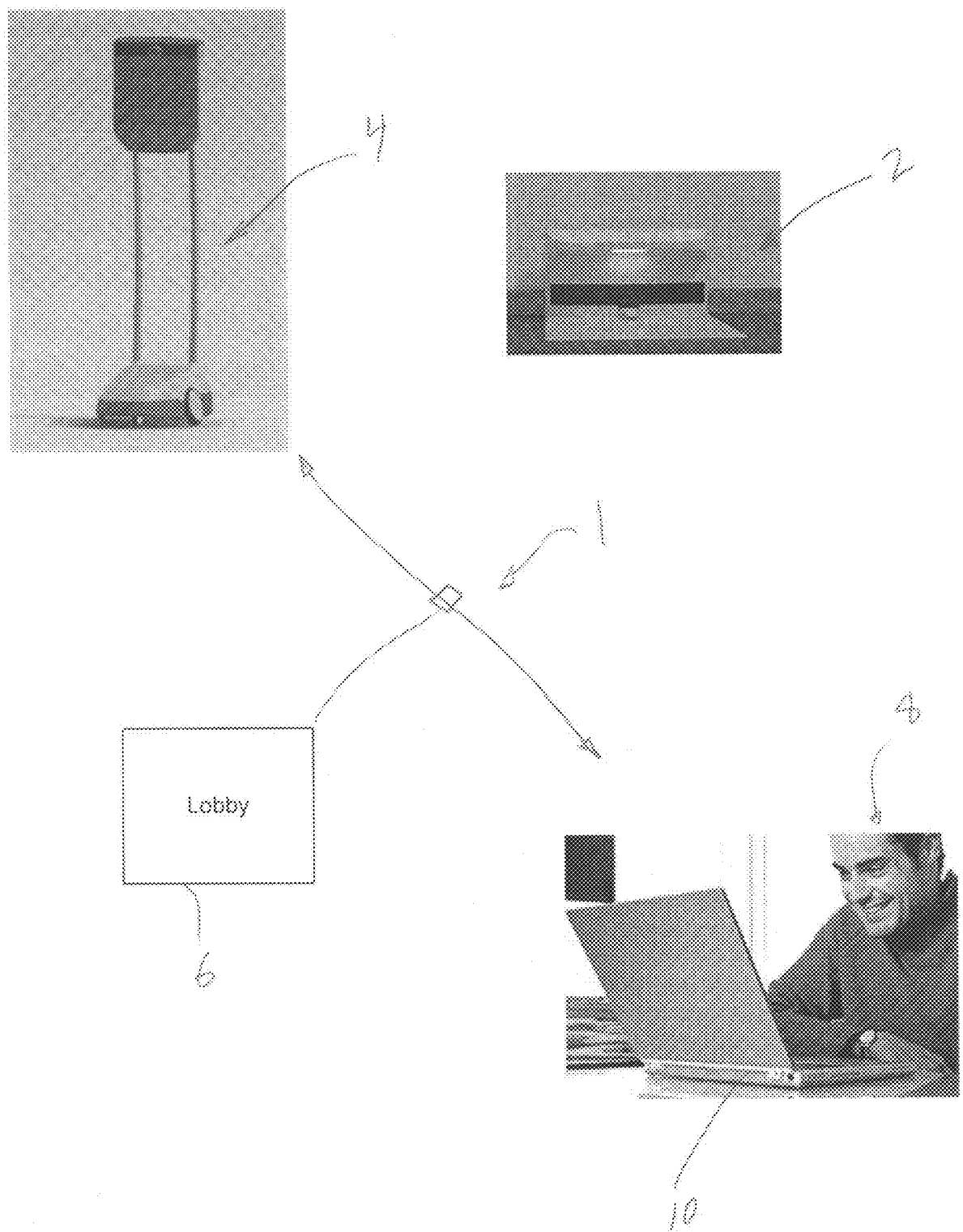
FIGS. 1A and 1B illustrate various aspects of embodiments of a remote presence system in accordance with the present invention.
Figure 1B:
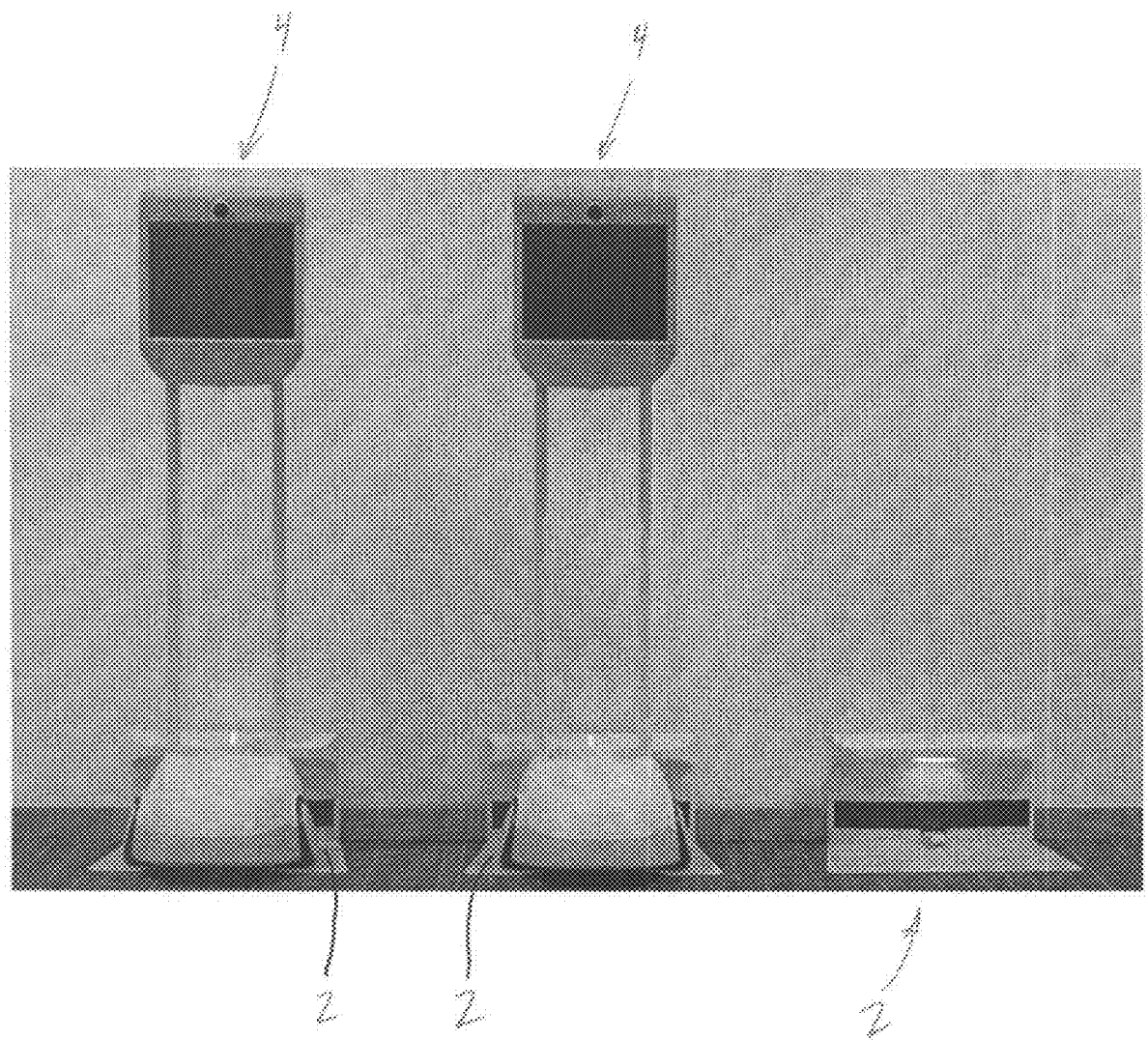

Referring to FIG. 1A, in one embodiment, a remote presence system comprises a pilot computing system (10) for a pilot (8) who may be located at a location remote from the location of a remote mobile workstation (4). For simplicity, these locations may be referred to as the "pilot location" and the "remote location"; persons physically located at the remote location may be referred to as "locals". The system also may comprise a charging base or charging dock (2) located at the remote location and configured to re-charge a battery component of the remote mobile workstation (4) when the remote mobile workstation is parked upon the charging dock (2). In one embodiment, the pilot (8) may remotely operate the remote mobile workstation via his pilot computing system (10) using conditional network connectivity (1), which is conditioned upon the pilot, at least initially, providing authentication information through a login gateway, or "lobby" (6), which generally is operated by a server remote to both the remote mobile workstation and pilot. The pilot computing system (10) may comprise a laptop computer, desktop computer, or smaller or larger computing system that may be operated at the pilot location by the pilot, such as a smartphone or other device, so long as such device has the basic communications hardware and software required for operating the remote mobile workstation remotely, as discussed below. In another embodiment, a pilot (8) workstation may be configured to authenticate directly to the remote mobile workstation (4) without involving a central authentication service. For example, in one configuration a pilot could use a direct IP address to connect directly to a selected mobile workstation (4). FIG. 1B illustrates a series of charging docks (2) located in a particular corporate facility, two of which are occupied by charging remote mobile workstation (4) systems.

Figure 2A:
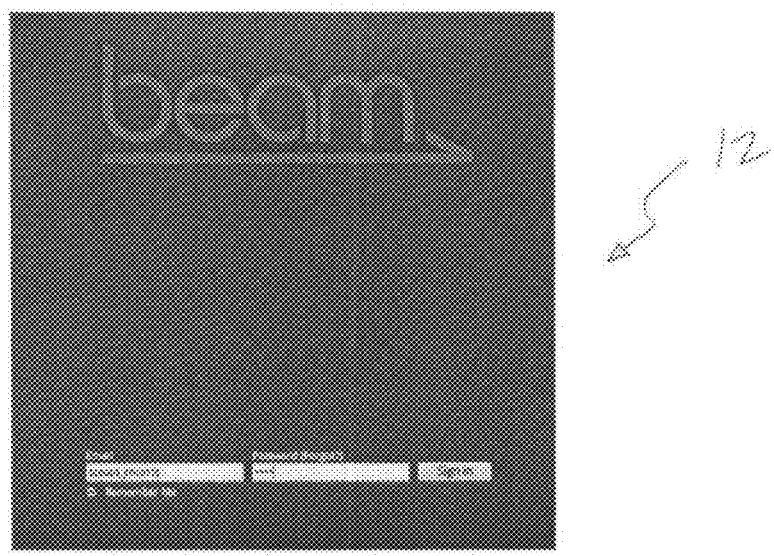
FIGS. 2A-2B illustrate user interface views pertinent to embodiments of a remote presence system in accordance with the present invention.
Figure 2B:
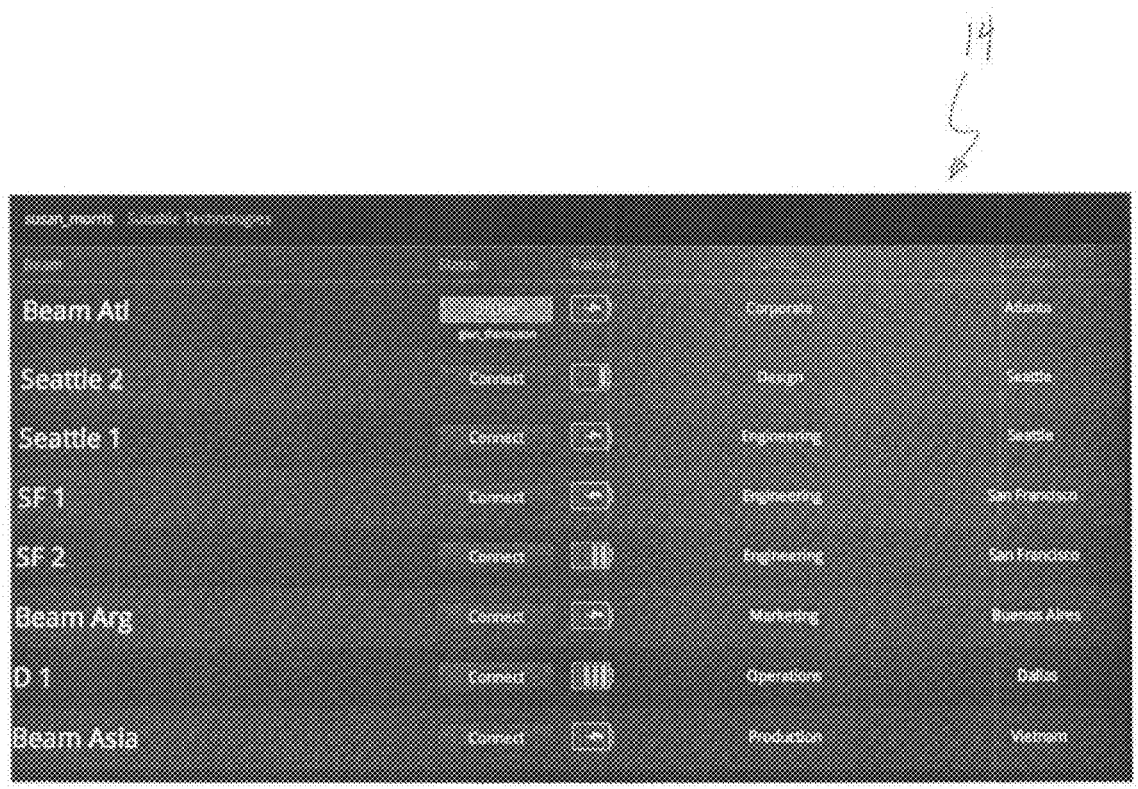
Figure 2C:
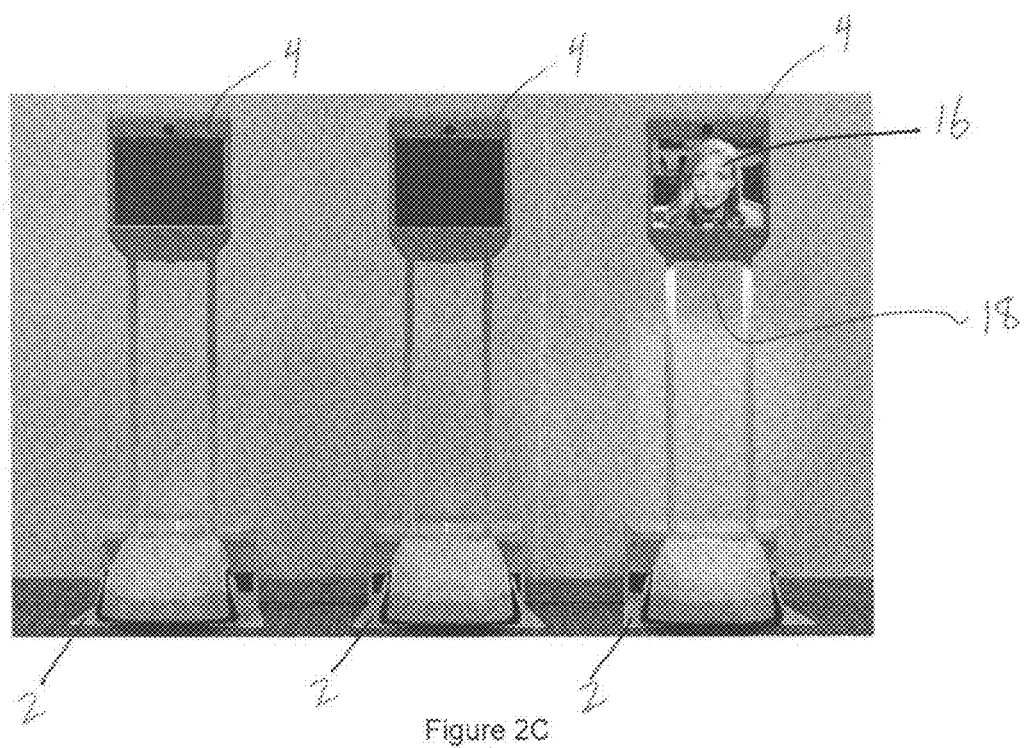
FIGS. 2C-2H illustrate system operational views pertinent embodiments of to a remote presence system in accordance with the present invention.
Figure 2D:
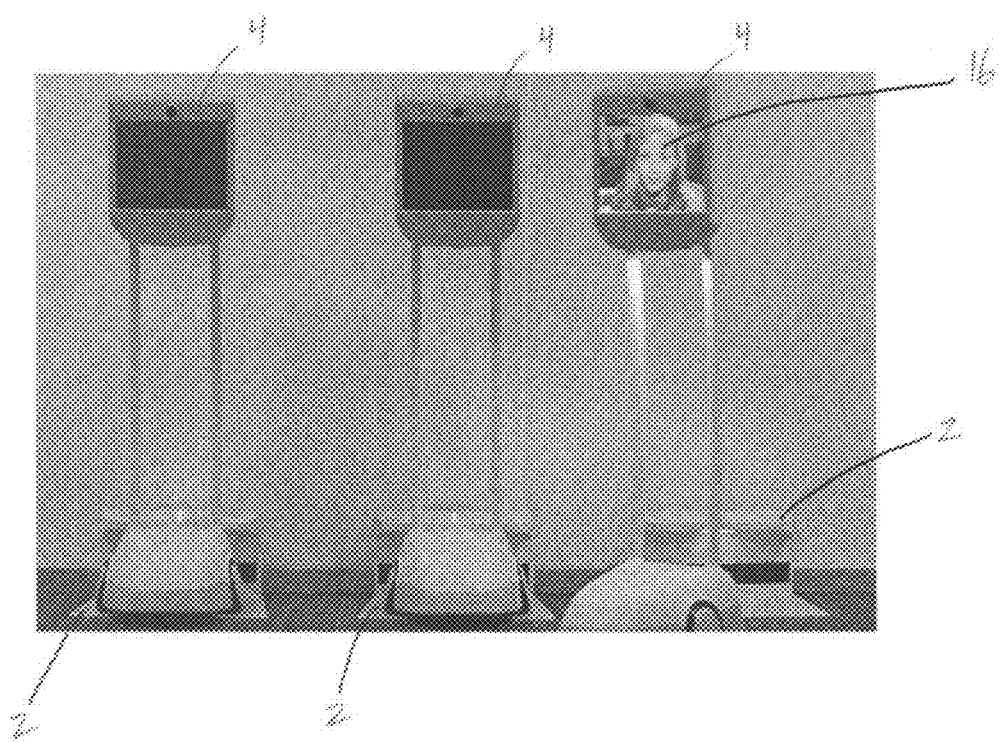

Referring to FIG. 2A, in operation, a lobby log-in screen (12) facilitates access to a remote mobile workstation selection control panel interface (14), whereby the pilot may select a particular remote mobile workstation that he wishes to operate from his location using his pilot computing system. As shown in the exemplary interface view (14), one particular location (such as Seattle, listed in the interface view) may have numerous remote mobile workstation systems available, similar to the scenario depicted in FIG. 1B. Referring to FIG. 2C, upon selecting a particular remote mobile workstation (4), video images of the pilot (14) acquired from the pilot computing system (10) are delivered to the display of the remote mobile workstation (4) and the remote mobile workstation (4) becomes actively operated by the pilot from his pilot location. A downward-facing light (18) assists with lighting the field of view of a navigation camera, discussed further below, when the remote mobile workstation (4) is actively being operated by a pilot. The system may also comprise one or more forward-facing lights or sensors, such as one or more infrared sensors, laser rangefinding sensors, and/or sonar detectors. Further, various colors of laser pointer tools may be coupled to the mobile workstation (4) to assist with navigation and pointing by a remote pilot. The pilot user interface may be configured to not only allow pointing with a laser device, but also projection with a projector, such as a laser projector or conventional light projector which may be operatively coupled to the remote workstation (4). Projectors may be utilized to not only assist with pilot communication, but also to display various augmented reality objects or to display photos, artwork, and/or advertisements for people local to the mobile workstation (4). Infrared imaging using one or more infrared cameras may be utilized to provide safety to people and objects local to the mobile workstation (4) by providing enhanced vision of objects and personnel, such as in the dark, to prevent collisions, to prevent movement of the workstation (4) into too-close a proximity with a cliff or stairwell, and the like. Referring to FIG. 2D, the pilot has driven the remote mobile workstation (4) out of the charging dock (2) and into the floor space ahead.

Figure 2E:
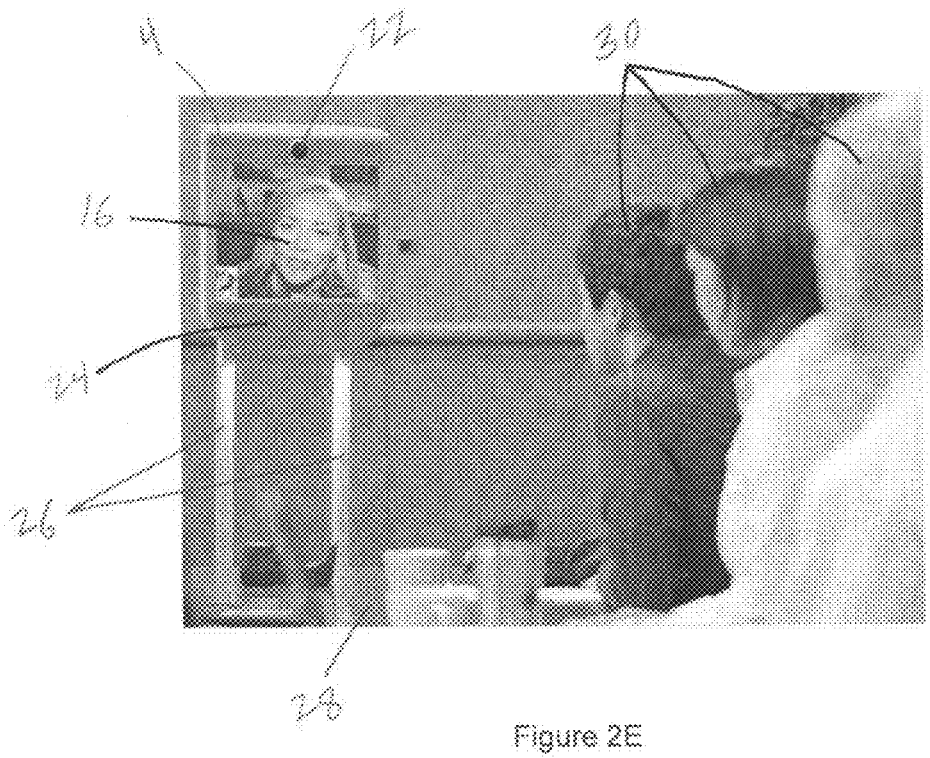
Figure 2F:
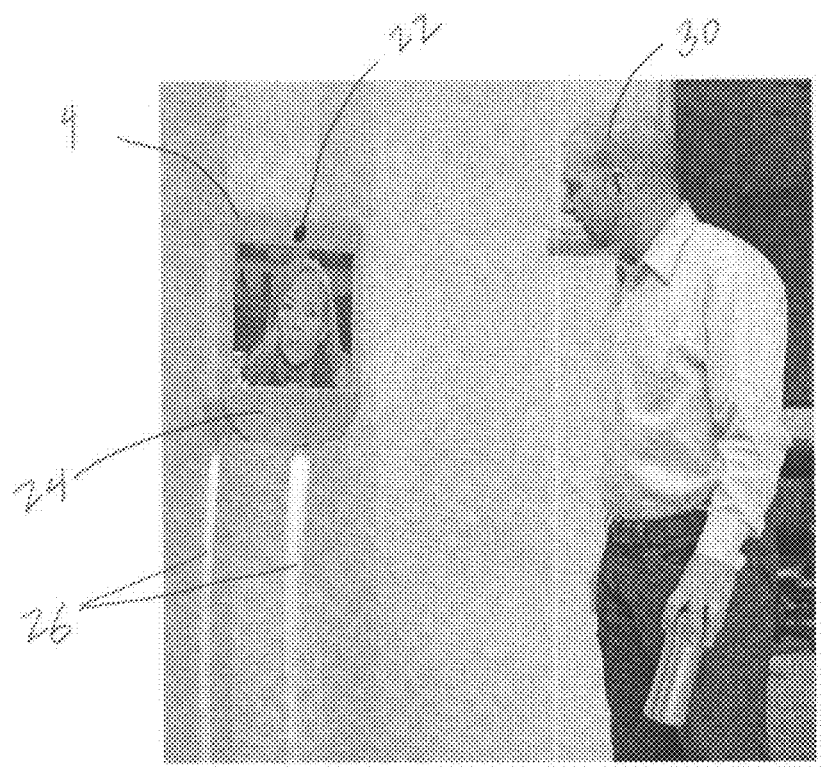

Referring to FIG. 2E, the pilot is shown operating the remote mobile workstation (4) in a corporate meeting setting near a conference table (28) and three locals (30) who are engaging the pilot as if she was in the room. Images of the locals are captured by a main camera (20), while the pilot's voice is projected through a front-oriented speaker (24). In one embodiment the speaker (24) may comprise a single sound driver. In another embodiment, the speaker (24) may comprise a beam forming, parametric array, or stereo speaker, which may be configured to project sound directionally to specific areas, under the direction of the pilot through the pilot user interface. In one embodiment, the speaker (24), or entire head component (36) may be movably coupled to the remainder of the remote mobile workstation (4) to assist with greater field of view for camera systems, greater perception of presence of the pilot in the local environment, and greater speaker directionalization capability. For example, in one embodiment the head (36) may be movably coupled to the other associated components of the workstation (4), such as the spine members (26), with a movable interface that allows for pilot-controllable degrees of freedom for head pan, head tilt, and/or head elevation relative to the spine members (26). In another embodiment the speaker may be movably coupled to the head (36) with speaker pan, speaker tilt, and/or speaker elevation degrees of freedom which may be at least partially controlled by the pilot through the pilot user interface. The spine members of the remote mobile workstation (4) are selected in the depicted embodiment to provide desired conversation height (to approximately match the height of the faces of the counterparties to the particular conversation) in both a conference room setting, as in FIG. 2E, and in a standing type of setting, as in FIG. 2F, wherein a local (30) is engaging the pilot in a hallway.

Figure 2G:
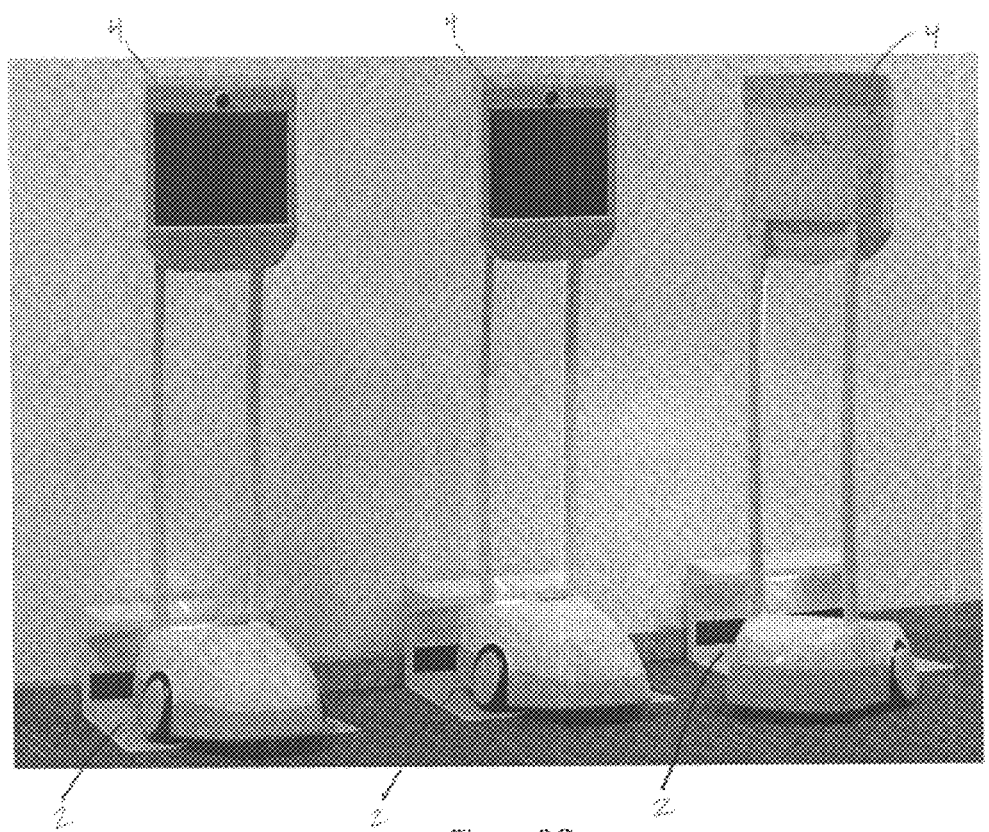
Figure 2H:
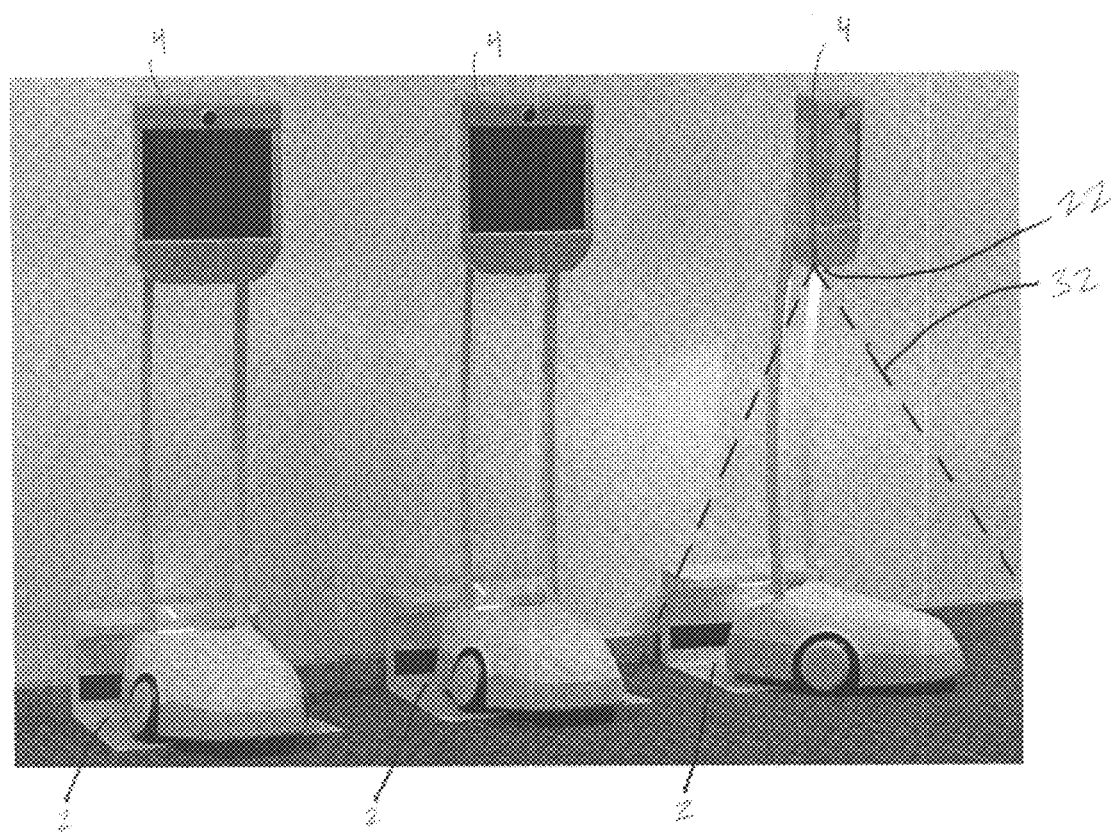

Referring to FIGS. 2G and 2H, the pilot is shown navigating the remote mobile workstation (4) back to a charging dock (2) where it may be parked for charging and use by others. A downward-facing navigation camera (22) provides a downward-oriented field of view (32) that assists with navigation of the remote mobile workstation (4) around various objects on the floor, such as portions of the charging dock (2). In one embodiment, the main camera (20), the navigation camera (22), or both cameras (20, 22) may be a wide angle camera, which may capture a field of view or field of capture between about 100 degrees and about 140 degrees.

Figure 2I:
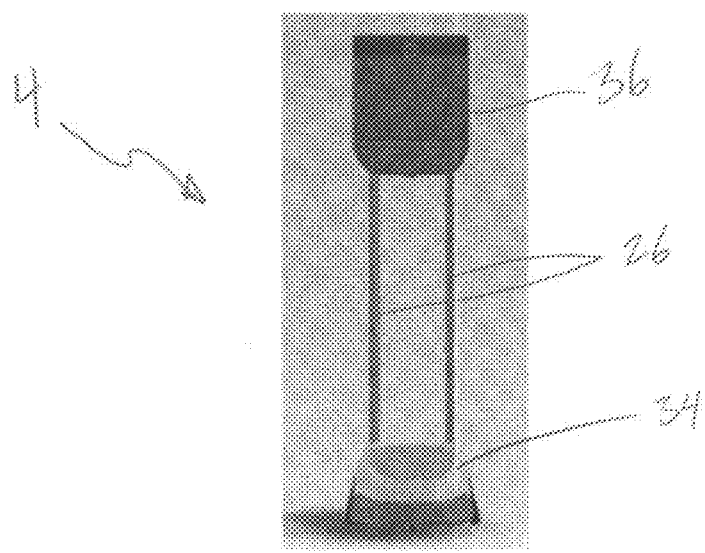
FIGS. 2I-2J illustrate orthogonal views pertinent to embodiments of a fully-assembled remote mobile workstation of remote presence system in accordance with the present invention.
Figure 2J:
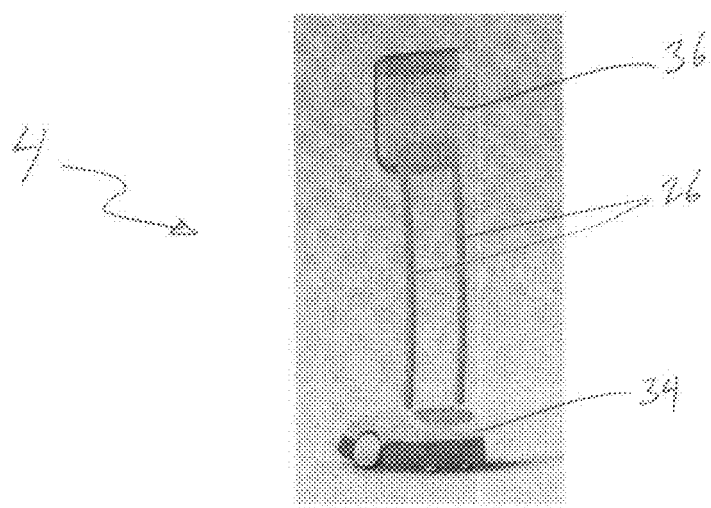

Referring to FIG. 2I, three main components of one embodiment of a remote mobile workstation (4) comprise a mobile base (34), a head assembly (36), and a spine assembly (26) interconnecting the head (36) and base (34). FIG. 2J shows a different orthogonal view of the same system depicted in FIG. 2I.

FIGS. 2K-2S illustrate various aspects of an embodiment of a mobile base assembly (34) in various states of disassembly.

Figure 2K:
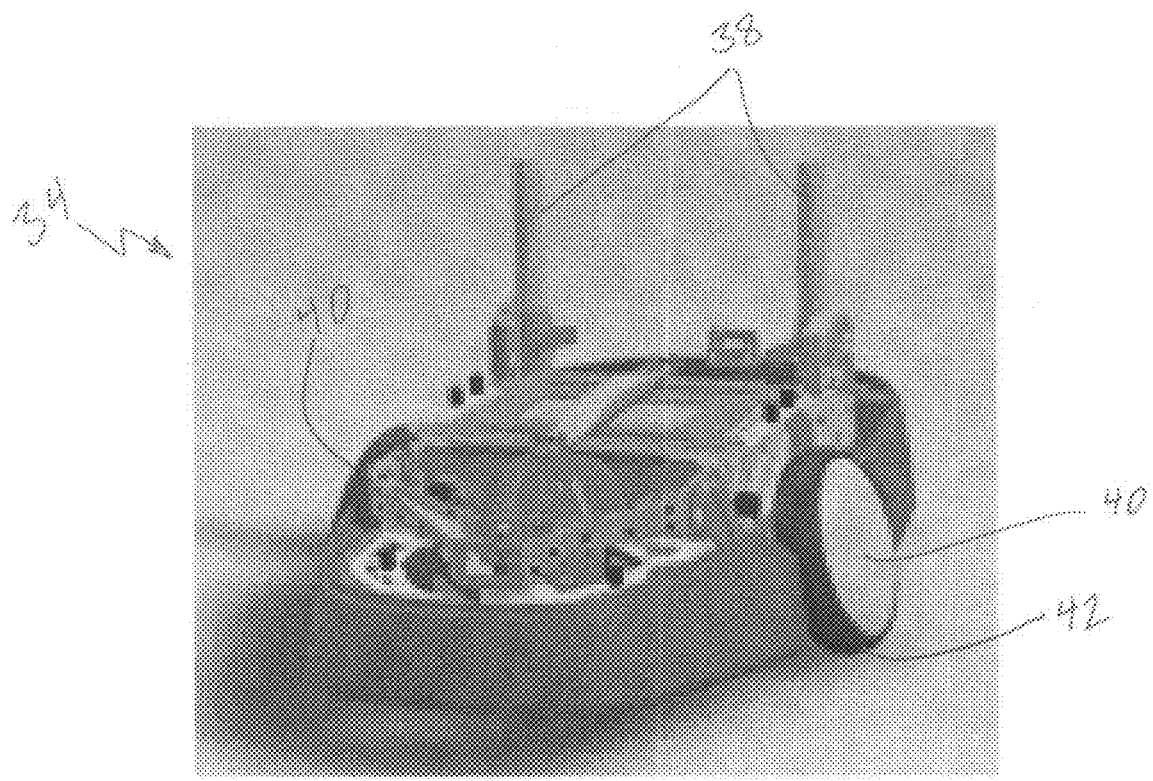
FIGS. 2K-2S illustrate orthogonal views pertinent to embodiments of a partially-assembled remote mobile workstation of remote presence system in accordance with the present invention, with emphasis on mobile base componentry.
Figure 2L:
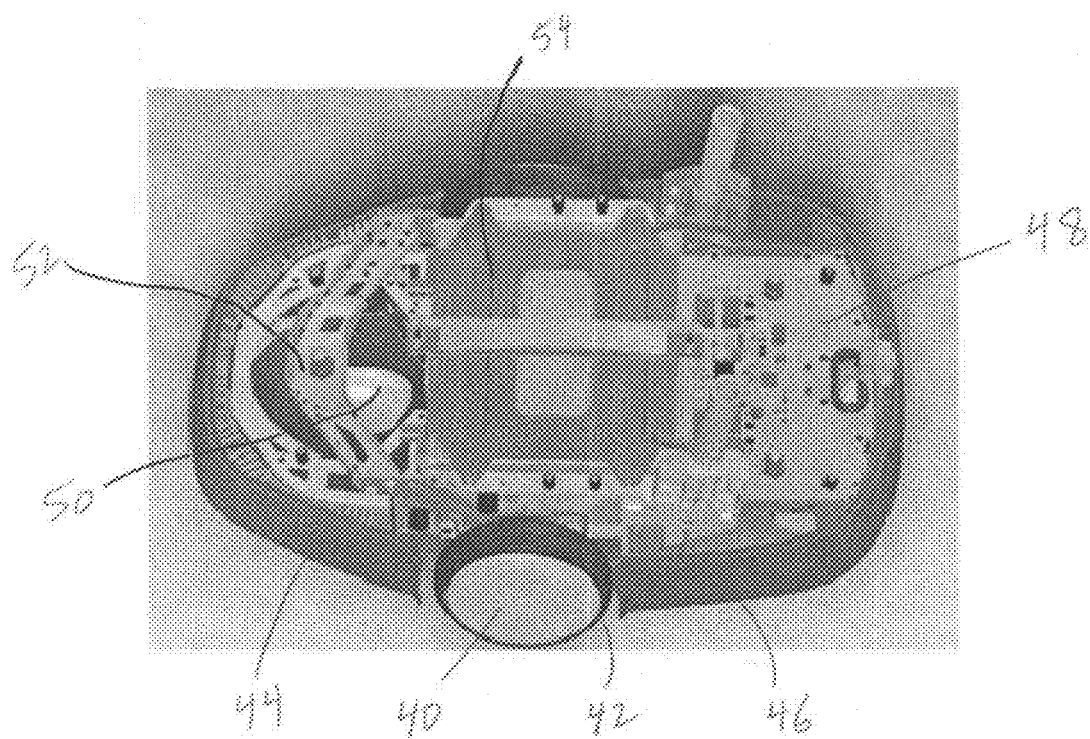

Referring to FIGS. 2K and 2L, the mobile base assembly comprises a five-wheeled device driven by two main wheels in a differential drive formation, with the two main drive wheels (40) opposed directly across from each other. With the upper skin component removed, the inner workings and parts of the mobile base (34) may be seen. Spine-mounting stems (38) are coupled to the mobile base (34) for interconnection with the spine assembly (26) tubular structures shown in FIGS. 2I-2J. Element 42 is a thin tire element which may be selected to provide greater floor gripping and noise and vibration dampening, such as a polymer such as polyurethane. A relatively large battery cover (54) reveals that a significant amount of the volume of the mobile base (34) is occupied by an underlying battery. The mobile base (34) is surrounded by impact resistant bumpers (44, 46) configured to assist in preventing damage to the mobile base componentry upon impact with a wall or other structure. A base motherboard (48) comprises motor control components as well as a gyro component configured to sense forward pitching rotation as well as roll rotation (i.e., about an axis perpendicular from the floor through the center of the mobile base 34), and a 3-axis accelerometer to detect acceleration in X, Y, and Z Cartesian directions relative to the mobile base (34). In one embodiment a 3-axis accelerometer and 3-axis gyro may be utilized to assist as inputs for smoothing out motion control of the mobile system (4).

Figure 2M:
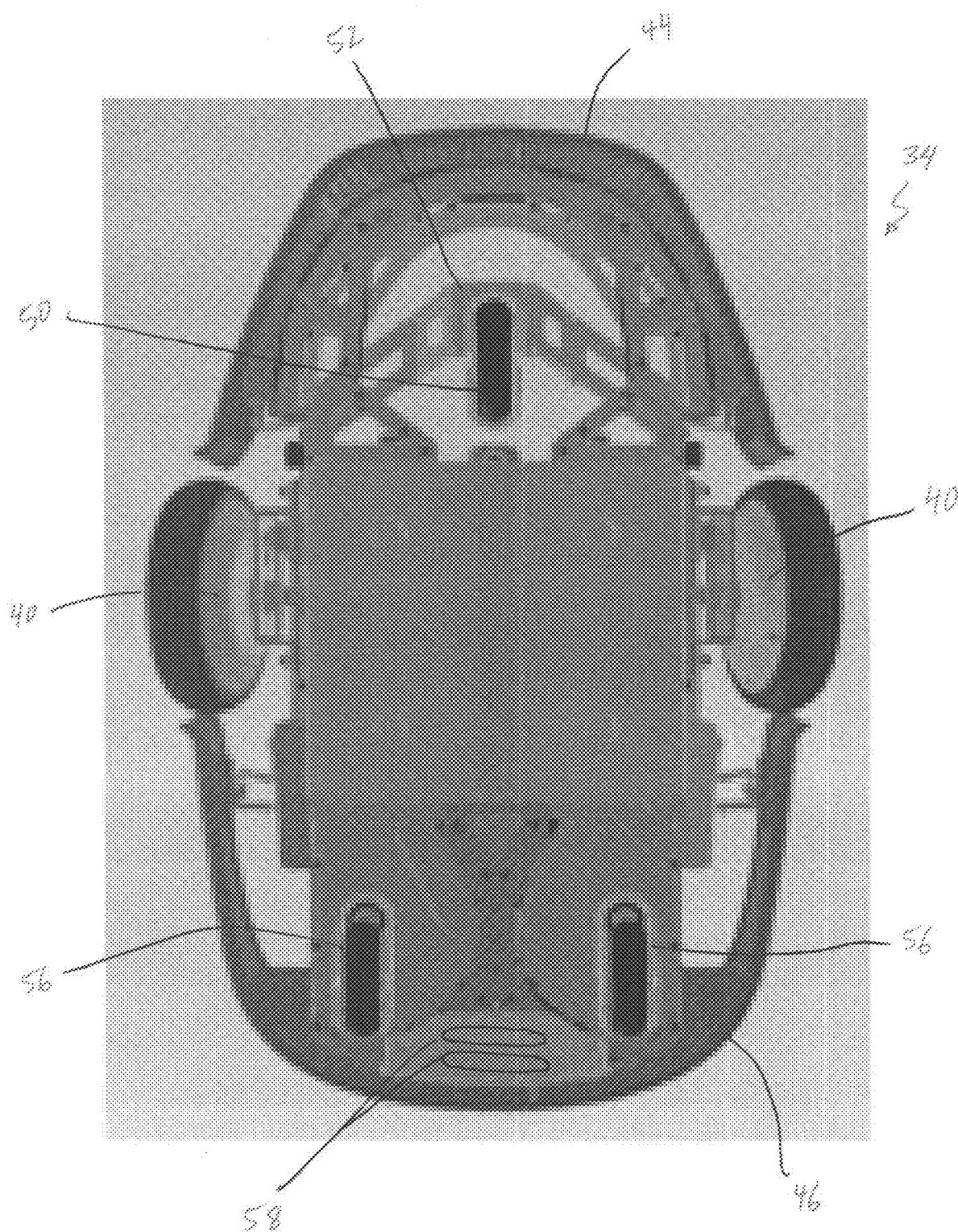

Referring to FIG. 2M, a bottom view shows the front wheel caster (50) movably coupled to the front wheel suspension arm (52), which is rotatably coupled to the main frame of the mobile base (34) as discussed below. The two main wheels (40) in differential drive configuration are shown opposite each other, as are the rear caster wheels (56). One or more charging contacts (58) configured to directly interface with mating features on a charging dock are featured on the underside of the mobile base (34), and may be electroplated with a high-conduction material such as gold to facilitate quality charging conduction. In one embodiment, each of the main wheels (40) may be operatively coupled to a rotational position encoder configured to assist in monitoring the rotational position of each wheel with a high degree of accuracy, which may be utilized to provide positional information regarding the wheels and mobile workstation (4) in general for the remote pilot and control system. In one embodiment, an automatic docking feature may allow for a pilot to identify, or confirm semi-automatic or automatic identification of, a charging dock (2), after which the mobile workstation may be configured to automatically navigate onto the charging dock (2) and into a power charging position. The cameras (20, 22) or other sensors, such as Bluetooth™ sensors, near field communication sensors, or various types of wireless beacons which may be coupled to the remote workstation (4) and/or the charging dock (2) may be utilized in the identification of and/or navigation to such an auto-docking coupling. In embodiments wherein any kind of automatic navigation is to be conducted, the system may be configured to require affirmative input from the pilot during such automatic navigation or the navigation will halt. For example, in one embodiment, when a desired charging dock (2) has been identified and confirmed by a pilot, the system may be configured to require that the pilot press a certain user interface button or key constantly (i.e., hold such key or button down), or in another embodiment continued cyclic depression and release of such button or key at a frequency at least as great as a predetermined baseline frequency, to maintain the automatic navigation movement while the mobile workstation (4) navigates to the charging dock (2) and parks. These so-called "live-man" approaches may assist in preventing any accidental automatic navigation issues. Similar live-man functionality may be utilized to prevent unexpected or accidental inputs using various master input devices. For example, if a pilot workstation has a keyboard as well as a joystick for master input devices to a connected mobile workstation (4), the system may be configured such that inputs to the joystick will only be interpreted as drive commands if a particular live-man key or button is also depressed in a manner as describe above, to prevent accidental inputs from the joystick from becoming navigation or other commands. In one embodiment, a live-man configuration may be required for any navigation of the remote mobile workstation (4) at all, to confirm with an additional level of certainty that navigation commands, and therefore movement of the remote mobile workstation (4), are appropriate. In another embodiment, the system may be configured such that when one input device is providing inputs to navigate, and a second device then starts to provide inputs to navigate, the system switches from a state wherein it is navigating based upon navigation commands received from the first device to a state wherein it is navigating based upon navigation commands received from the second device. Such a configuration may be desired, for example, in a scenario wherein a pilot is operating with a wireless mouse having a battery that suddenly dies; the operator can switch to navigating with the keyboard or other input device and navigation will continue using such keyboard or other input device without regard to the mouse with dead battery.

Figure 2N:
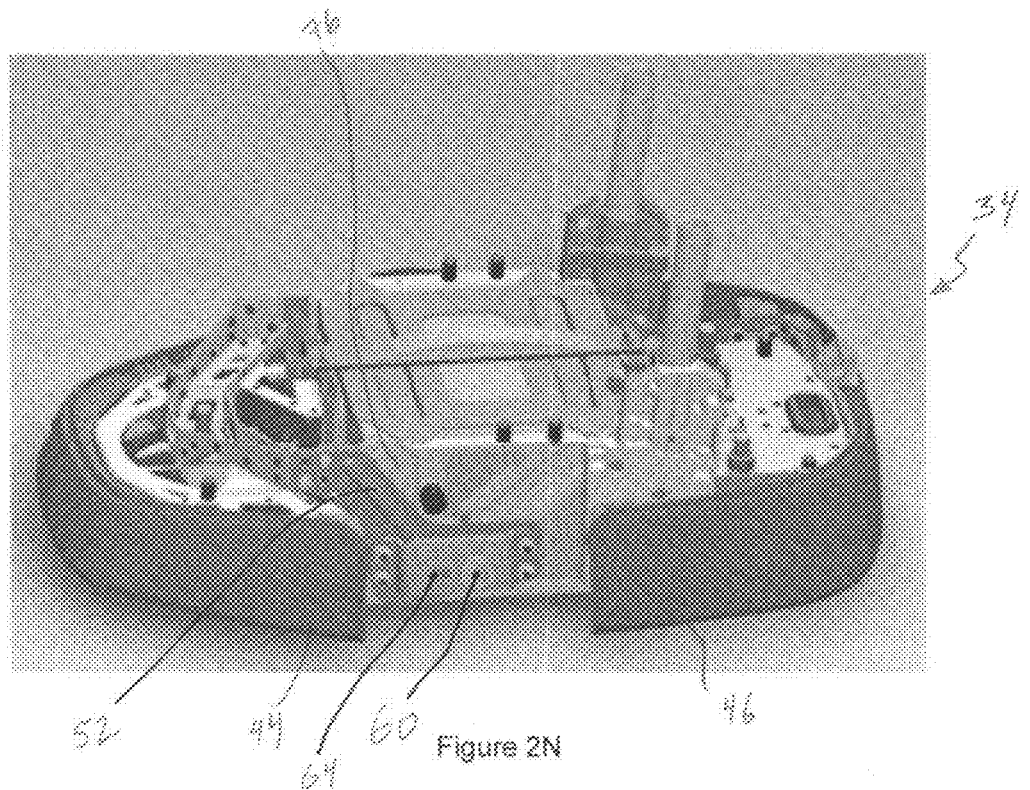
Figure 2O:
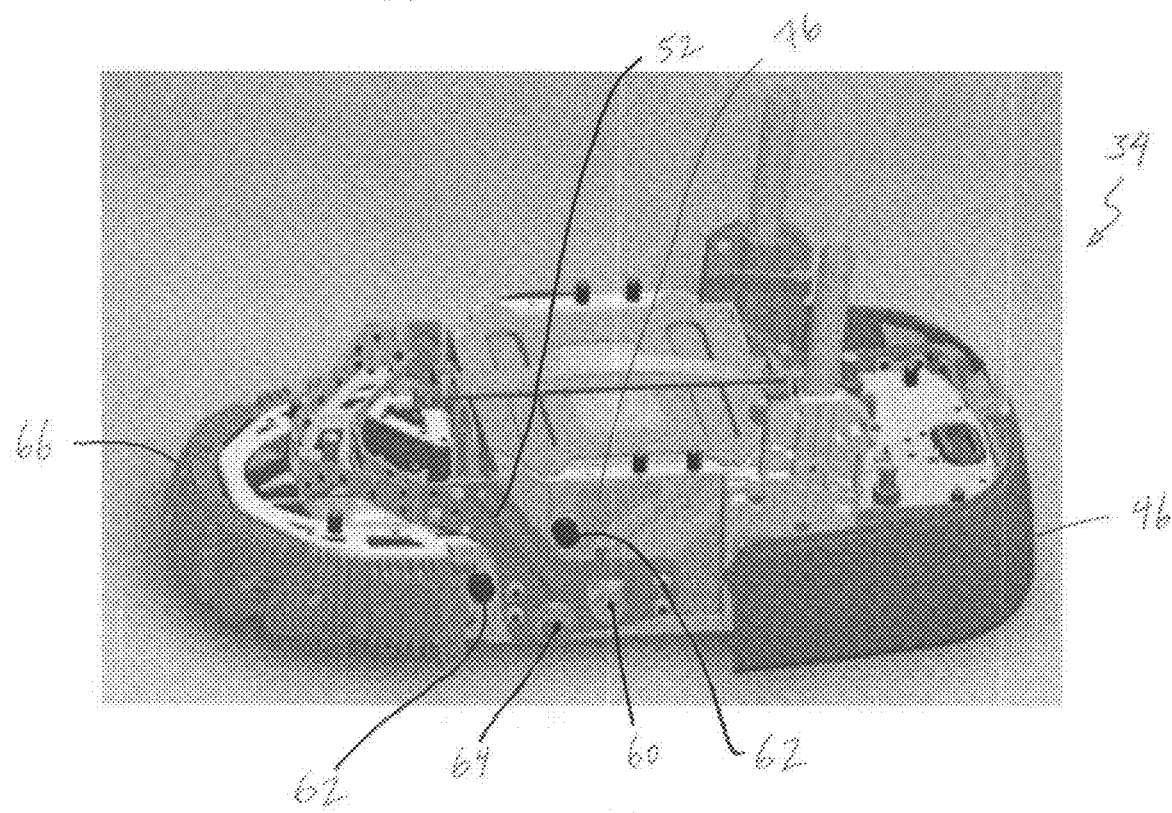
Figure 2P:
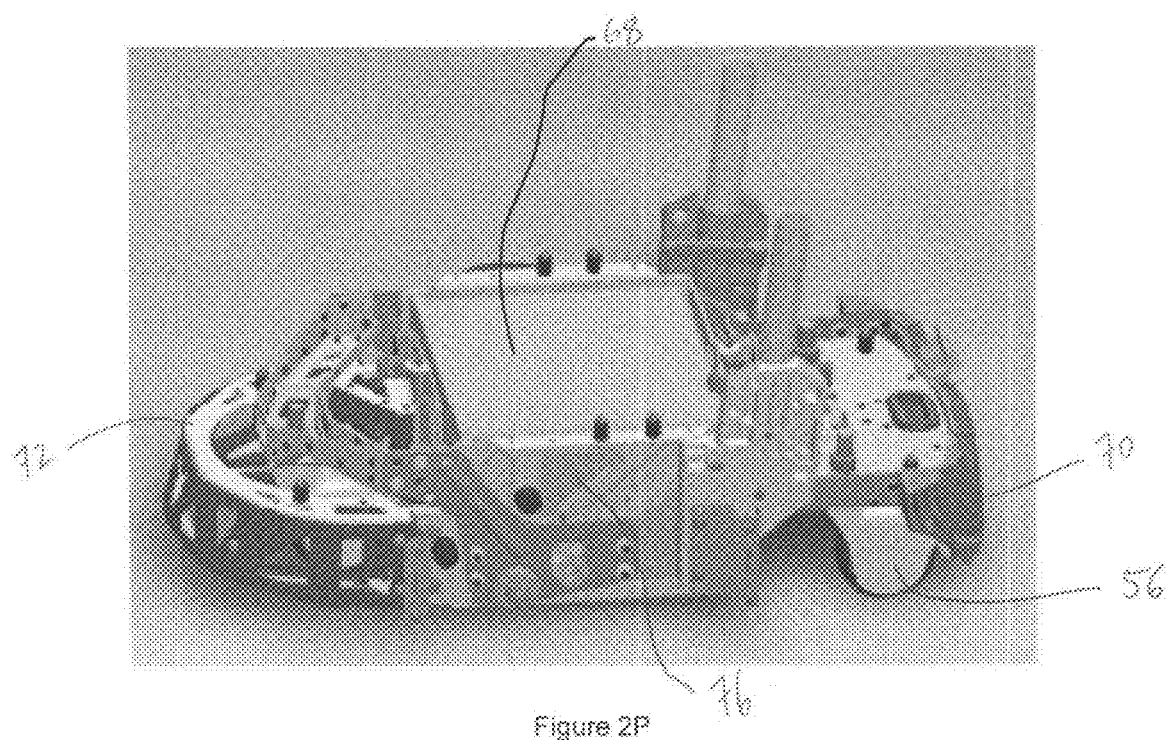
Figure 2Q:
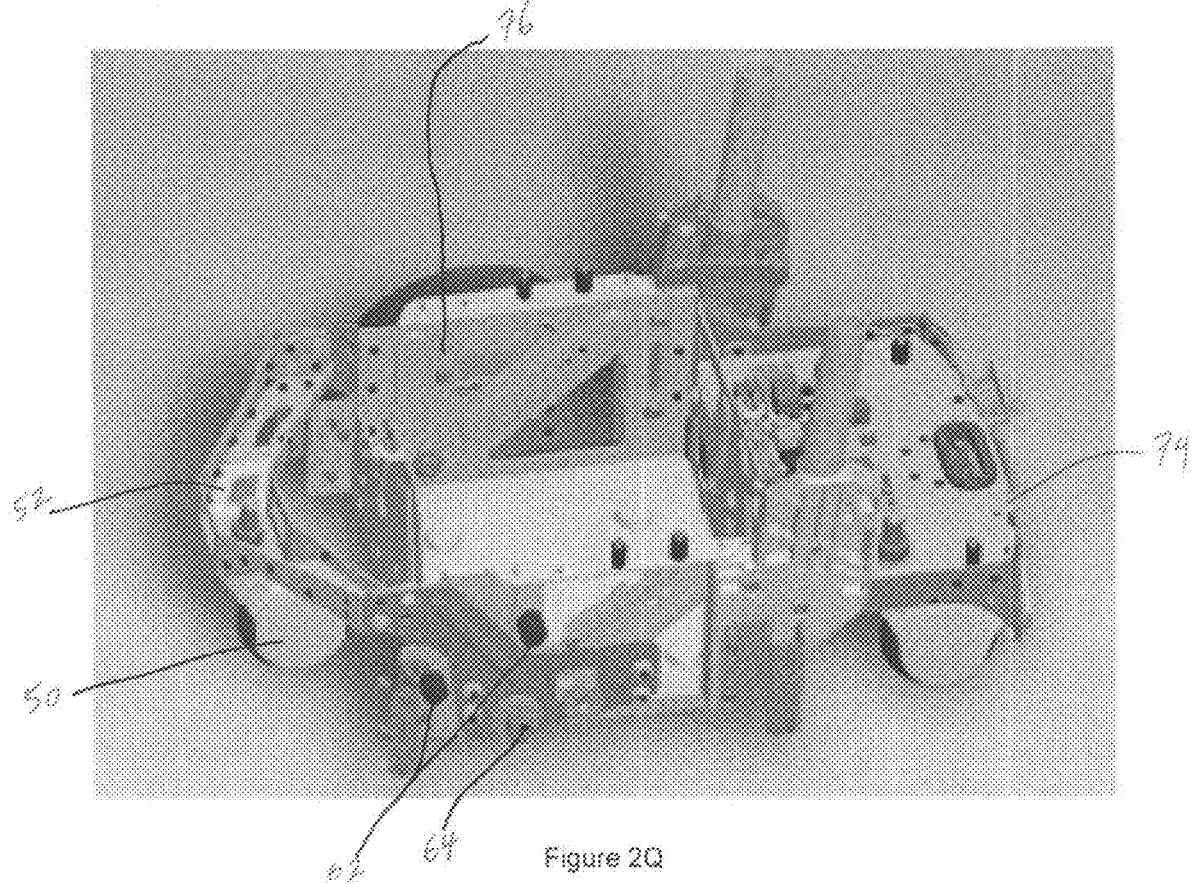
Figure 2R:
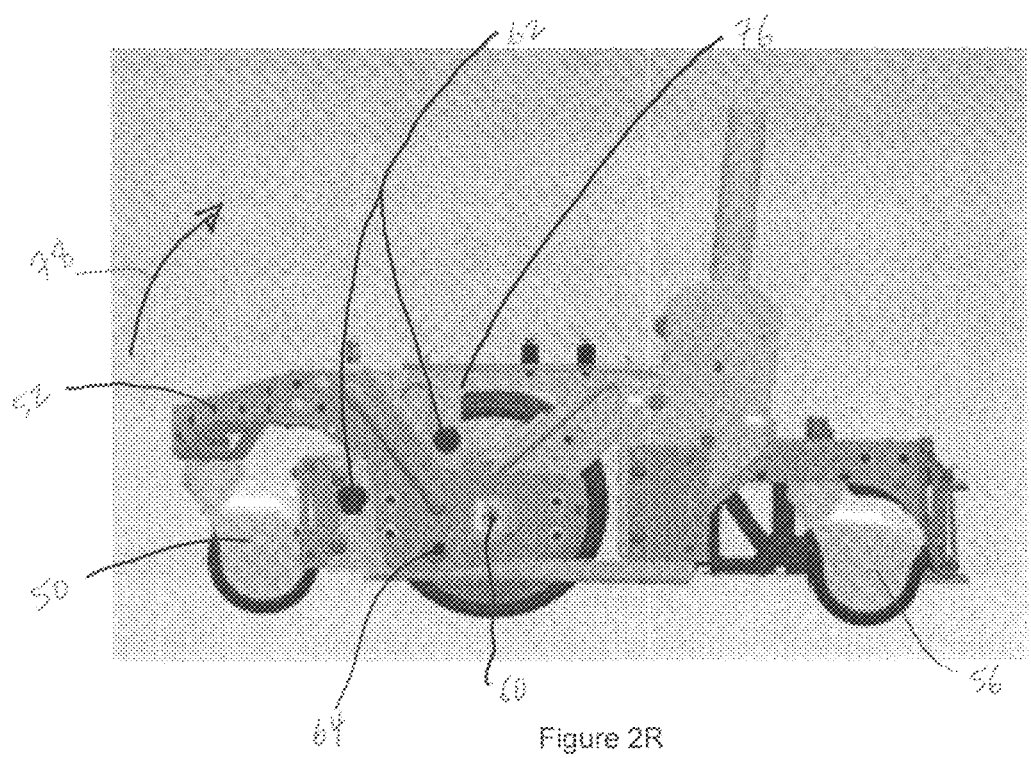

Referring to FIG. 2N, with the left main wheel removed, the wheel mounting feature (60) on a bracket coupled to the movable front caster suspension arm (52) is visible, as is the axis of rotation (64) of the front caster suspension arm (52) relative to the main mobile base frame (76) or "battery tray assembly". We have found that having the front caster capable of rotating upward relative to the main mobile base frame (76), as shown in FIG. 2R, assists with retaining stability of the overall remote mobile workstation (4) when the remote mobile workstation (4) encounters a slope, such as an ADA-approved wheelchair ramp, or a floor obstacle, such as an electrical cord or step in the floor surface. The mass of the remote mobile workstation (4) biases all five wheels to stay on the ground, but when the front or rear wheels of the remote mobile workstation (4) encounter a slope or ramp, until the entire set of wheels is approximately co-planar on the slope or ramp, the front wheel and associated suspension arm (52) are free to rotate up relative to the main mobile base frame (76), increasing the odds of keeping all five wheels in contact with the ground surface, and thereby increasing stability as well as controllability (the control system may be configured to prefer that the driven wheels, in the depicted embodiment the wheels 40, remain in contact with the ground surface). When an obstacle, such as a power cord or uneven floor, is encountered during movement/navigation of the mobile base (34), the rotating action of the front wheel and associated suspension arm (52) again prevent dramatic pitching of the entire mobile base (34) assembly by rotating up and out of the way to accommodate the obstacle as the mobile base (34) navigates over the obstacle. Referring back to FIG. 2O, two range-of-motion limiting cushion pads (62) enforce a rotational range of motion upon the suspension arm (52) and associated front caster (50). With the outer bumper skin removed from the front bumper, the underlying bumper cushion (44), made from a compliant material such as polyurethane in an energy-absorbing geometry such as a waffle geometry as shown, is visible. A similar construct underlies the rear bumper skin (46), as shown in FIG. 2P (element 70). In another embodiment, one or more of the wheels or casters may be coupled to the main frame of the remote mobile workstation using a damped suspension to assist with damping and/or shock absorption. Gyro**

Figure 2S:
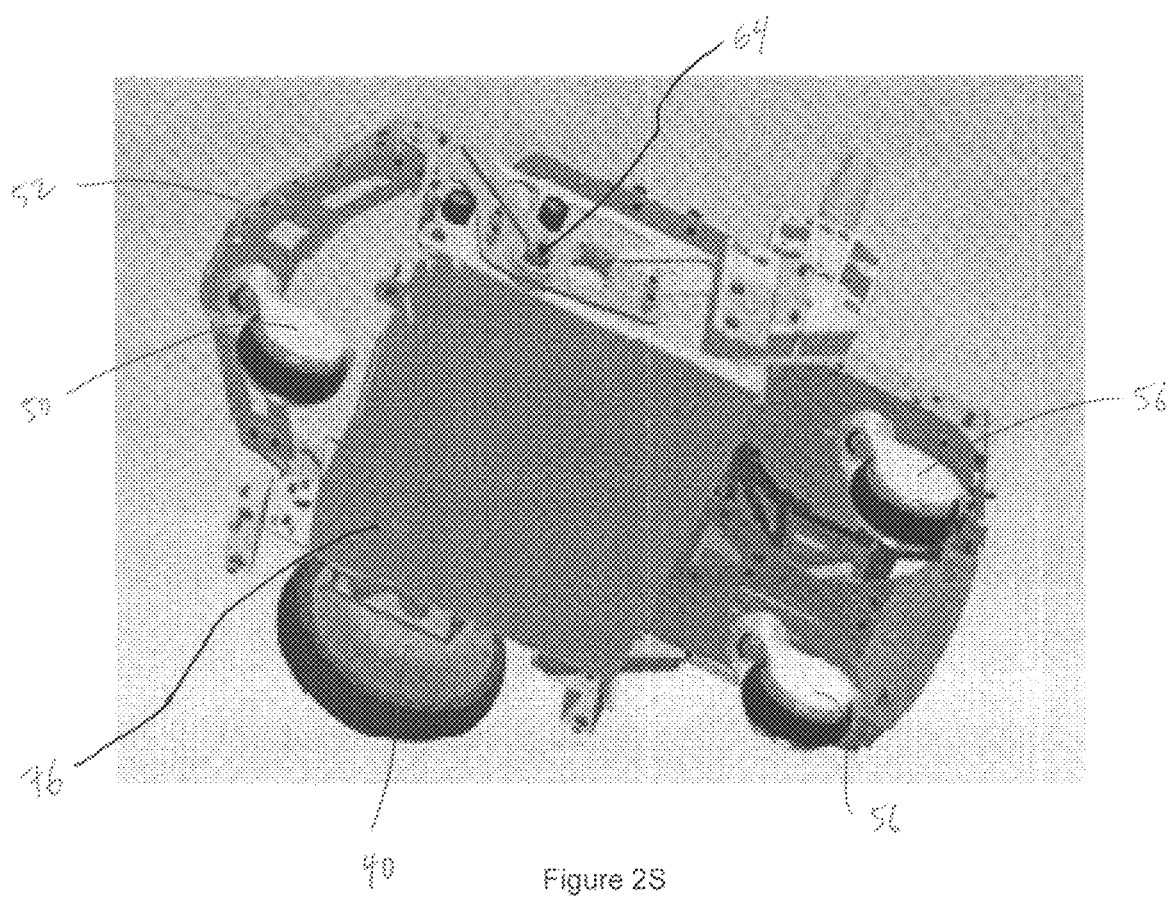

FIG. 2P shows the battery cover assembly removed to reveal the underlying battery (68), which preferably is a 12 volt DC automotive style battery, such as the 51 amp-hour battery sold under the tradename Dominator® by Deka, Inc. A rigid bumper substructure (72) is shown coupled to the main frame, or "battery tray assembly", (76) of the mobile base (34). Referring to FIG. 2Q, with the rigid substructure (72) removed, the front caster (52) is more visible. The rear rigid bumper substructure (74) is visible in FIG. 2Q with the rear bumper cushion (70) removed. FIG. 2R depicts a main frame (76) rotatably (78) coupled to the front caster suspension arm. FIG. 2S shows an underside orthogonal view of a similar assembly to illustrate the positions of the five wheels relative to each other. Again the two main wheels (4—only one of the two shown in FIG. 2S) are in differential drive formation, with active electromechanical drive capability through brushless hubmotors integrated into these wheels (4). The front caster (50) and rear casters (56) are free to roll along the floor surface, and also to rotate about the caster axis of rotation.

Figures 2T, 2U:
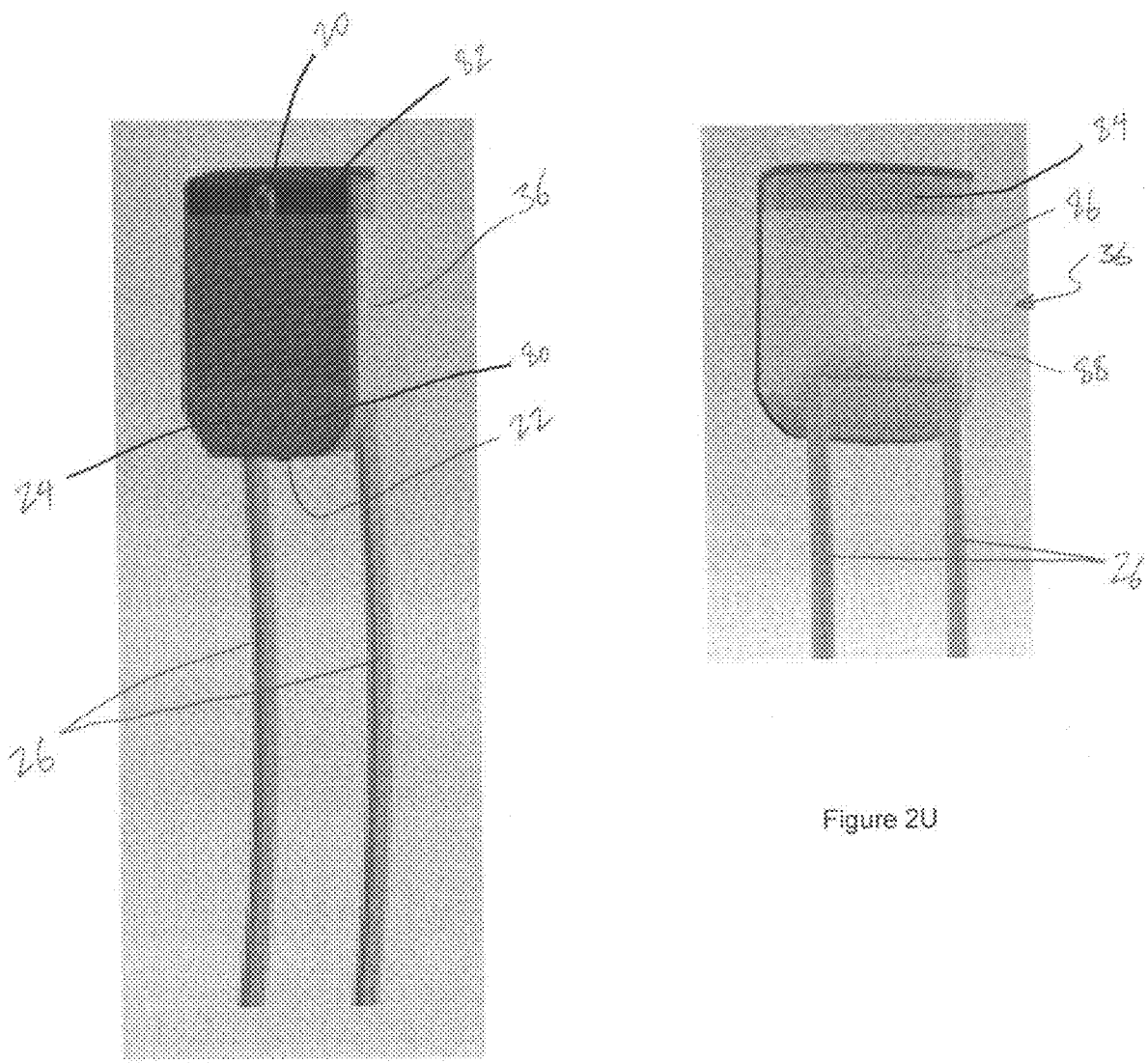
FIGS. 2T to 2Z-12 illustrate orthogonal views pertinent to embodiments of a partially-assembled remote mobile workstation of remote presence system in accordance with the present invention, with emphasis on head componentry.
Figure 2V:
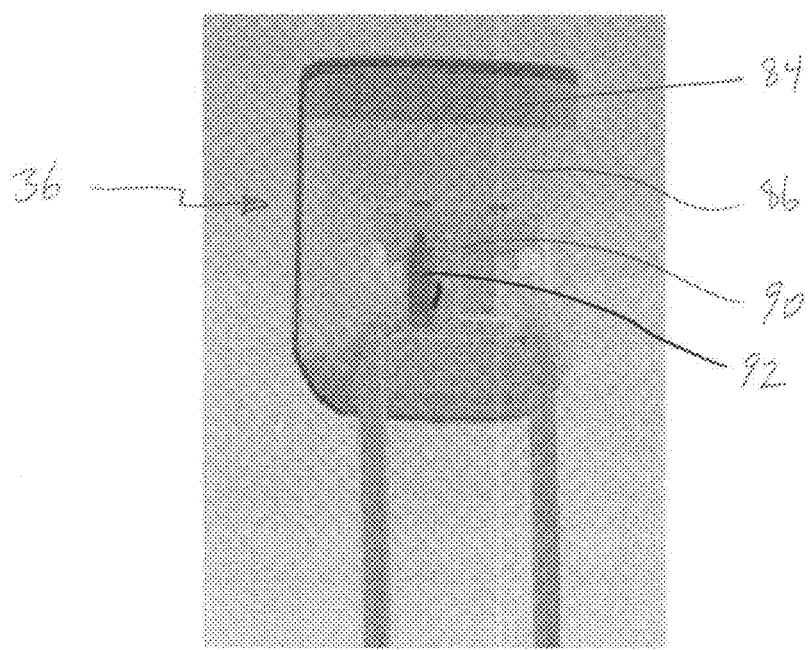
Figure 2W:
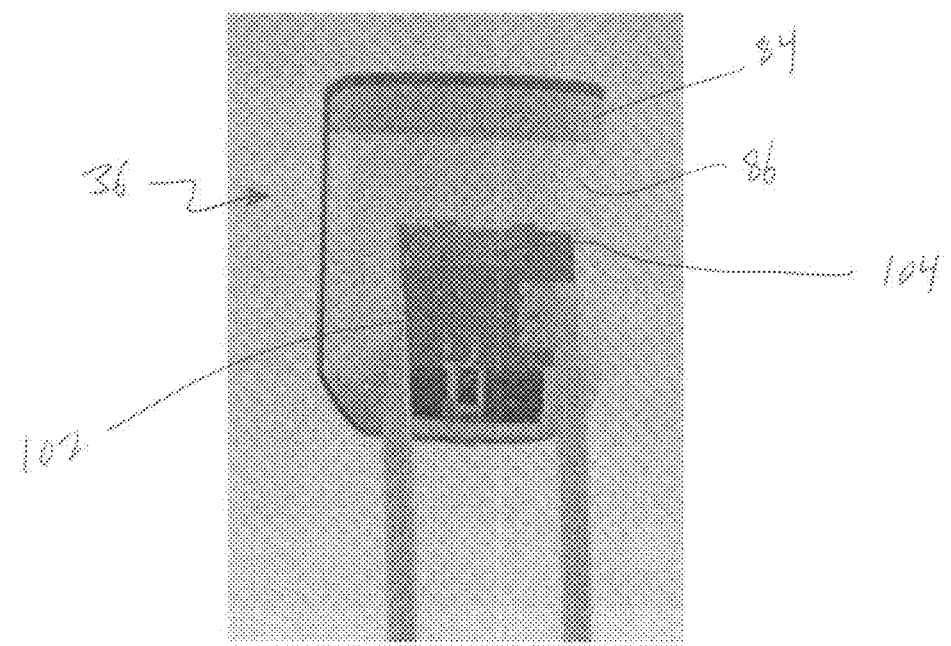

Referring to FIGS. 2T to 2Z-12, various aspects of the head assembly (36) are shown in sequential stages of disassembly. FIG. 2T illustrates spine members (26) still coupled to the head (36). The head assembly (36) comprises a main camera (20), a downward oriented navigation camera (22), a forward-oriented speaker (24) covered by a speaker grill (80), a top front microphone cover grill (82), and a top rear microphone grill (84), shown in the rear orthogonal view of FIG. 2U. A rear housing (86) is fitted with a removable lid (88) to cover a compartment (90), as shown in FIG. 2V, which may be utilized to house portions of one or more wireless communication devices, such as a WiFi radio and/or access point, and/or a cellular modem, such as those featuring 3G or 4G LTE wireless connectivity technology. Indeed, the remote mobile workstation (4) may feature one or many wireless communication devices or configurations (92), as described, for example, in U.S. Patent Application No. 61/621,414 for "System for wireless connectivity continuity and quality", which is incorporated by reference herein in its entirety. FIG. 2W shows a view with one more rear panel removed to reveal part of the main backpanel (102) and main computing board (104) below.

Figure 2X:
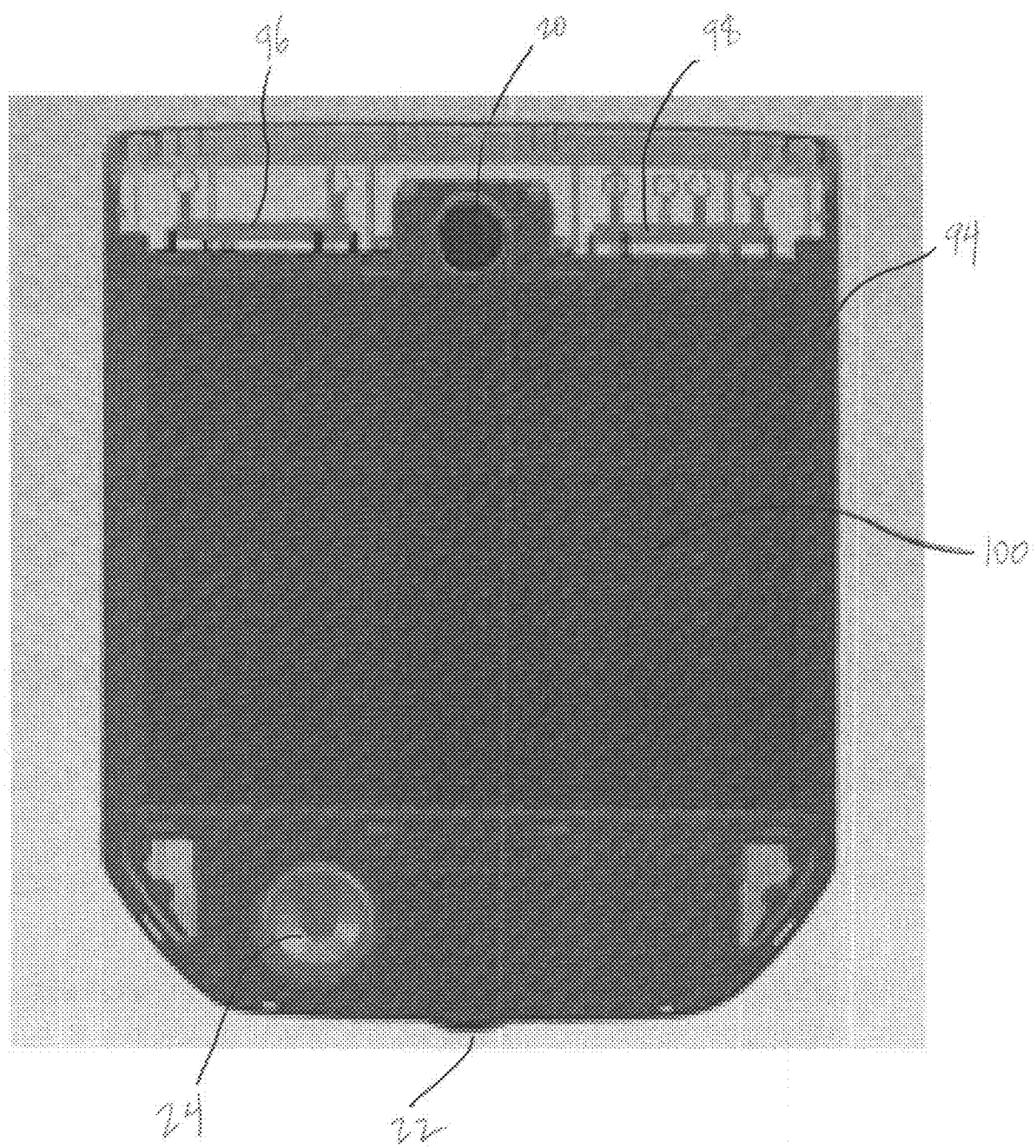
Figure 2Y:
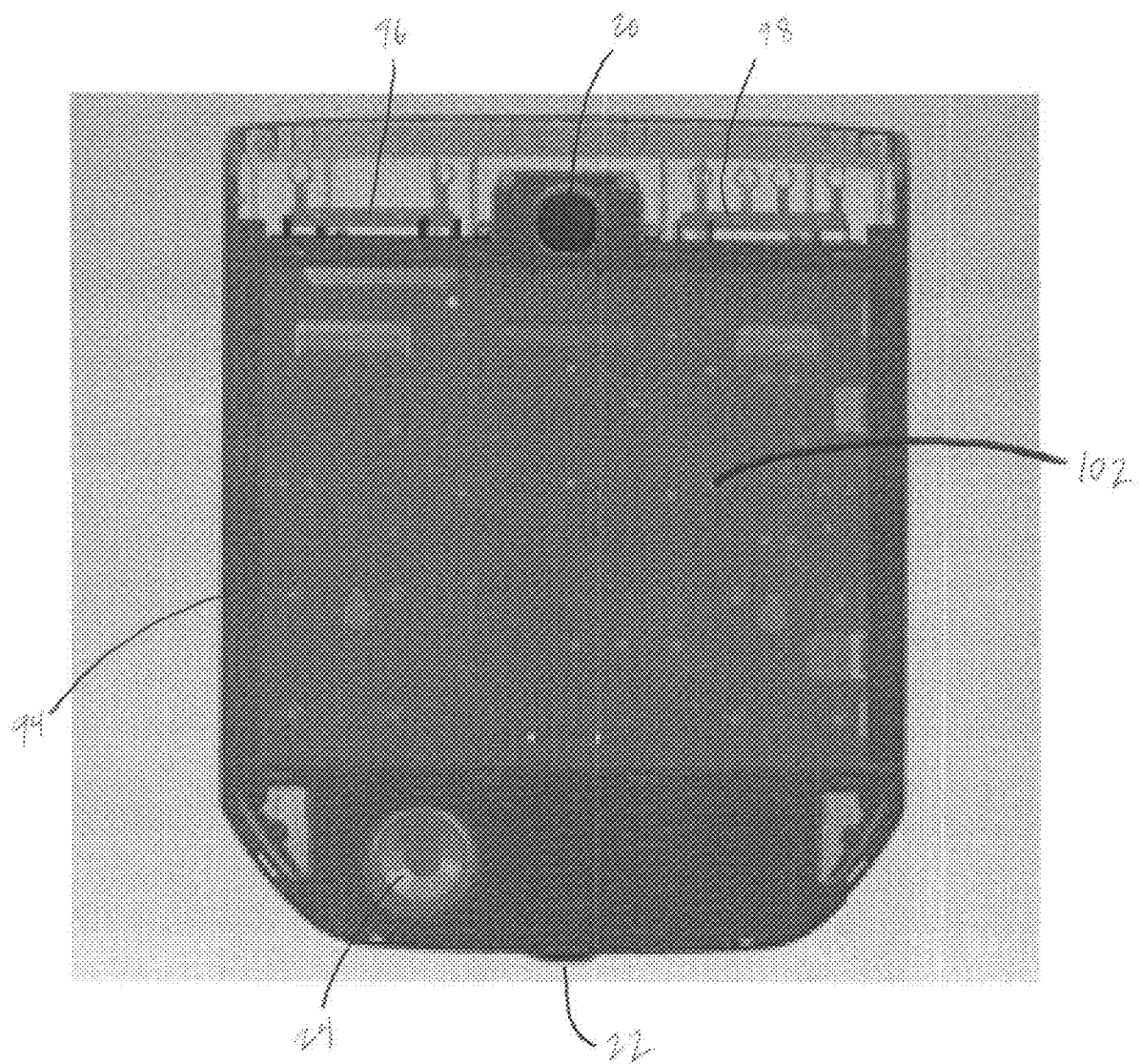
Figure 2Z:
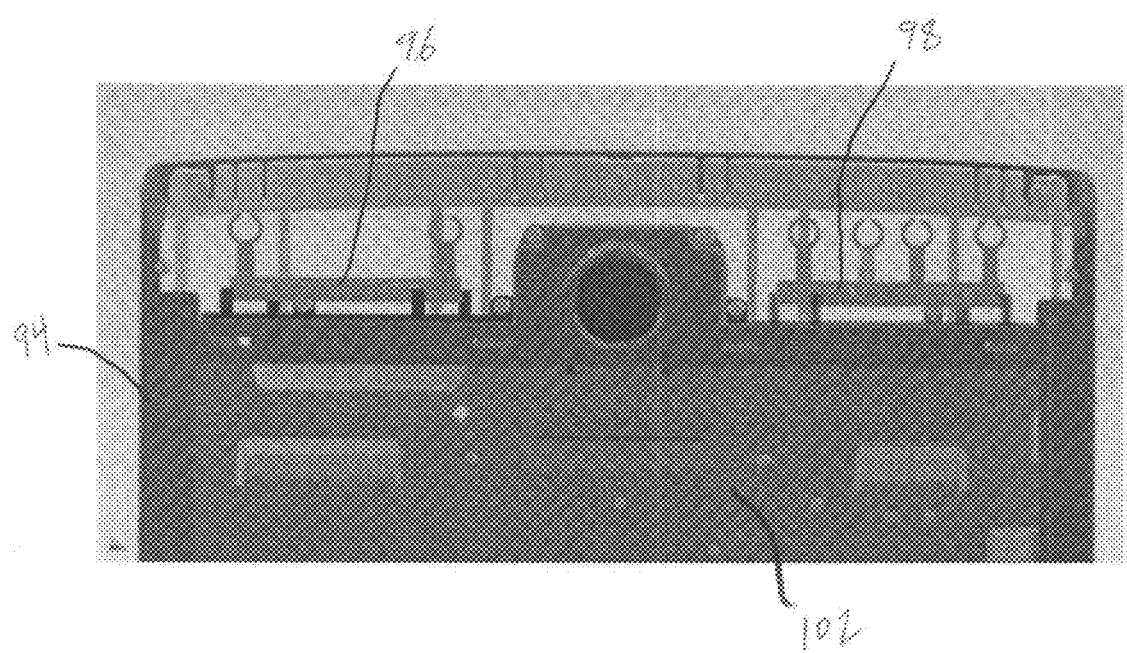
Figures 1, 2Z:
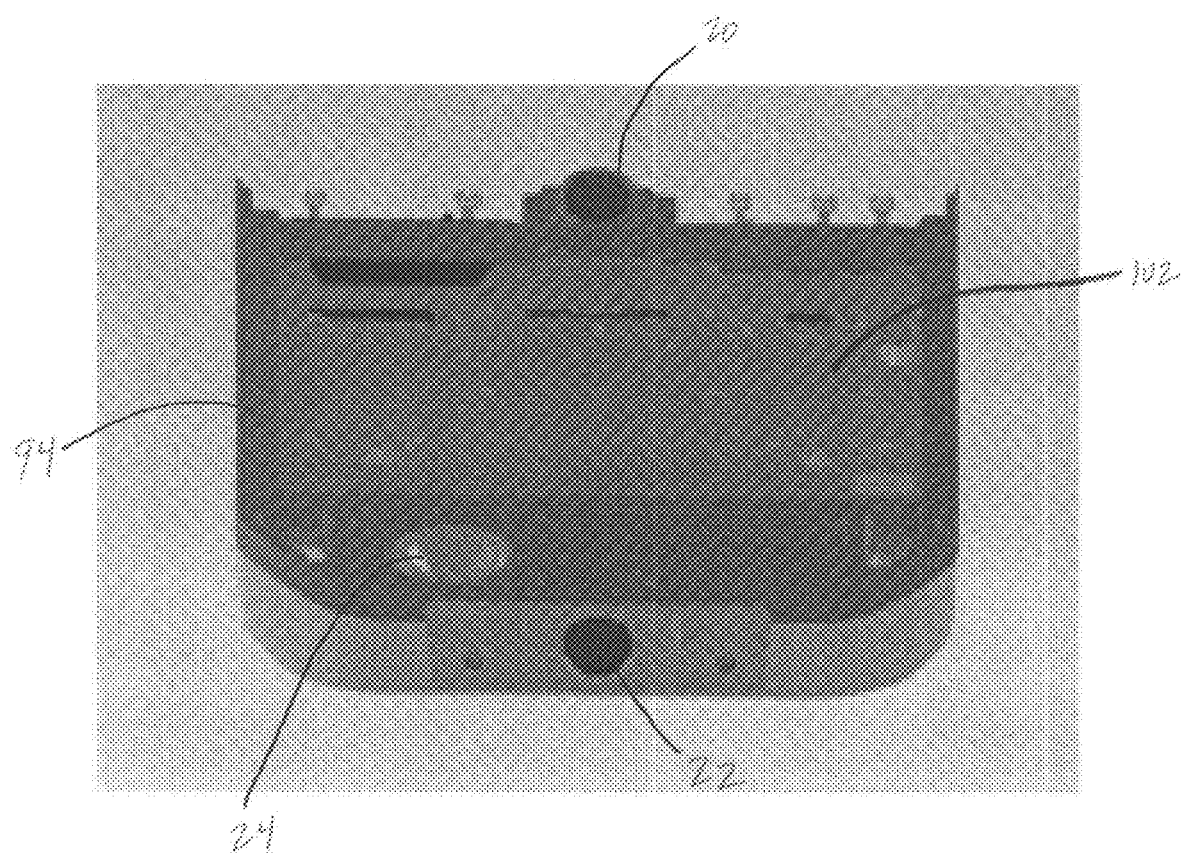
Figures 2, 2Z:
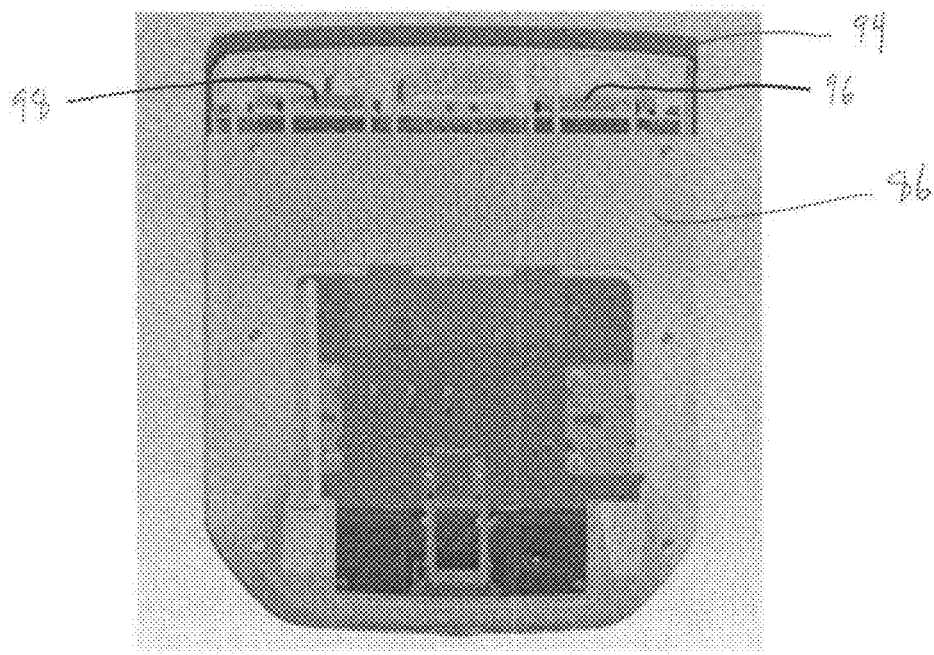
Figures 2, 2Z, 3:
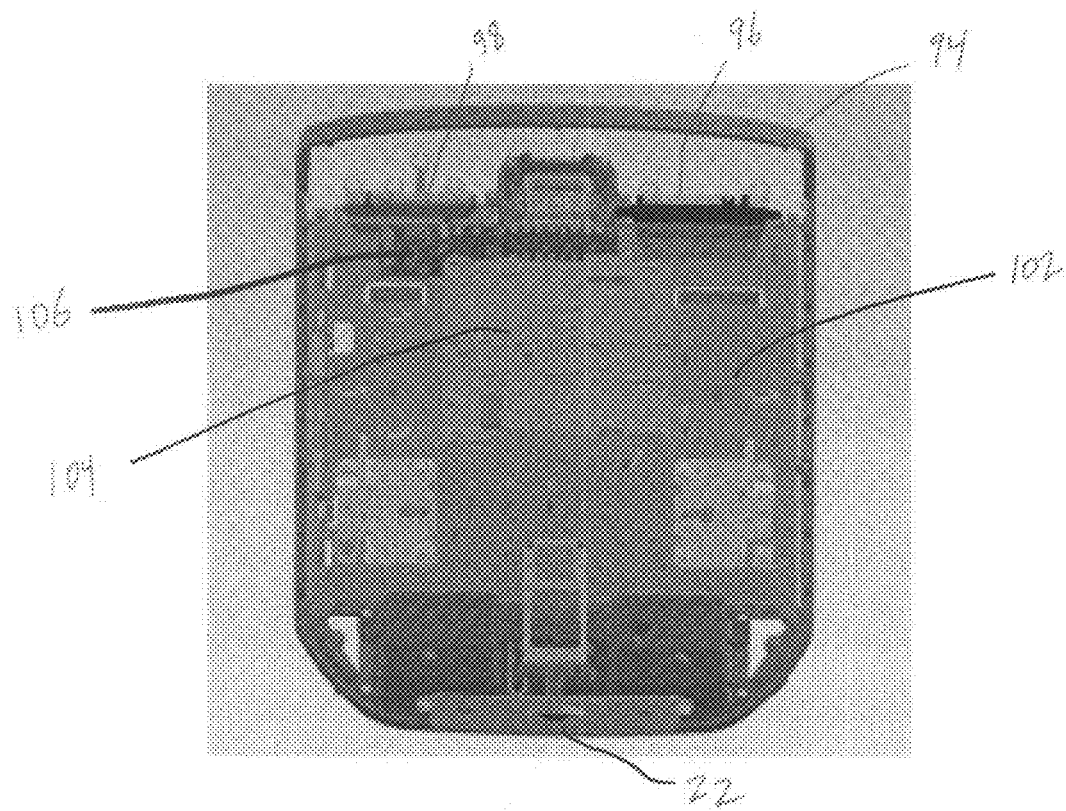

Referring to FIG. 2X, with the grills removed, microphone mounting assemblies (96, 98) are visible, along with the loudspeaker (24) below. The main display (100), preferably a relatively low-energy flat panel display with resolution of at least 640×480 ("480p") and an aspect ratio of 4:3, such as those available from Samsung Corp. or South Korea, is surrounded by a perimeter housing element (94). Referring to FIG. 2Y, with the display removed, the front side of the main backpanel (102) is visible; the main backpanel preferably comprises a relatively rigid structure. FIGS. 2Z and 2Z-1 illustrate slightly different views of the assembly of FIG. 2Y. FIGS. 2Z-2 and 2Z-3 illustrate backside views of a similar assembly, the version in FIG. 2Z-3 without the rear head housing (86) in place, thereby revealing the main computing board (104), preferably featuring a relatively high-performance microprocessor such as one of those sold under the tradename Core® by Intel Corporation, and a sound processing board (106) capable of suppressing echo and noise, as described further below. Referring to FIGS. 2Z-4 and 2Z-5, right (96) and left (98) microphone mounting assemblies are depicted, wherein button-style microphones may be press fitted into the small microphone tongs (110) coupled to each of the depicted suspended masses (96, 98) to dampen noise and vibration which otherwise may be passed by the remote mobile workstation (4) to the microphones (not shown here to assist in illustrating the geometry of the tongs and suspensions). The depicted embodiment features five front-oriented cardioid button microphones, and one rear-oriented cardioid button microphone; suitable button microphones are available from vendors such as MWM or PrimoMic of Japan. Referring to FIGS. 2Z-6 and 2Z-7, the microphones preferably are coupled to the microphone tongs (110), which comprise extensions of the suspended microphone mounting assemblies (96, 98); these assemblies preferably are coupled to four structural posts (108) by four damping/coupling structures, such as four figure-8 geometry Santoprene®—from Exxon Corporation) damping elements twisted in an approximately 45 degree mounting configuration as shown; the posts (108) are coupled to a base plate (112), which may be coupled to the head structure. We have found such a configuration to provide desirable microphone damping qualities given the mobility scenario presented herein (i.e., isolation from vibrations that are related to system mobility and system vibrations). Another embodiment may feature a total of eight microphones, with two rear-facing and six forward facing, to enhance sound detection and management. FIGS. 2Z-8 to 2z-11 feature further states of disassembly, illustrating the underlying speaker enclosure (114), RF antenna (116), and power inverter (118) to assist with the monitor component power supply.

Figure 3A:
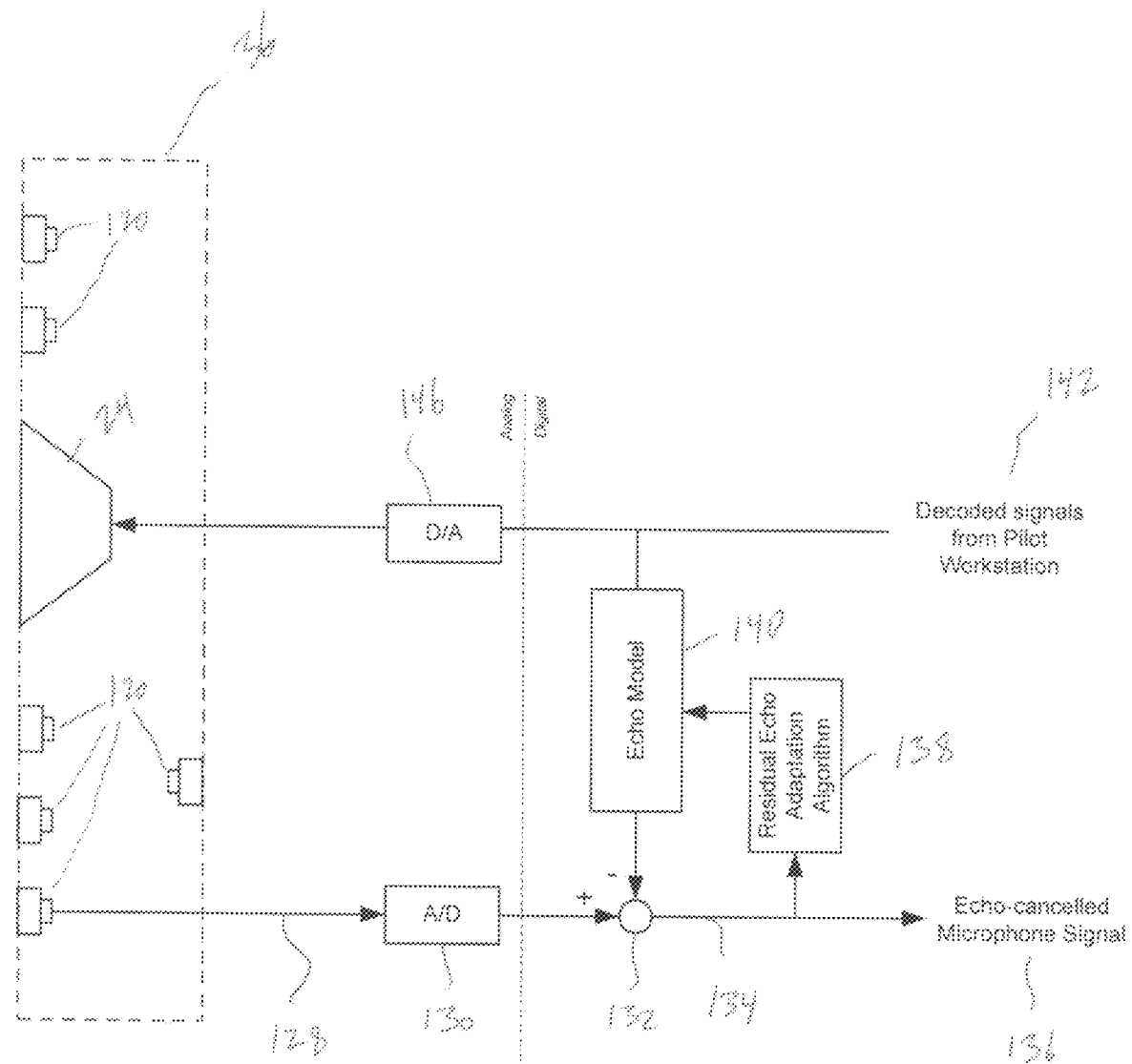
FIGS. 3A-3I illustrate schematics and charts pertinent to embodiments of an audio subsystem for a remote presence system in accordance with the present invention.

Referring to FIGS. 3A-3I, various aspects of audio subsystem embodiments are illustrated. Referring to FIG. 3A, a head (36) comprises 5 forward facing microphones (120) and one rear-facing (120) microphone, along with a forward facing speaker (24). Looking at one microphone for illustrative simplicity, an analog signal comes from the microphone (128), is converted to digital (130), and goes through simple algebraic subtraction with an echo model (140) based upon signals that are being output to the speaker (24) in the outgoing loop from the pilot workstation (142). Error that remains when no signal is incoming into the microphone may be called residual error (134), and may be dealt with using a residual echo adaptation algorithm, resulting in relatively echo-free microphone signal (136) from the subject microphone which may be further processed. Audio componentry such as that depicted in FIGS. 3A-3H may be implemented as part of the hardware and firemote mobile workstation are the comprises a sound board, such as that described above in the head component of the depicted remote mobile workstation and described as element 106; suitable sound boards are available from sources such as Signal Essence of Mountain View, Calif.

Figure 3B:
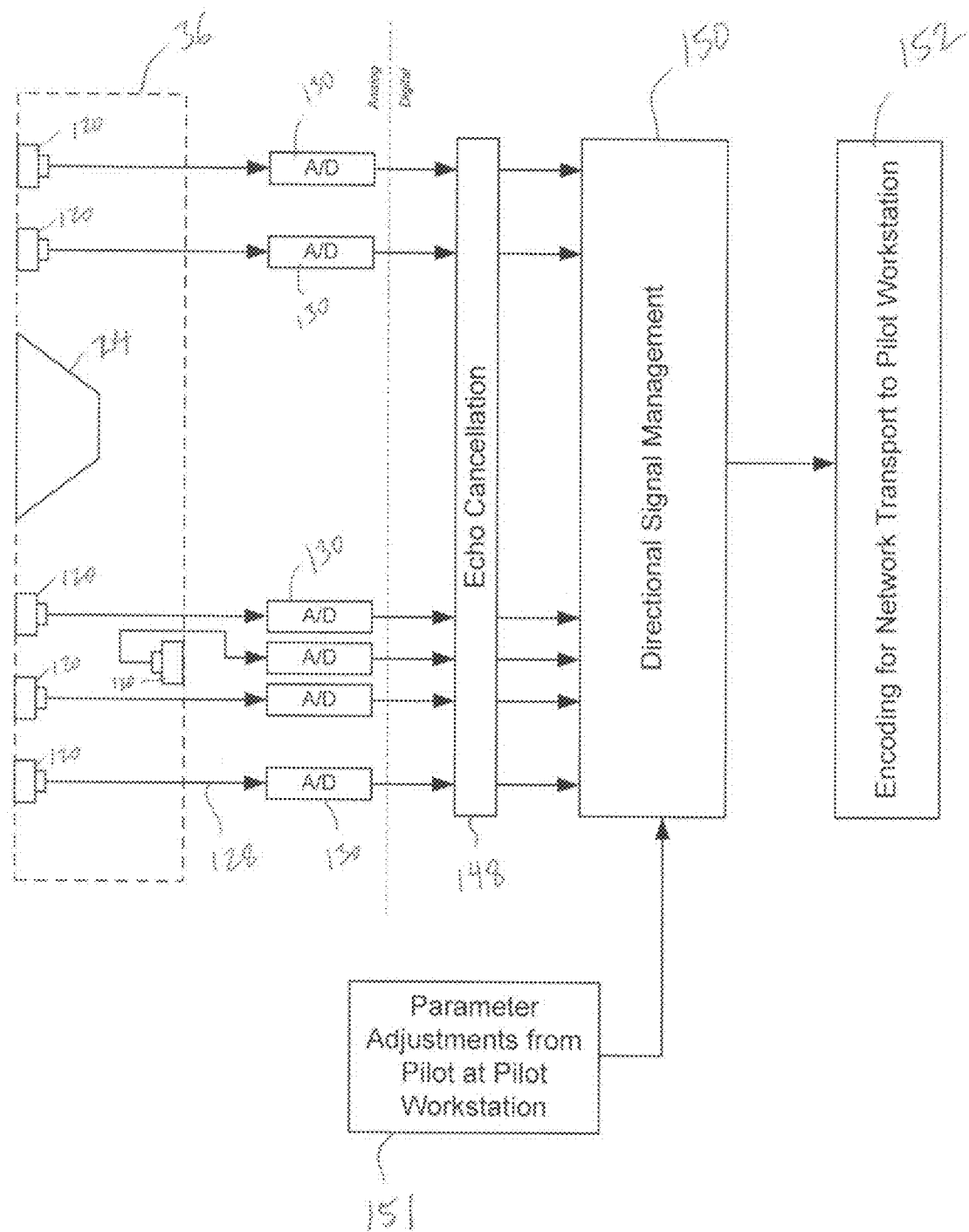

Referring to FIG. 3B, with each microphone undergoing echo cancellation on the sound board (106) as described above (148), directional signal management (150) may be conducted to help "focus" on particular sources of sound before encoding and transport to a pilot station (152). The pilot station may also facilitate a pilot's adjustment of certain parameters for the directional signal management (151), such as a spatial zone or frequency of focus, as described below.

Figure 3C:
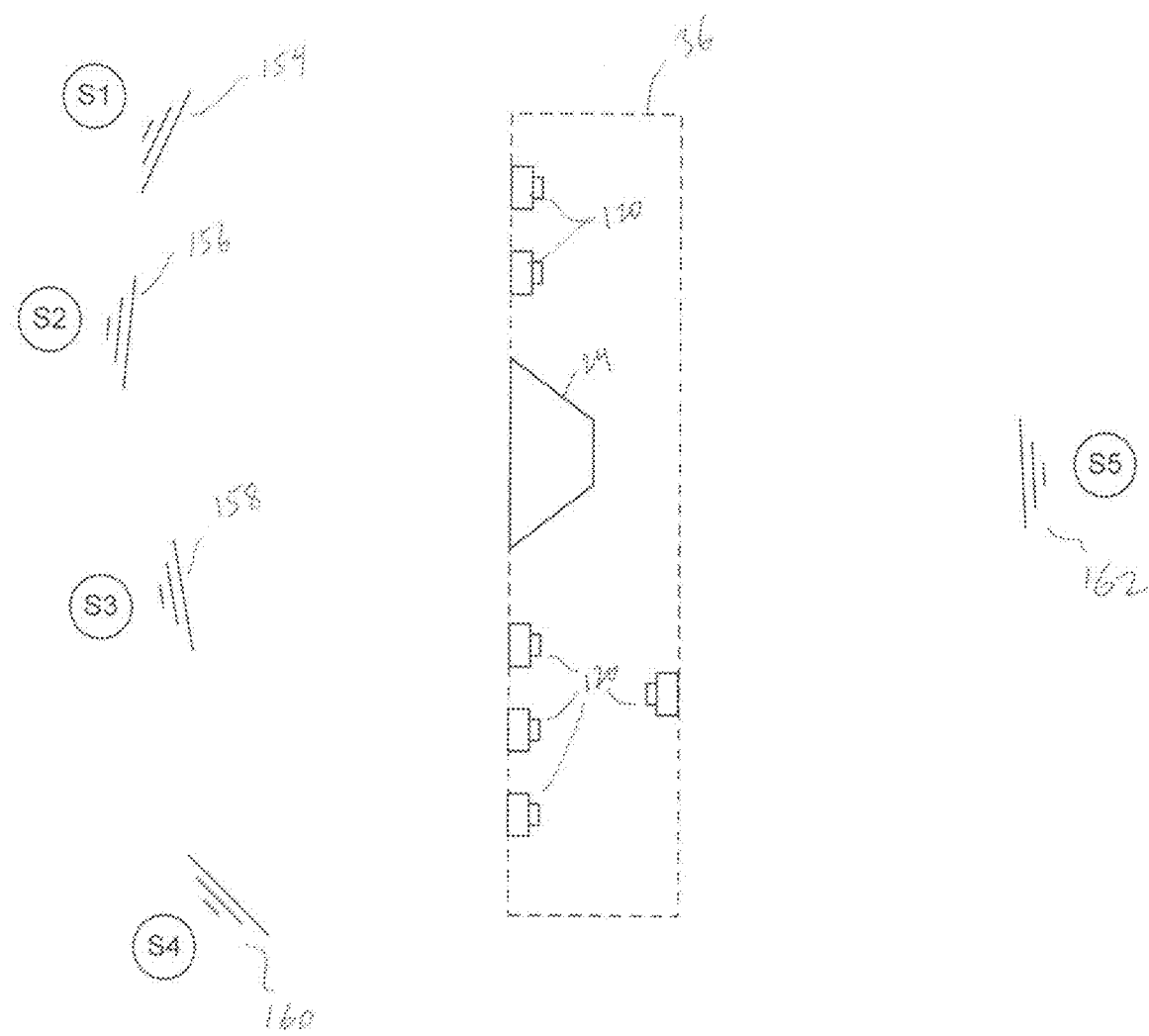
Figure 3D:
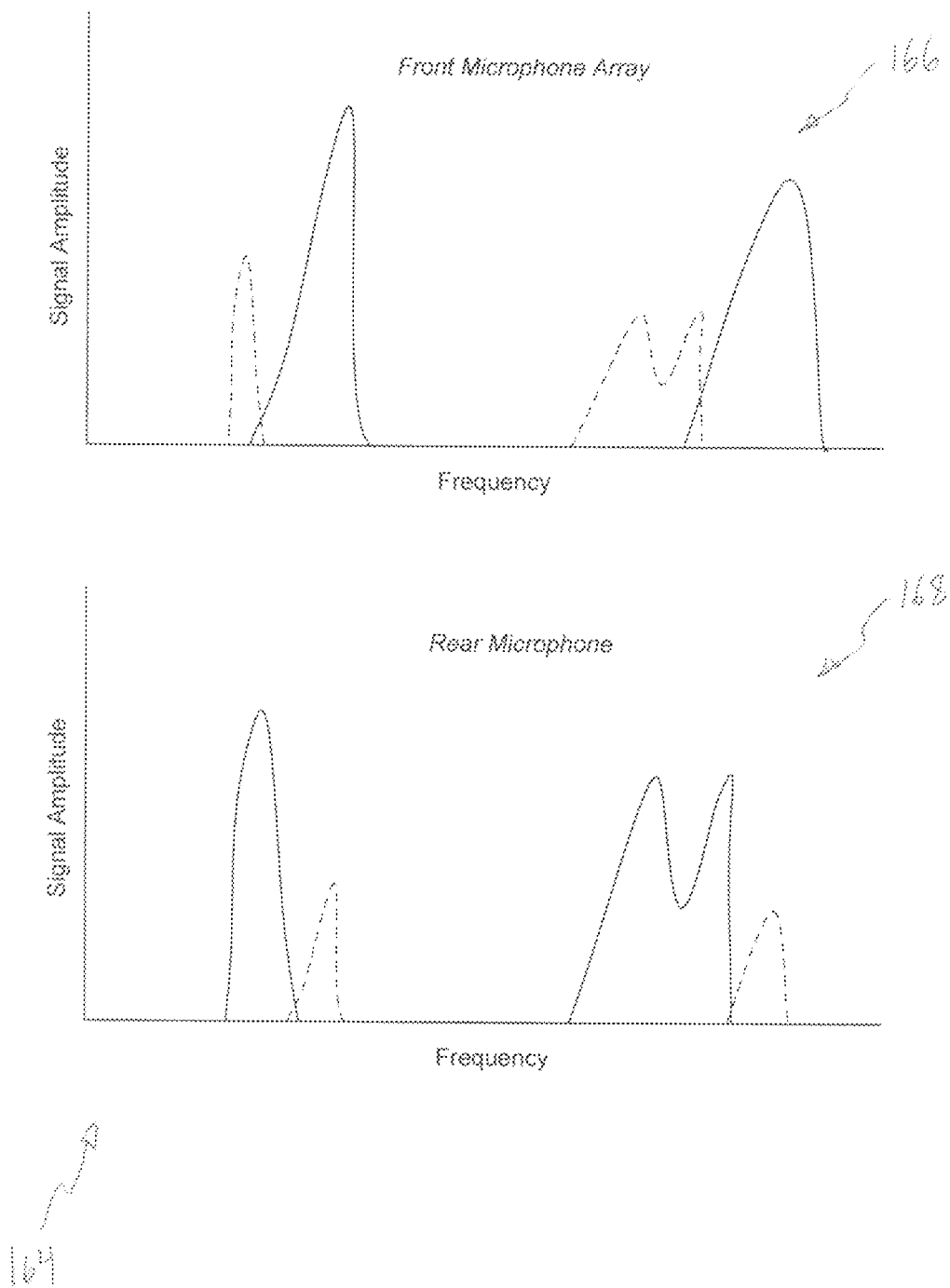

Referring to FIG. 3C, in one exemplary scenario, three forward sound sources (S1-S4) are creating sound wave fronts (154, 156, 158, 160), along with a rearward source (S6) creating a sound wave front (162). Using time of flight mathematics and geometry, the approximate location of the source may be calculated given the timing of arrival of each wave front with each of the microphones (120) on the front panel, which together essentially comprise a linear array of microphones (120). Referring to the comparison chart display (164) FIG. 3D, signals captured by the rear microphone, plotted in the bottom chart (168) may be utilized to eliminate remnants of such signals that are detected in the front microphones, plotted in the top chart (166). Greater frequency separation between the signals to the rear and the signals to the front assists with the noise mitigation; for example, if a very low-frequency source is rearward and most of the sound sources from the front are relatively high frequency, then separation and filtering can be relatively successful. The dashed plots show remnants of the rear signals in the front microphone input, and remnants of the front signals in the rear microphone input. Various weights may be applied to the result of the rearward microphone, but too much such weighting may result in extracting too much signal from the front—thus some bleedthrough generally is acceptable.

Figure 3E:
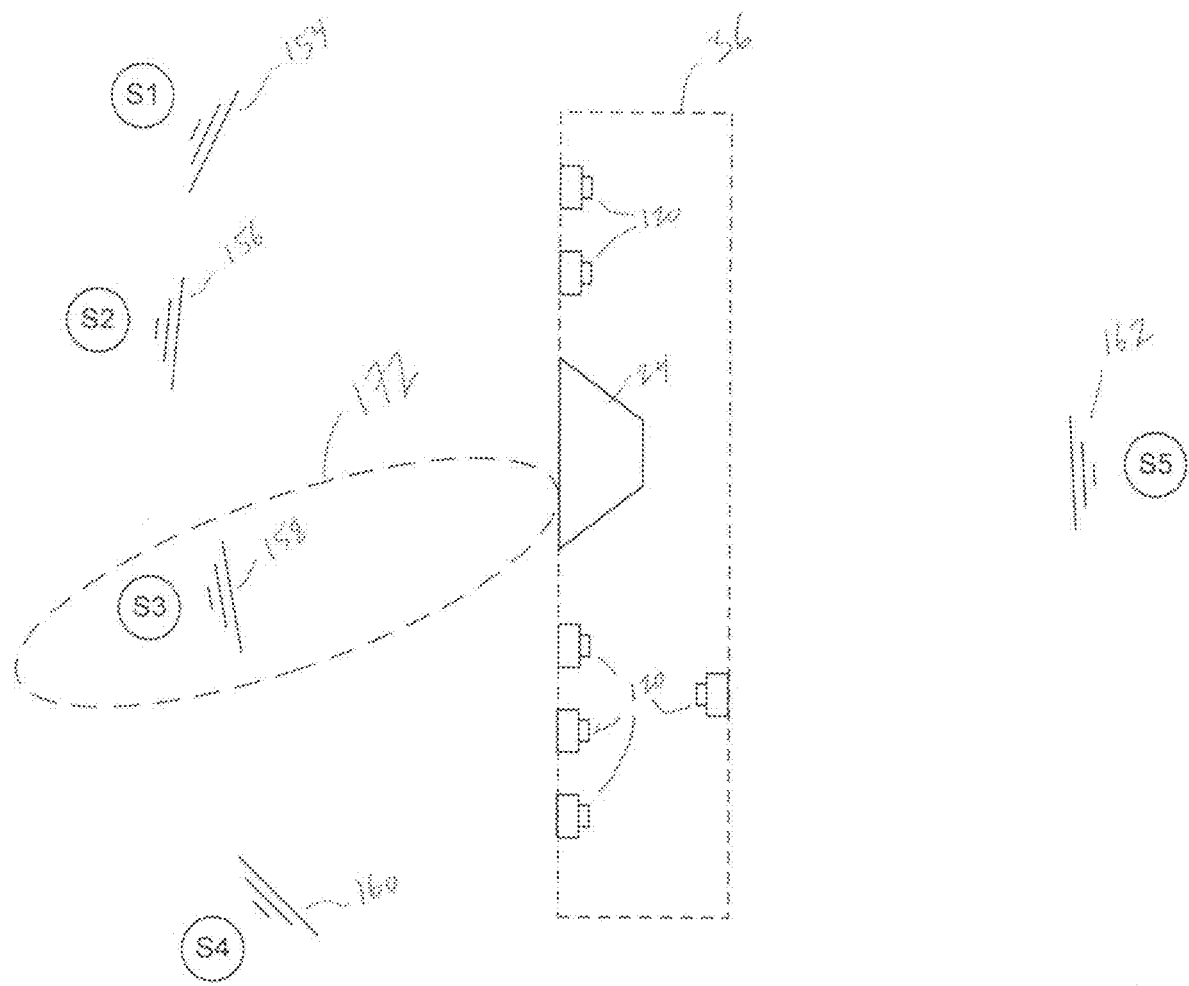
Figure 3F:
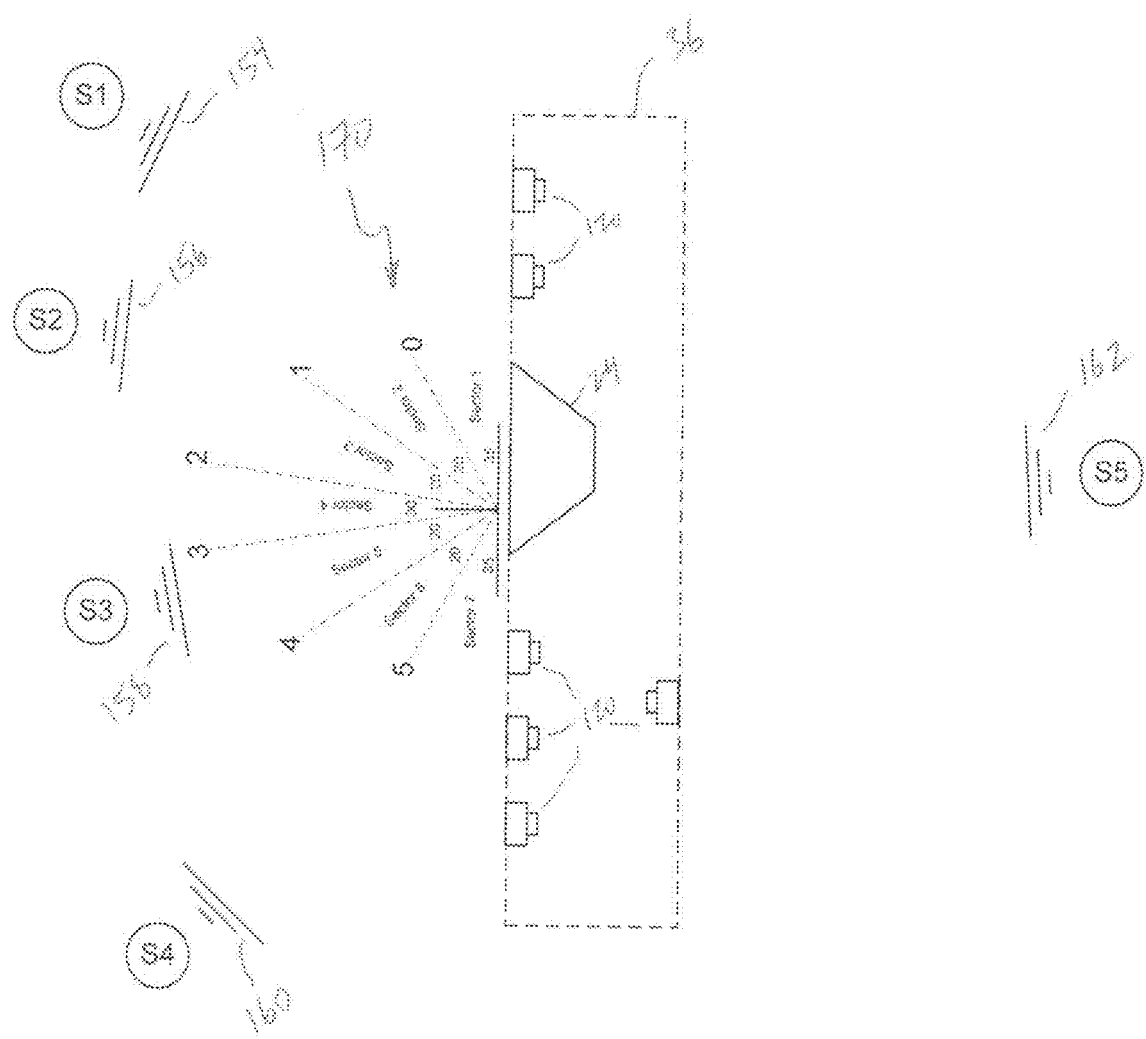

Referring to FIG. 3E, with technologies such as RADAR, what is referred to as the "narrow band assumption" may assist in focusing a "beam" (172) close to a particular source, such as S3, to enable focused detection. Human voice style acoustics, on the other hand, is relatively wideband and multi-octave, which makes narrow beam focusing more difficult. Notwithstanding this, small differences in emphasis may be significant to a pilot operating the remote device and listening from different location, and referring to FIG. 3F, predetermined sectors (labeled in the illustration as Sectors 1-7) may be created through selection of microphone hardware and array beam focusing techniques to emphasize sound sources in the various sectors. The pilot user interface may feature an overlay of the sector reticle to allow the pilot to select, such as with a mouse pointing device, one or more sectors of desired focus; generally with rejection of as much noise as possible from the rear-oriented microphone. Such selection parameters may be fed into the process, as briefly described below in reference to FIG. 3G (element 151). In another embodiment, it may be desirable for the pilot to do the equivalent of hearing what is going on in back of his remote mobile workstation head, in which case it may be desirable to emphasize the signal coming from the rearward microphone and attempt to reject bleedthrough from the front microphones. One aspect of the pilot user interface may allow for a selectable listening from the rearward direction mode.

In another embodiment wherein drivetrain or other downward-located noise may be an issue, the system may feature a downward-oriented microphone to enable subtraction of this undesired noise.

In another embodiment, what is known as "head-related transform" algorithms may be utilized to present a pilot with simulated vectored or three-dimensional sound presentation, so that the remote pilot can wear headphones or have a particular loudspeaker setup at his pilot workstation and be presented with sound that seems to be 3-dimensional in its directionality, movement, etc, akin to the presentation often provided in a modern movie theater or "surround sound" configuration.

Figure 3G:
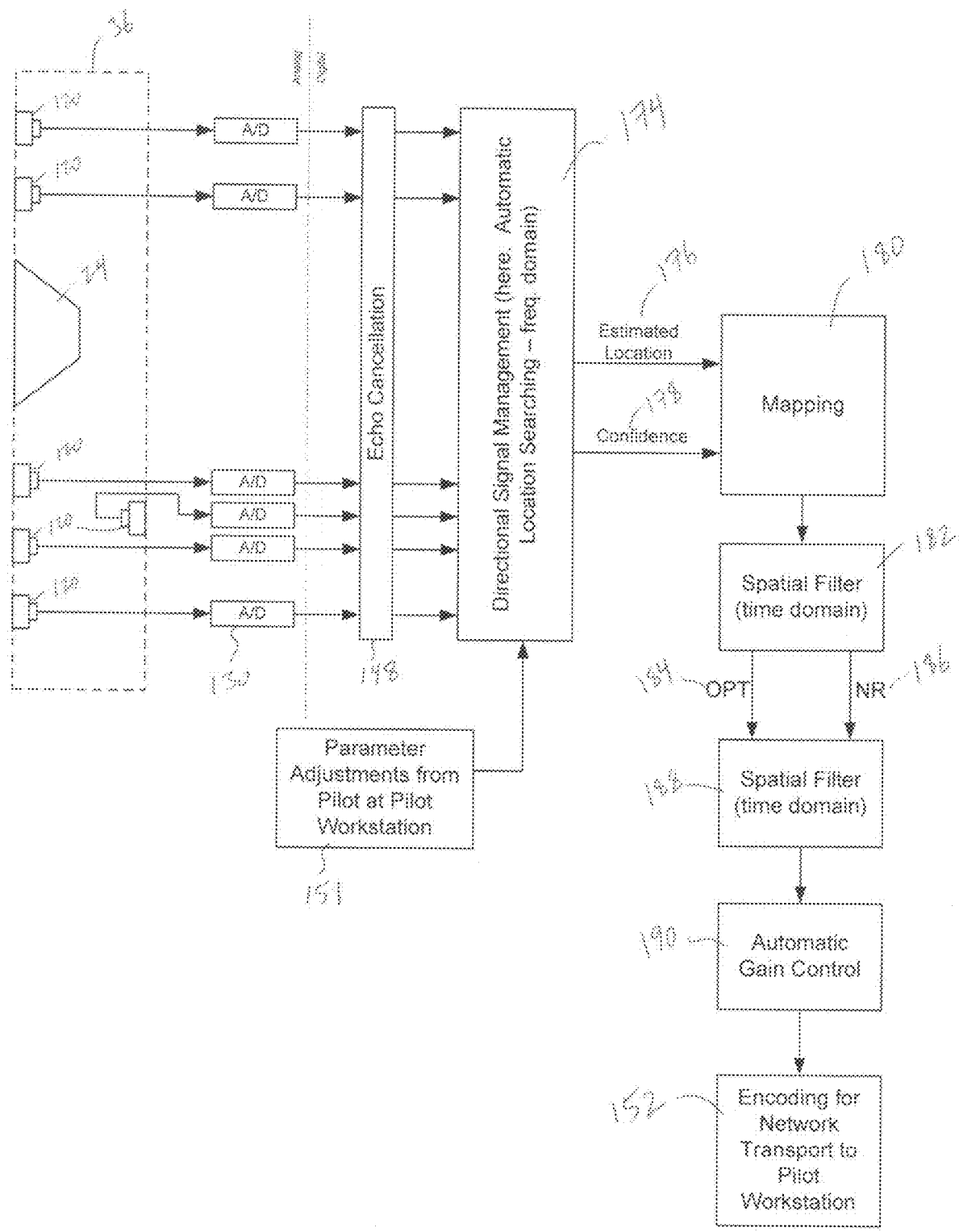

Referring to FIG. 3G, in another embodiment, source localization may be automated with source location searching (174) algorithms that output an estimated location (176) for a given source, along with a confidence (178) in that location. Such algorithms may be known as "group force search" algorithms, which may, for example, be configured to look in every possible direction and use wavefront timing across the various microphones to predict vectoring and/or positioning of the sound source. These may be input into a mapping module (180) followed by a spatial filter in the time domain (182) to output optimal (184) and noise reference (186) signals into a spatial filter module functioning in the time domain (188) and outputting to an automatic gain control (190), to be encoded for network transport to the pilot (152).

Figure 3H:
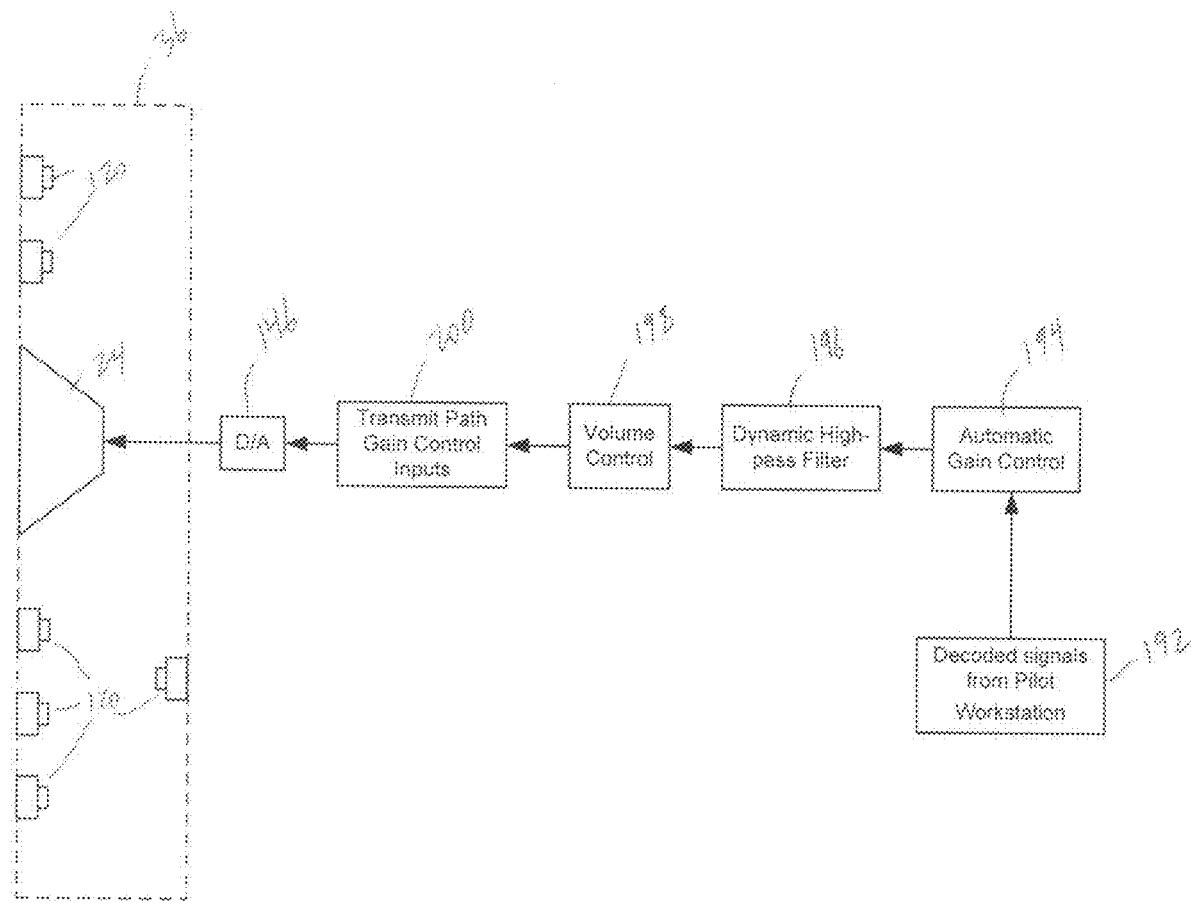
Figure 3I:
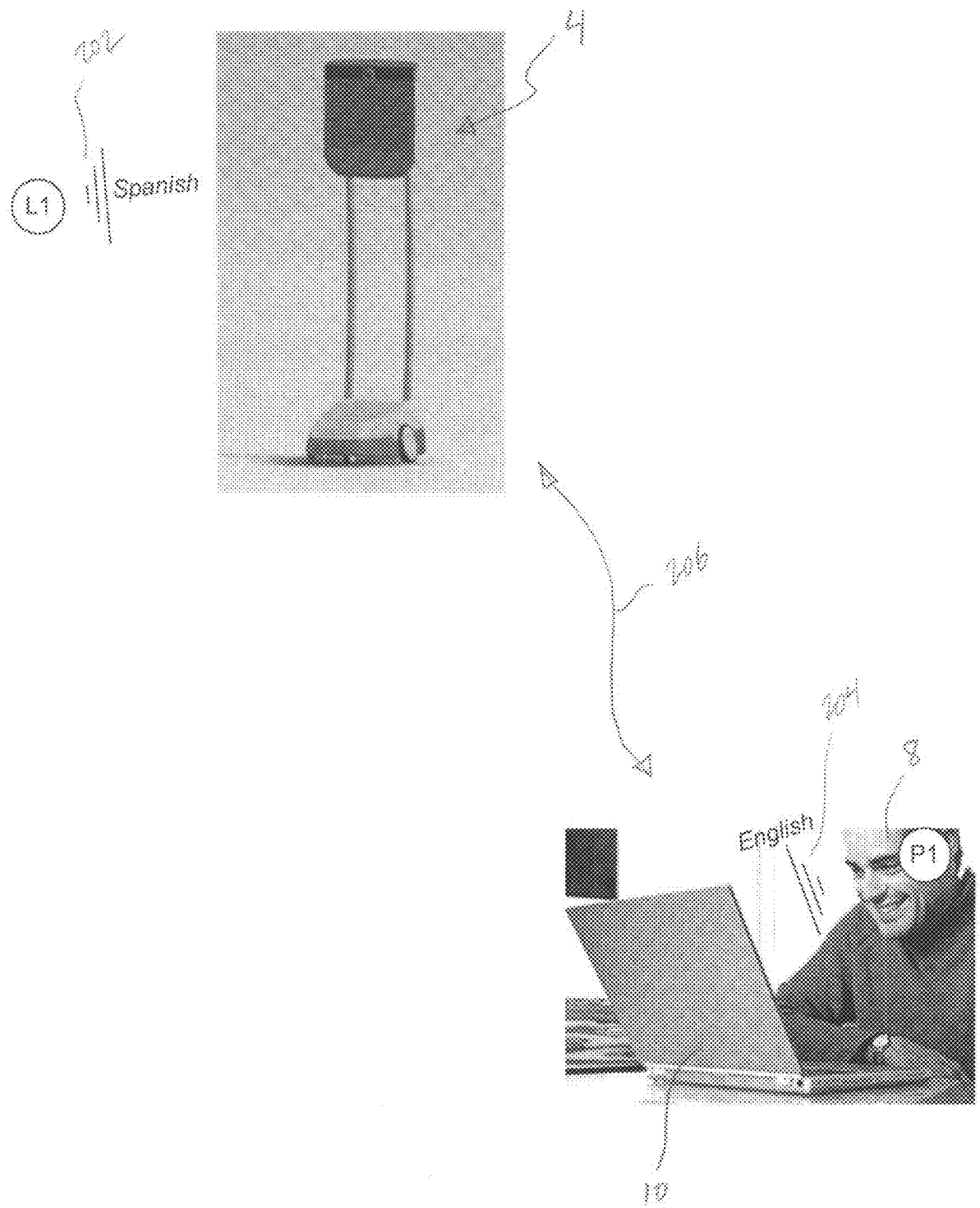
Figure 4:
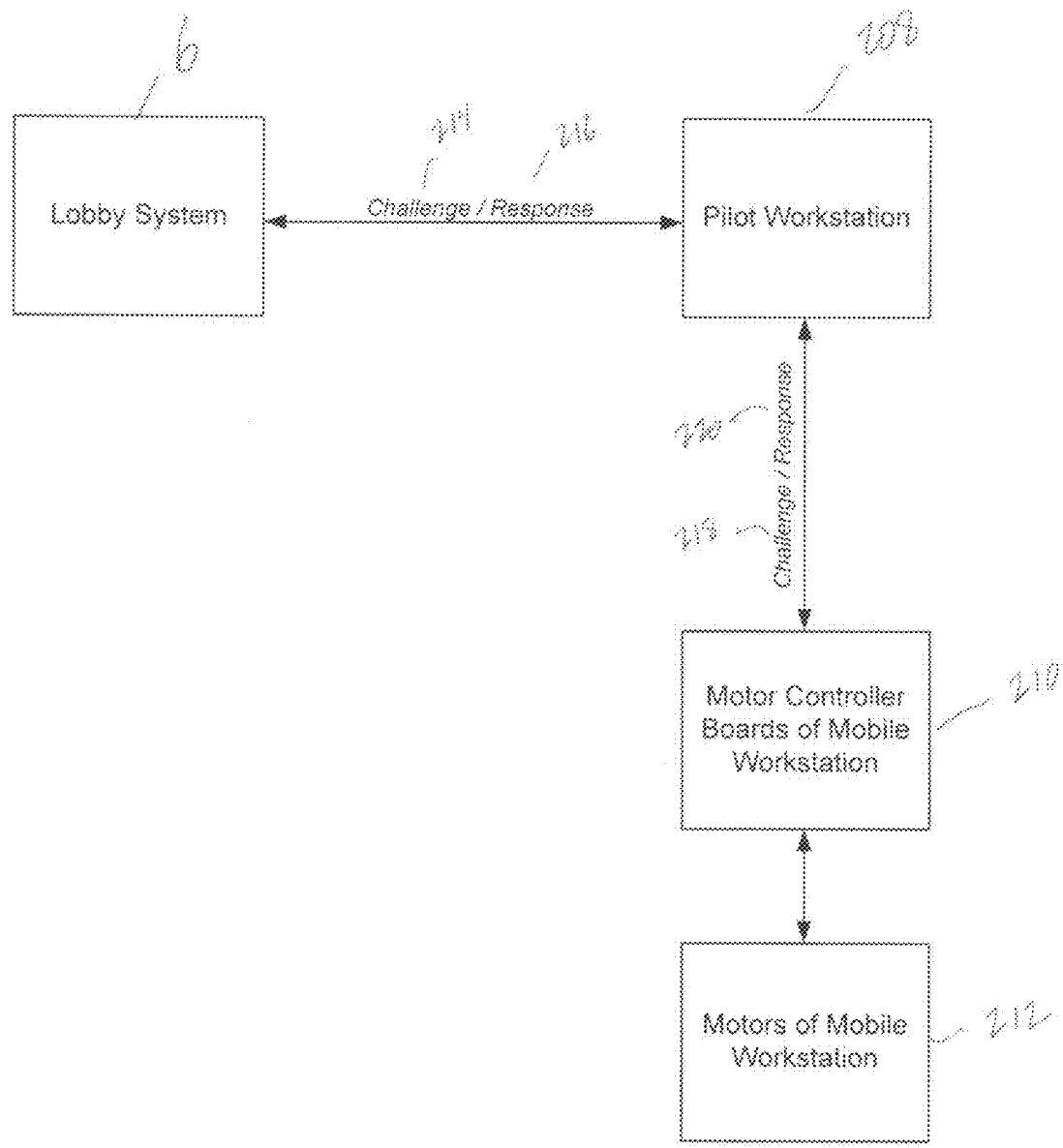

Referring to FIG. 3H, on the output side at the remote mobile workstation, decoded signals from the pilot workstation (192), coming in through peer to peer connectivity with the pilot workstation, may go through automatic gain control (194), dynamic high pass filtering (196), volume control (198), transmit path gain control (200), conversion to analog, and transmission to the loudspeaker (24) in the remote mobile workstation head (36) for broadcast to the locals around the remote mobile workstation (4). Various parameters in this chain may be remotely adjustable by the pilot (i.e., through software controls in the user interface of the pilot software), such as volume, to enable the pilot to speak at a relatively constant volume, but to select various modes of output on the local side, such as a "whisper" mode or "public speaking" mode. Referring to FIG. 3I, software algorithms such as those available from Nuance, Inc., or Dragon, Inc., may be utilized at various stages of the audio system (preferably as close to the microphone input as possible to avoid errors or losses before the conversion) to provide conversion of spoken word to text. Further, given textual natural language, one or more of the various software-based translation engines may be utilized to translate to almost any language before reproduction on the other end using closed captioning (say scrolled across the bottom of a display) or voice simulation; indeed, the voice simulation style also may be selected to simulate a particular accent, gender, etc. FIG. 3I shows an embodiment wherein an English-speaking (204) pilot (8) converses with a Spanish-speaking (202) local via voice simulation outputs at both speakers and/or closed captioning for textual reading on each end, all facilitated by network connectivity (206) between the locations.

Figures 2, 2Z, 3, 4:
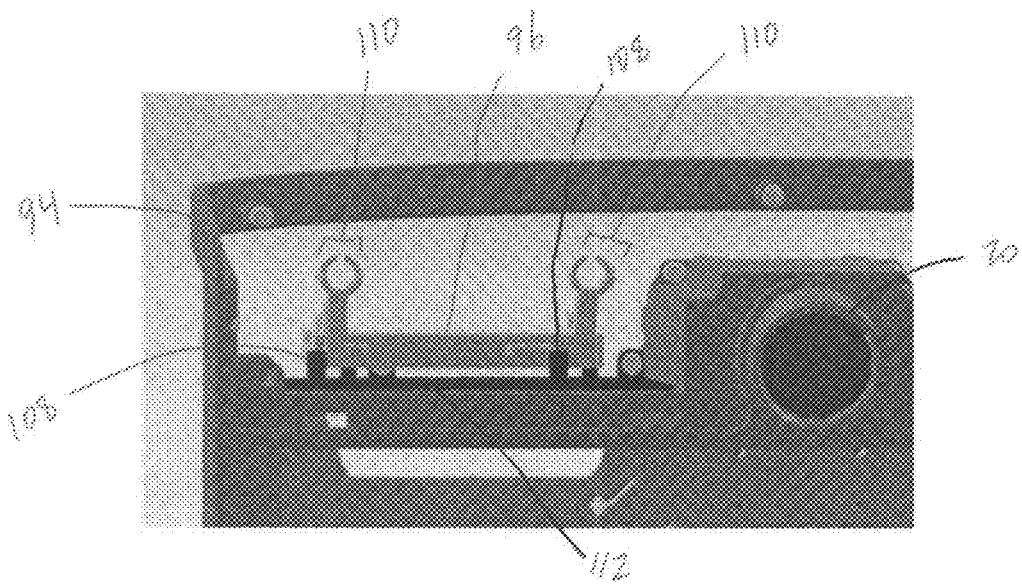
FIG. 4 illustrates a schematic pertinent to an embodiment of an access gateway in accordance with the present invention.
Figures 2, 2Z, 3, 4, 5:
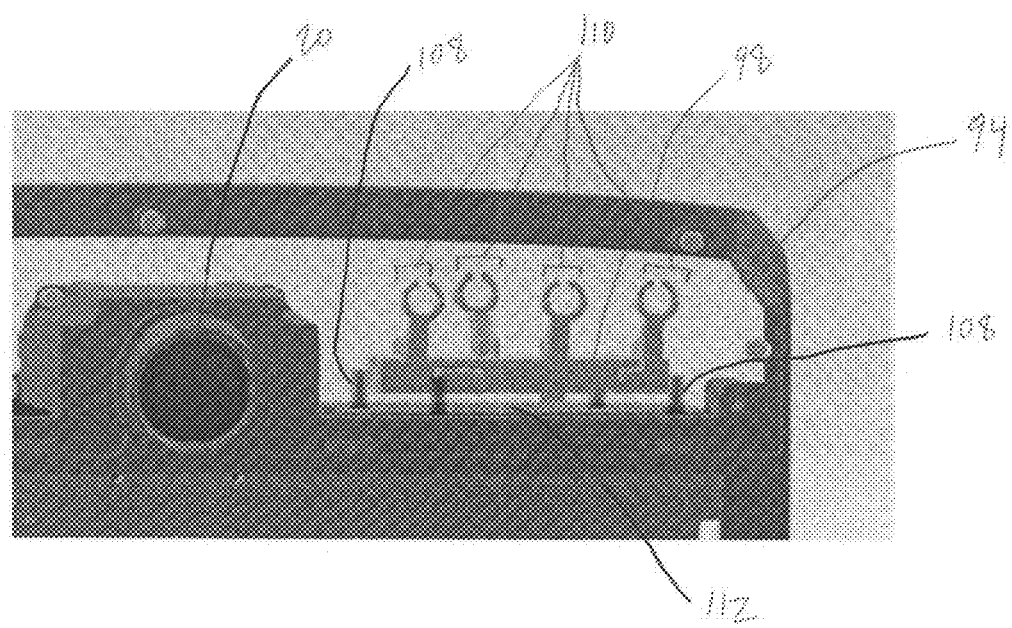
Figures 2, 2Z, 3, 4, 5, 6:
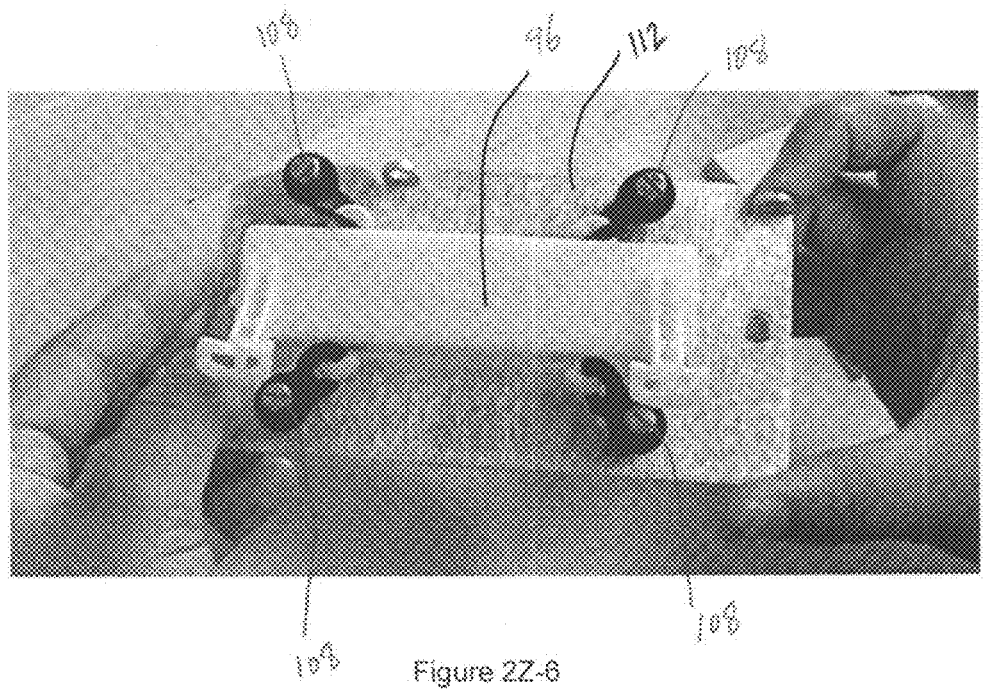
Figures 2, 2Z, 3, 4, 5, 6, 7:
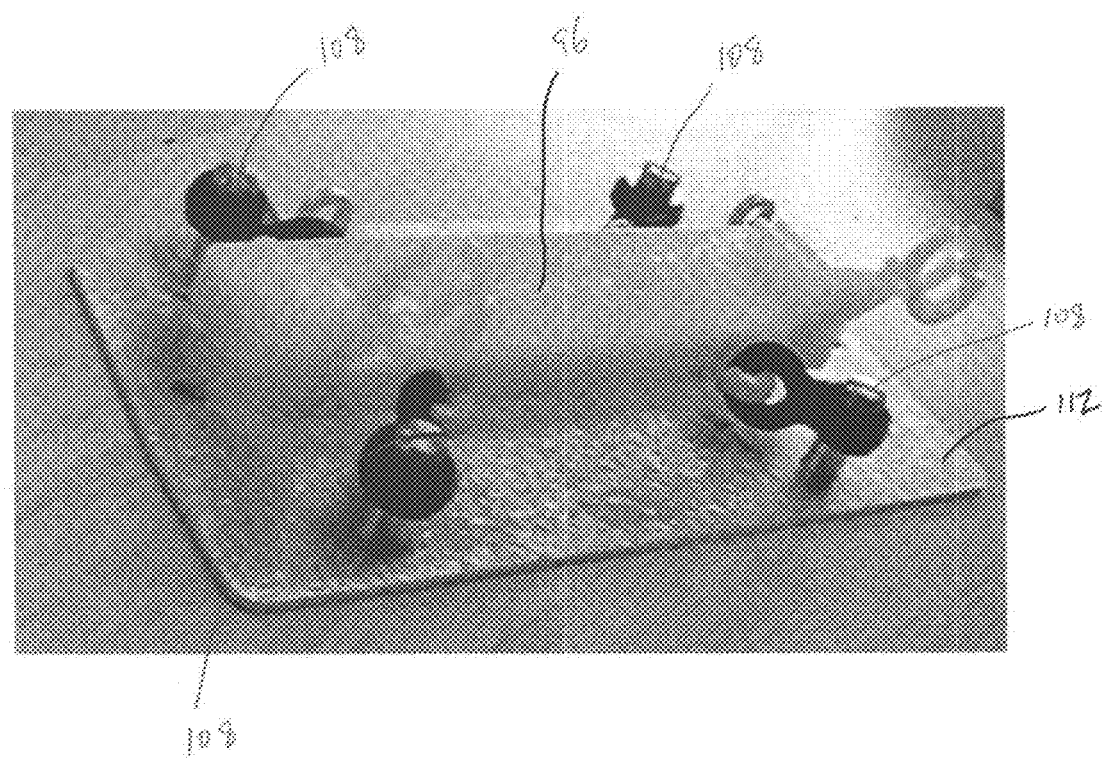
Figures 2, 2Z, 3, 4, 5, 6, 7, 8:
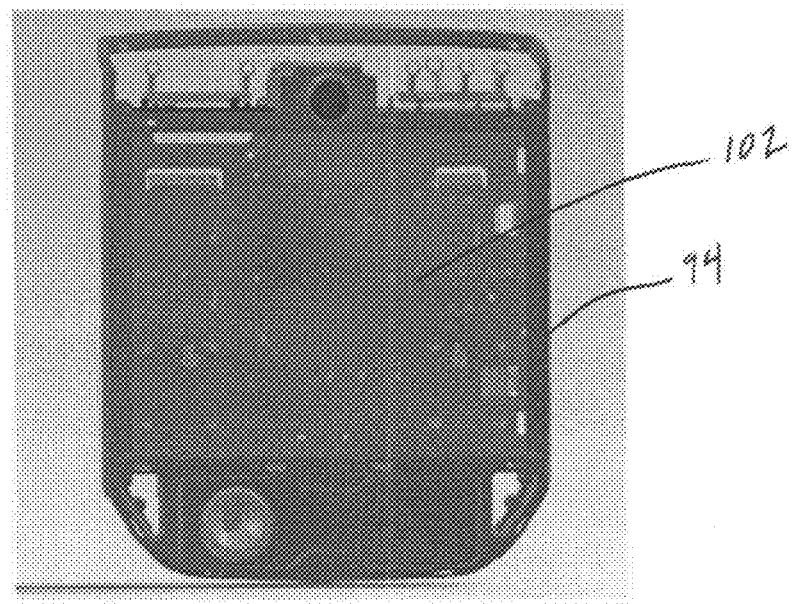

Referring to FIG. 4, a login gateway provided by a lobby system (6) prevents someone from easily trying to connect with and operate a remote mobile workstation without appropriate authentication and/or credentials. In one embodiment, a pilot at his workstation (208) has some login means to get into the lobby (6) and responds (216) with a password, private key, or the like. With this challenge met, the controller board on the mobile workstation (210) may then make up an alphanumeric security code (say "345&*"), and the challenge from it may be something like, "please sign 345&* using your private key. The response may be the signature itself. Given access to operate the remote mobile workstation, a timeout may be configured to only allow 30 seconds or so of operation before going back to the authentication routine. Such a configuration facilitates a scenario wherein anyone who hacks into one of the computer boards of the remote mobile workstation will have no ability to make the remote mobile workstation (4, 210, 212) drive, operate the cameras, etc—because the system always relies on the lobby (6) to be in the loop. In other words, the lobby may be configured to allow the motor board that it is ok to drive and operate based upon the authentication; this may be important in allowing only authenticated users to drive the system; the trusted base in such configuration is the motor board, not the entire remote computing system, which may enhance security in the event that someone is able to hack into any board on the system other than the motor board.

Figure 5A:
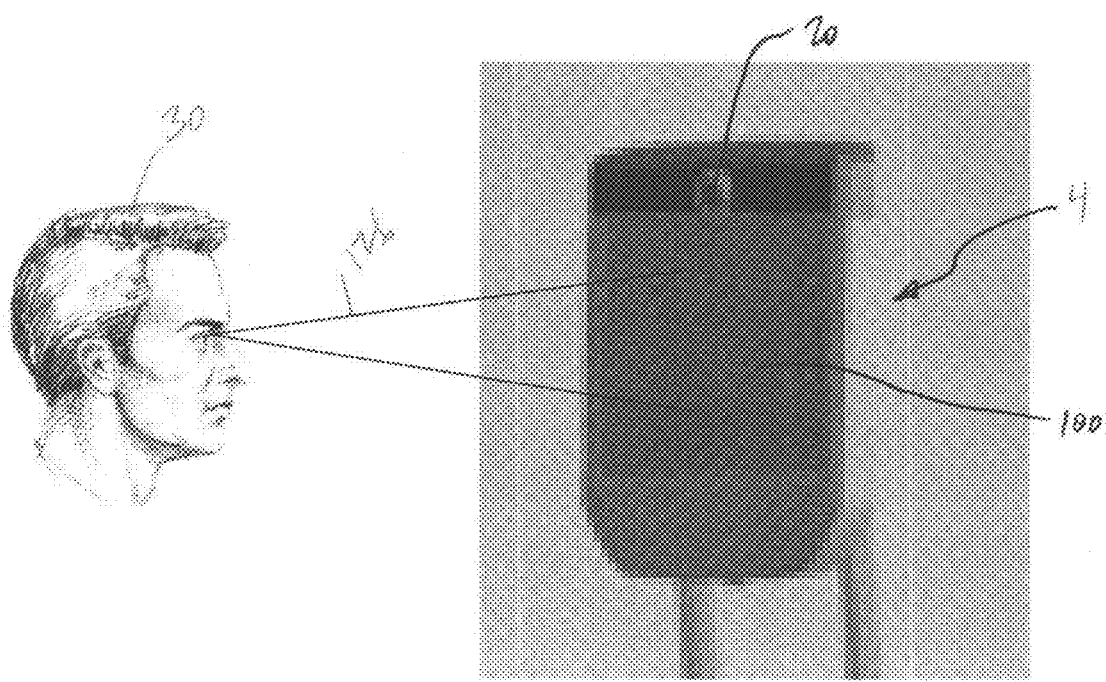
FIGS. 5A-5D illustrate orthogonal views pertinent to embodiments of camera subsystems for a remote presence system in accordance with the present invention.
Figure 5B:
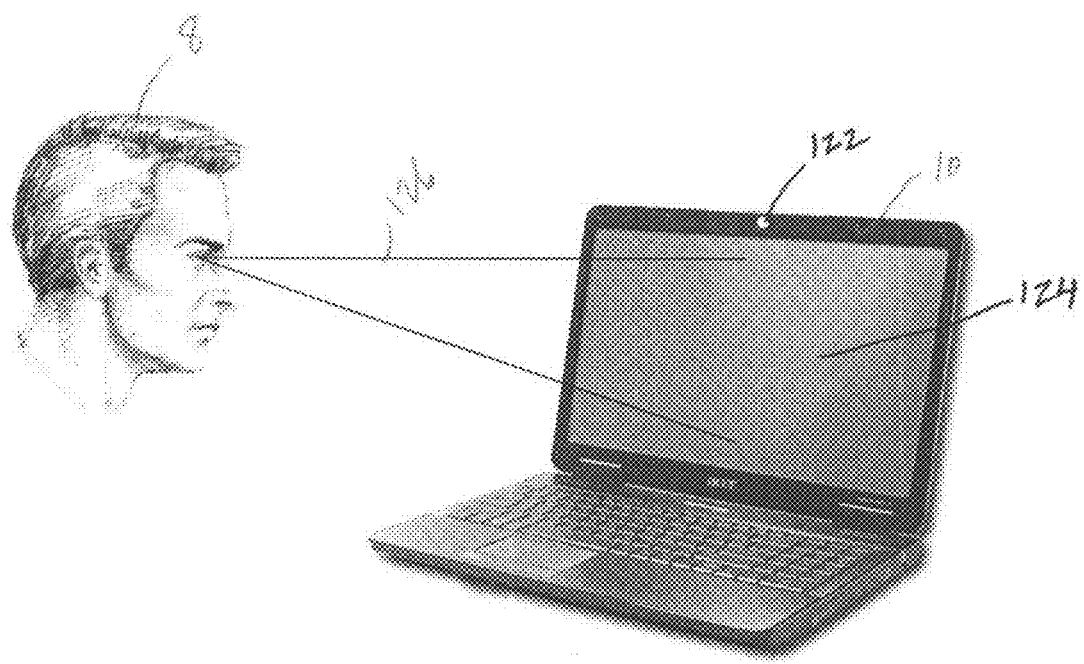
Figure 5C:
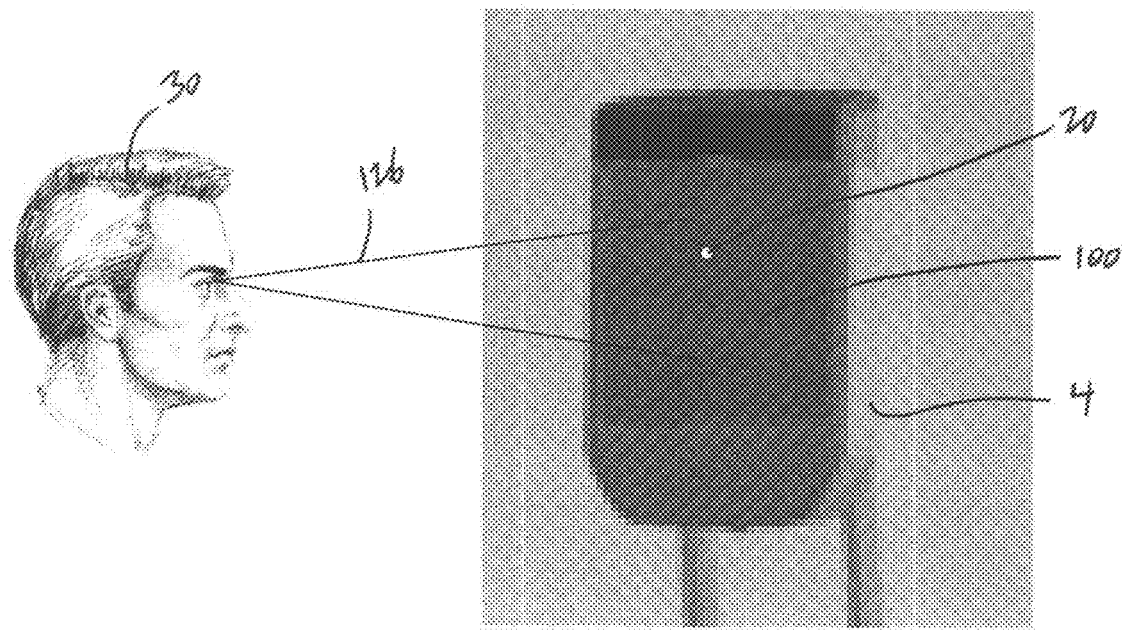
Figure 5D:
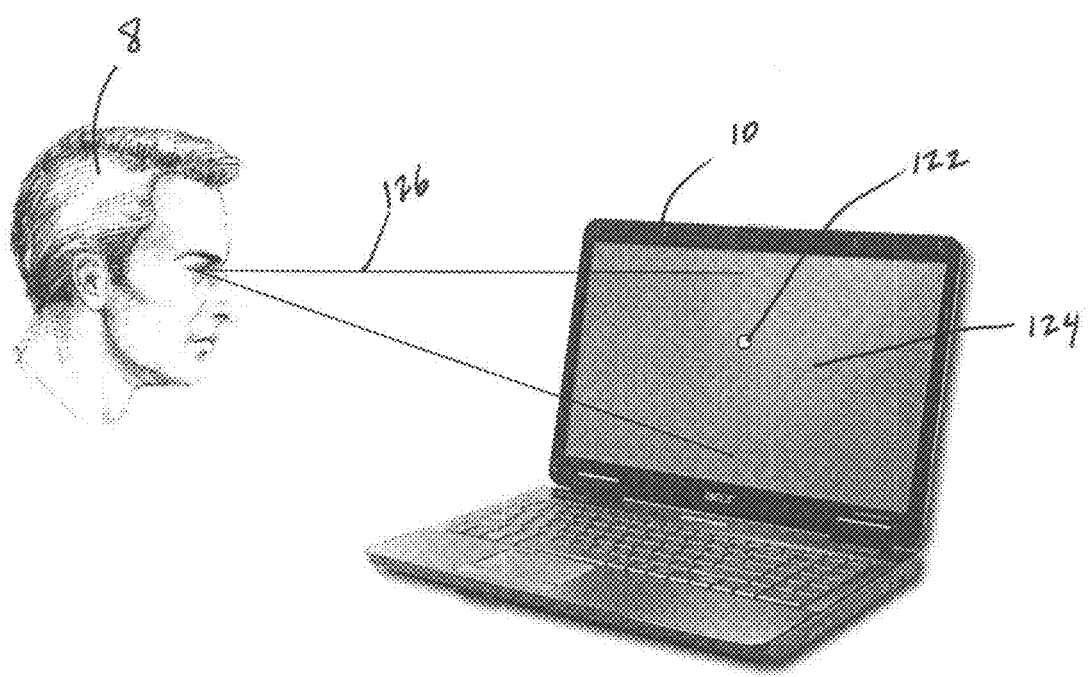

Referring to FIGS. 5A and 5B, with a camera mounted to the perimeter of a monitor or display (100, 124), the gaze orientation (126) of the depicted pilot or local may give the counterparty the feeling that the depicted pilot or local is not providing direct eye contact. In other words, the gaze of the viewer to the display (124, 100) is not directly aimed at the nearby intaking camera (122, 20). Referring to FIGS. 5C and 5D, this may be mitigated by placing the cameras (122, 20) in geometric configurations wherein they capture through pinholes formed into the displays themselves, at locations selected to substantially align with a typical eye position of a person being shown on the display (124, 100).

Figure 6A:
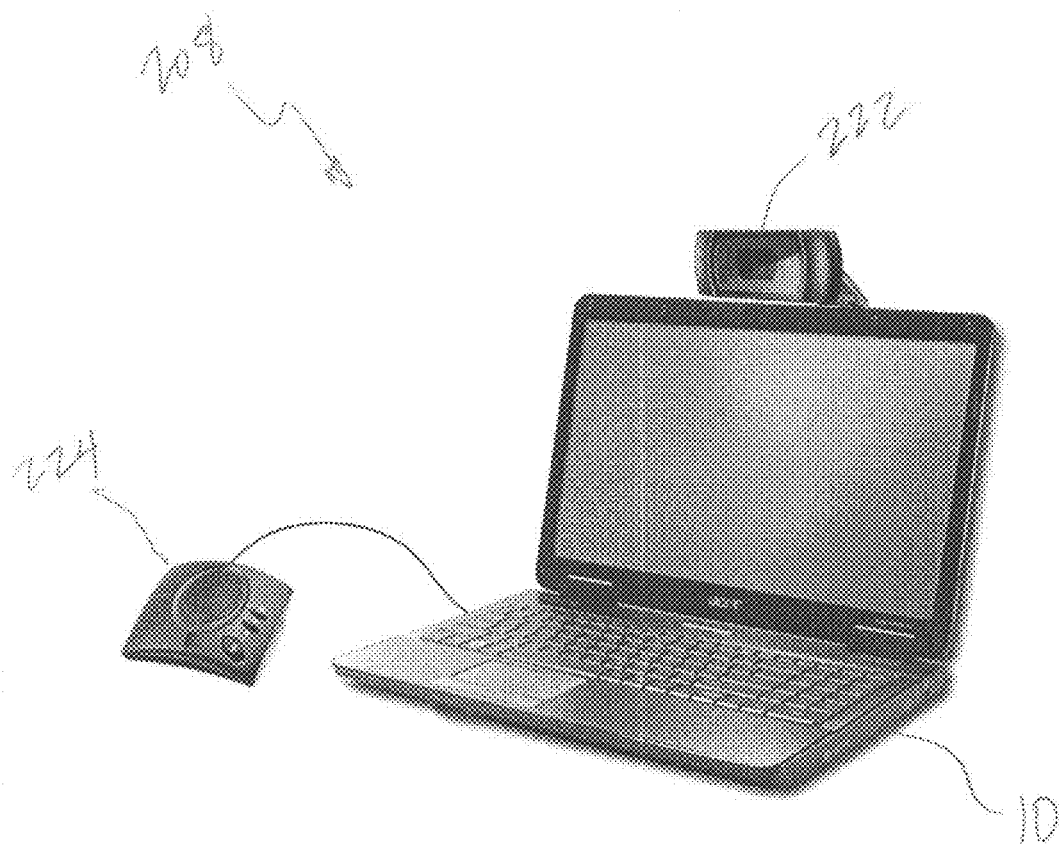
FIGS. 6A-6G illustrate views pertinent to embodiments of a pilot workstation and user interface for a remote presence system in accordance with the present invention.
Figure 6B:
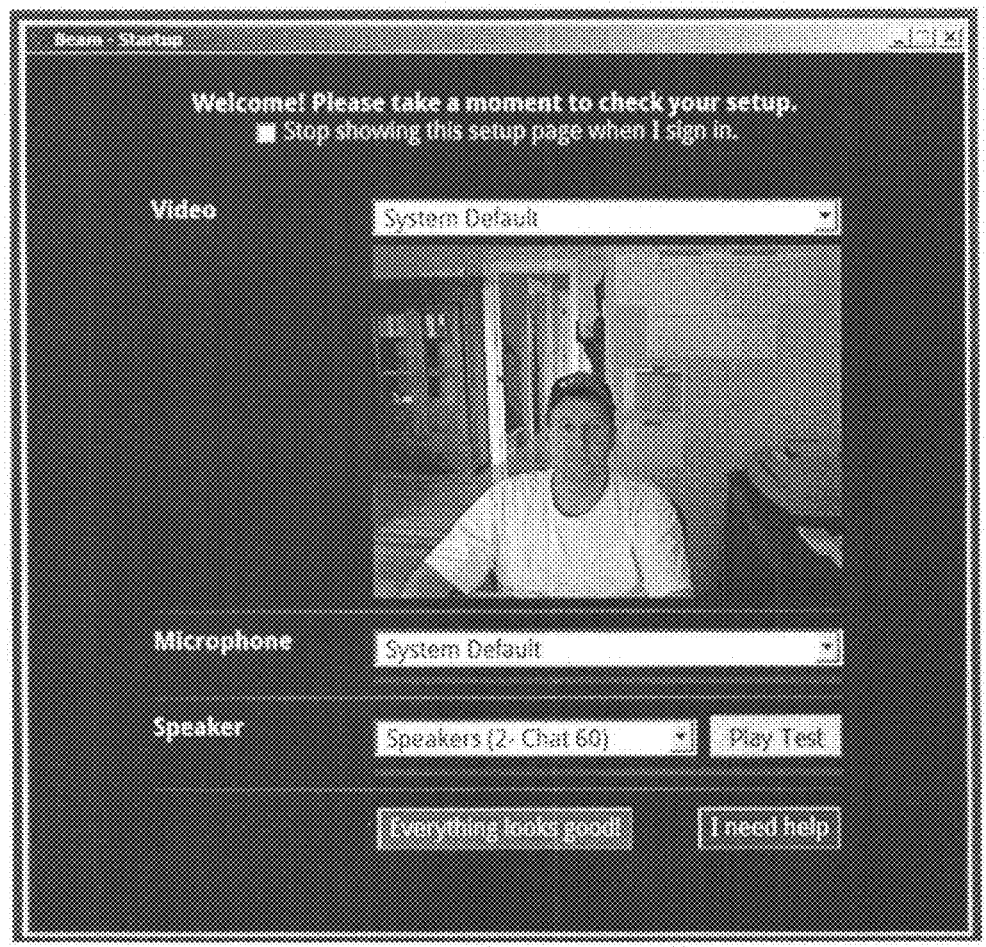
Figure 6C:
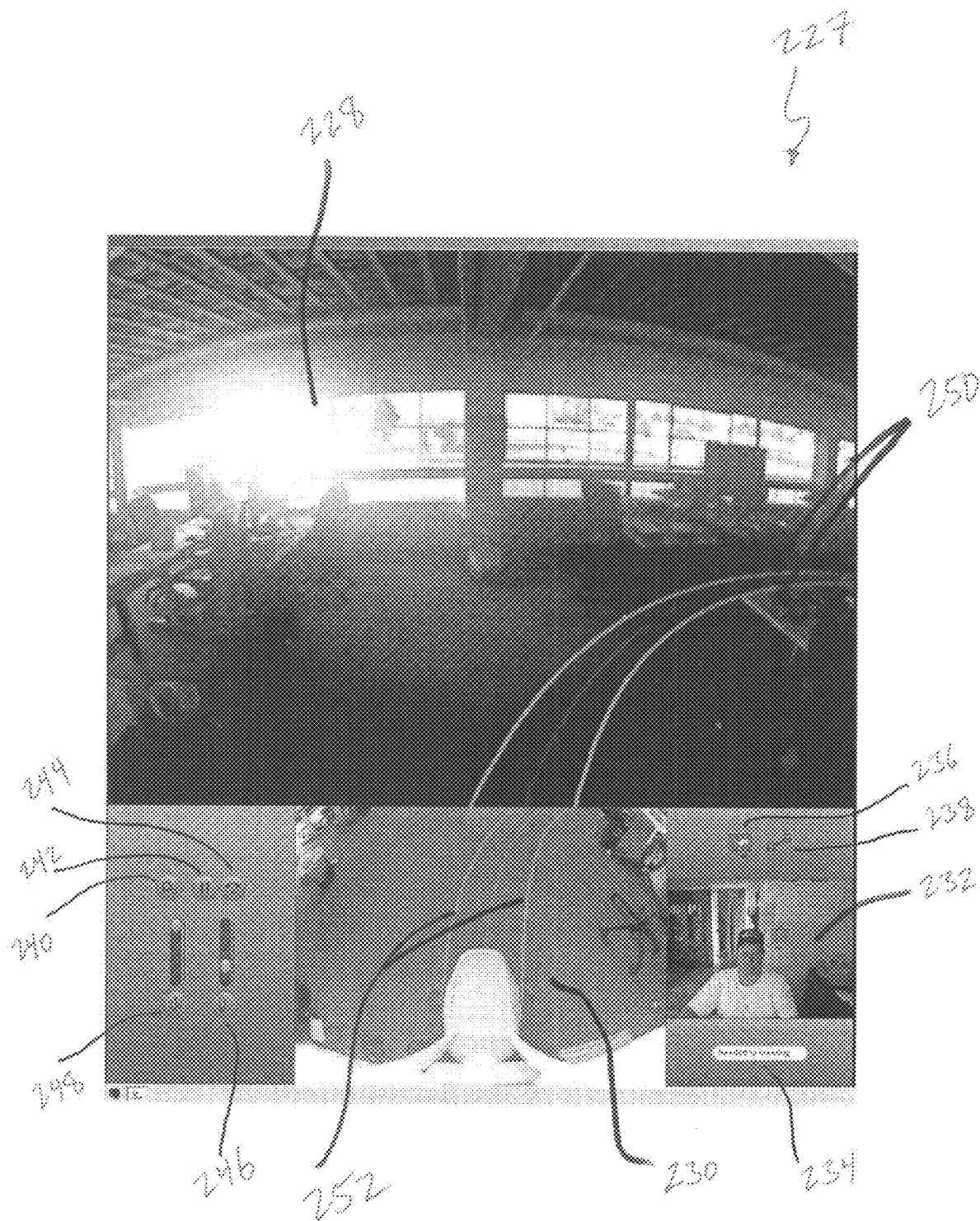
Figure 6D:
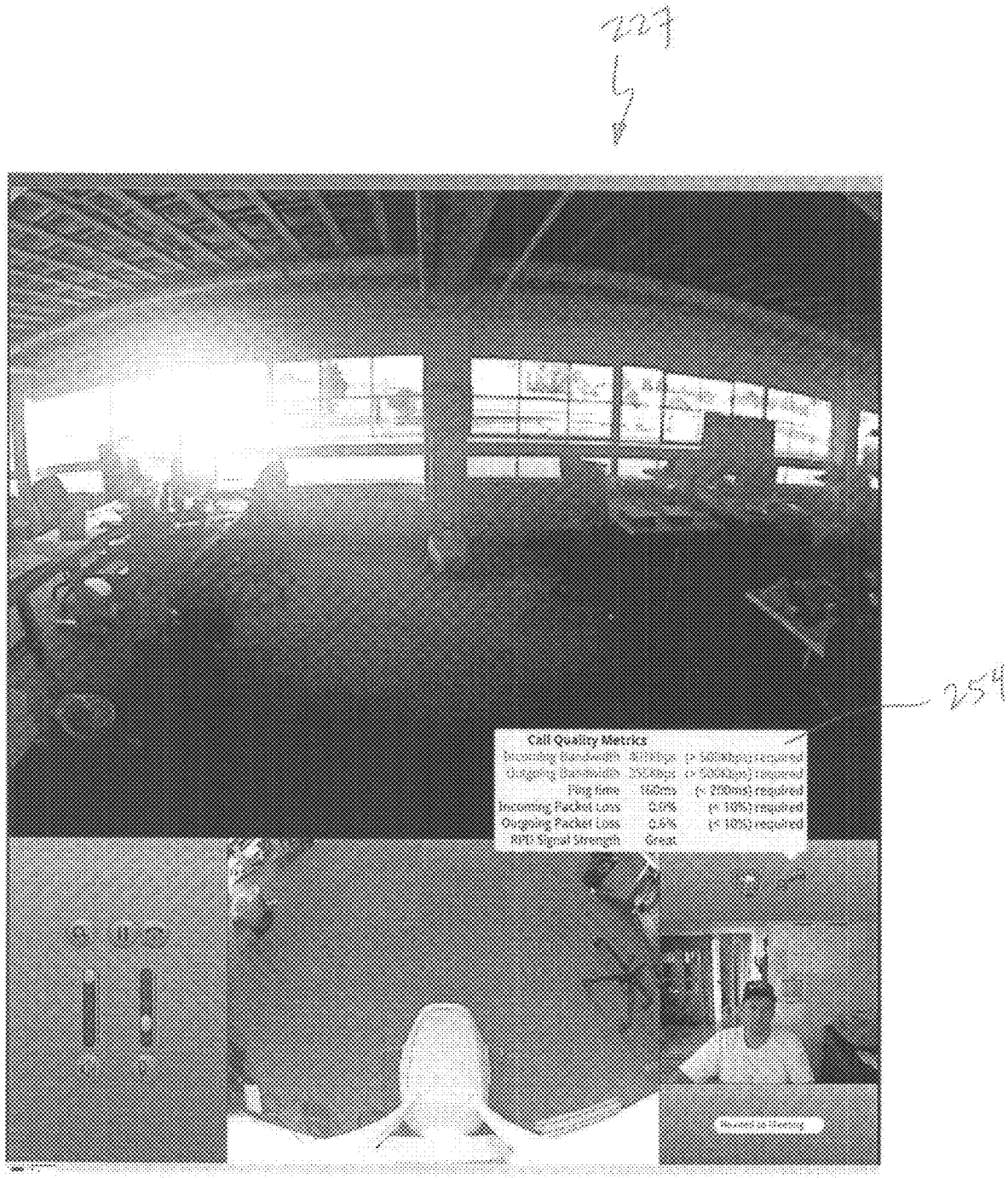
Figure 6E:
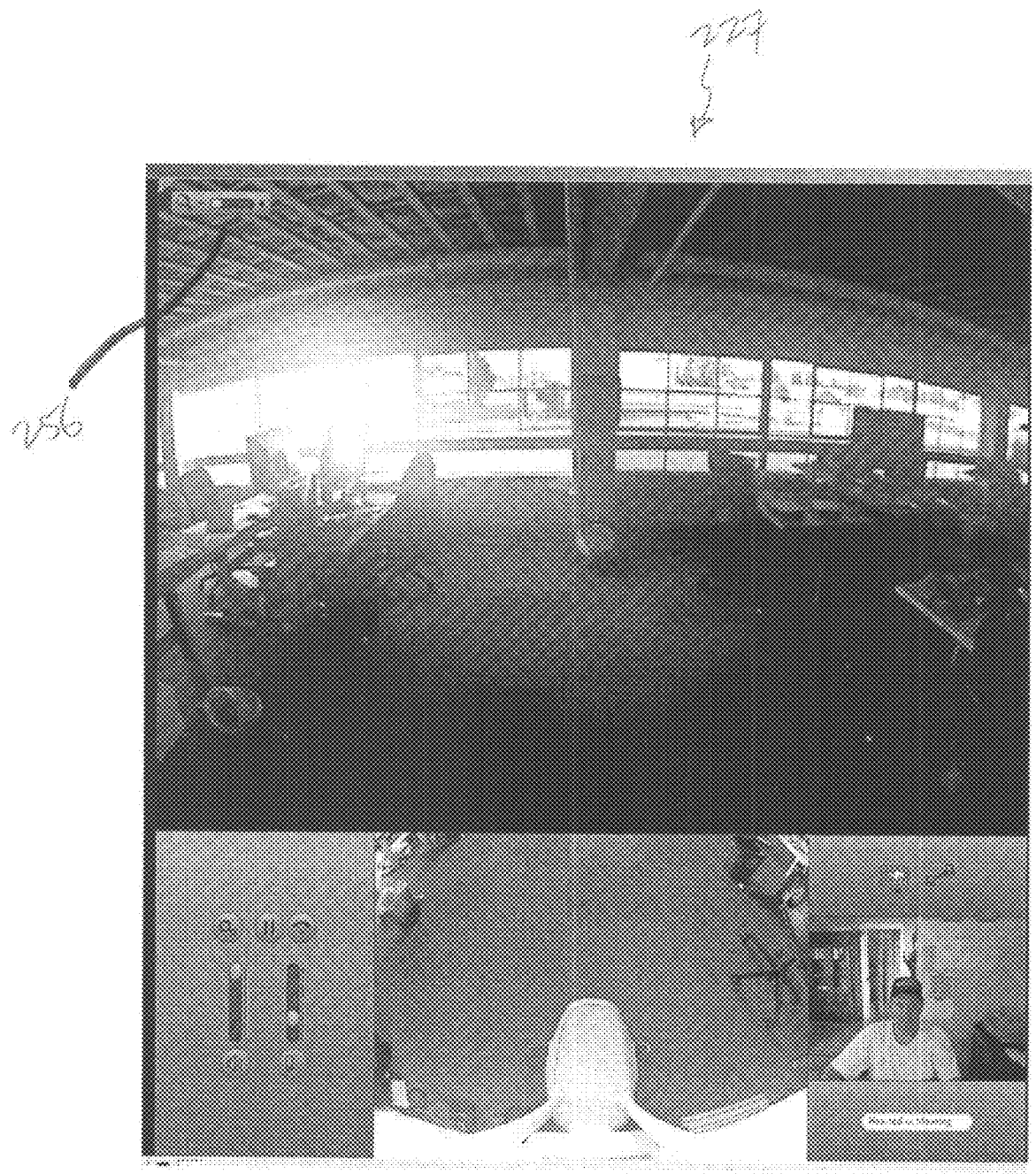
Figure 6F:
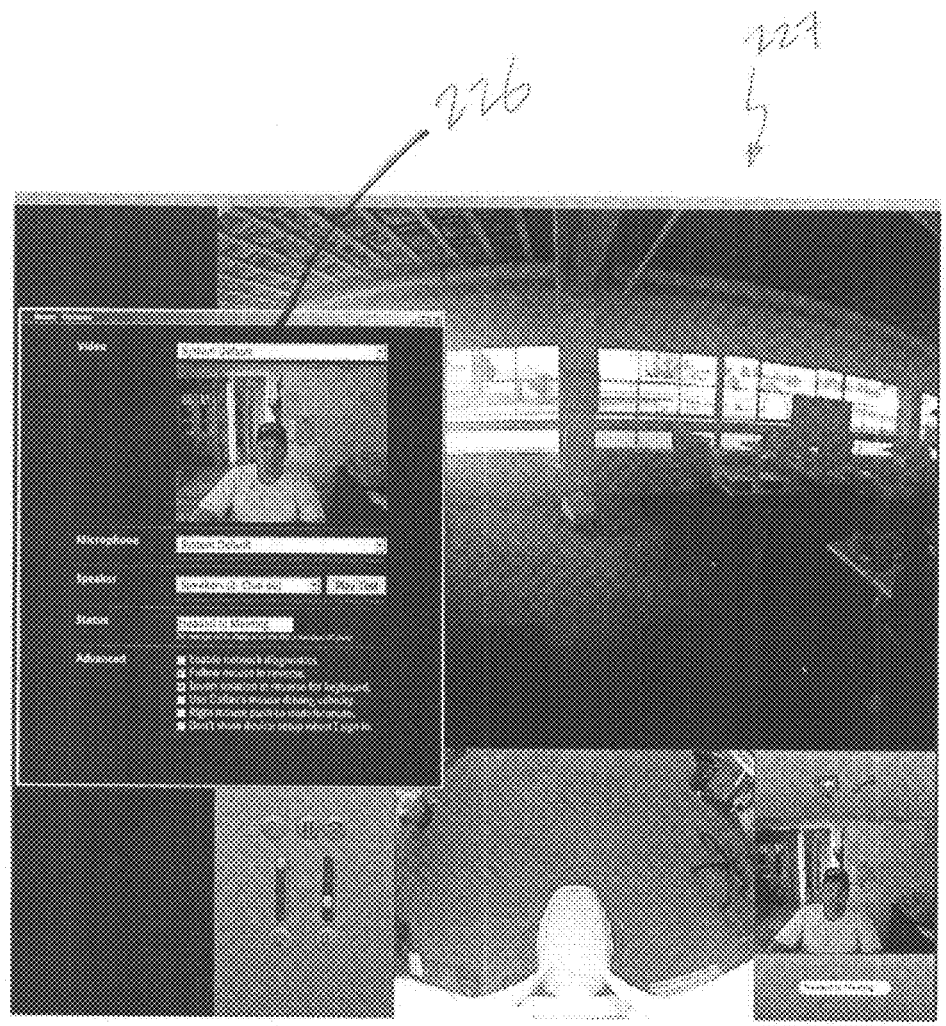
Figure 6G:
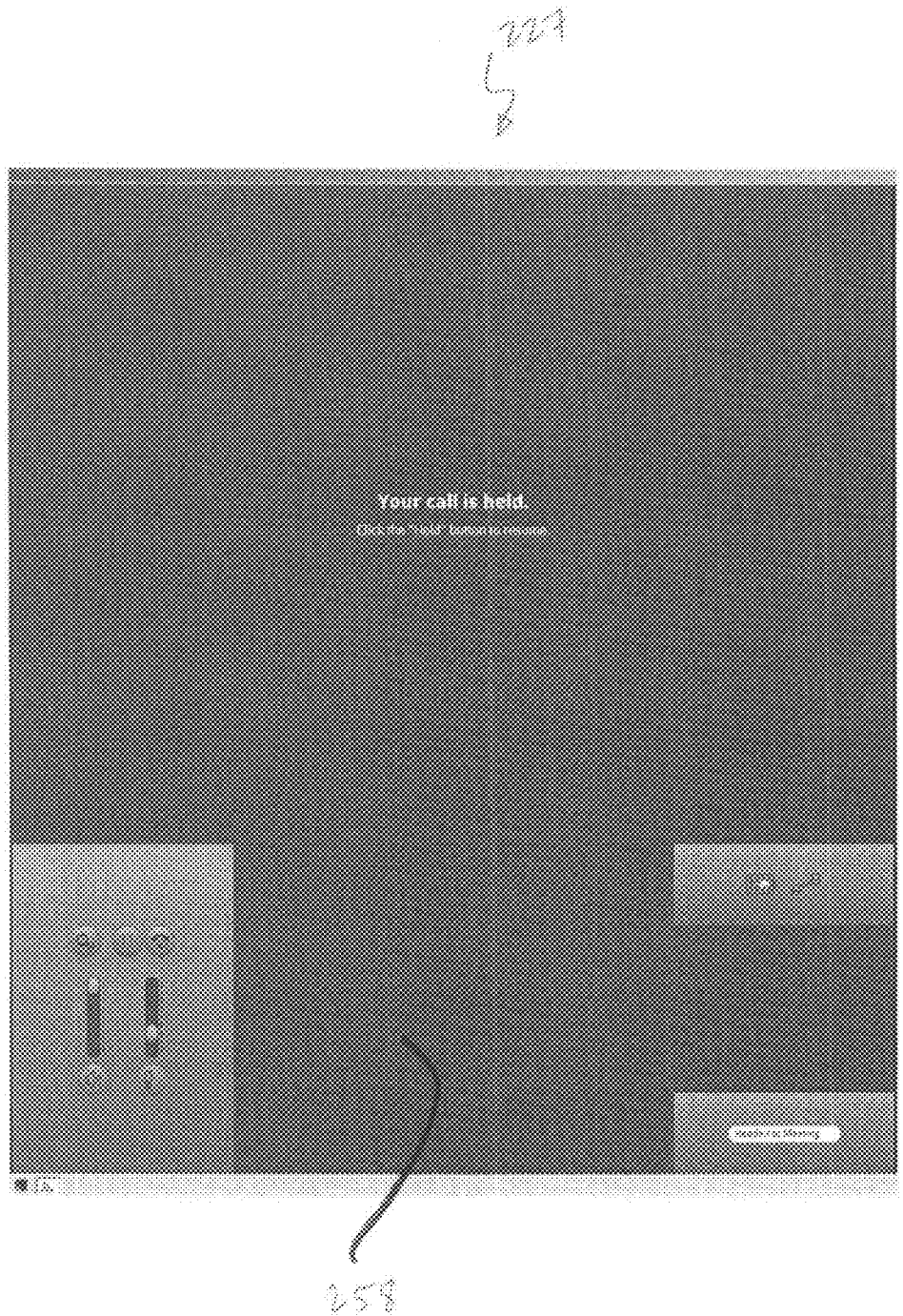

Referring to FIGS. 6A-6G, various aspects of certain embodiments pilot workstation and pilot user interface configuration are illustrated. Referring to FIG. 6A, a typical pilot workstation (208) may comprise a laptop computing system (10), which may have an internal or external camera (222) associated with it, such as an external model c910 camera by Logitech, Inc. An external microphone/speaker device with noise and echo cancelling may also be useful, such as the Chat60® by ClearOne, Inc. Login to pilot software may present a setup dialog box (226) as shown in FIG. 6B. After setup is confirmed, preferably using a lobby system as an intermediary, as described above, the operational pilot user interface (227) may appear as in FIG. 6C, with a main navigational screen (228) from the main camera on the remote mobile workstation, a navigational camera view (230) from the navigational camera on the remote mobile workstation, a pilot self-view (232), a pilot-controlled outgoing status message (234), and controls for microphone level (246), sound level (248), setup configuration (240), session pause (242), session termination (244), remote mobile workstation battery status (236), and connectivity with remote mobile workstation status (238). In one embodiment a portion of a circular arc is overlaid over each of the large camera views (252, 250) to indicate that if the pilot is to mouse click onto one of these graphical overlays, the remote mobile workstation will follow such a course. Such overlays are calculated using the known turning geometry of the mobile base and the vectoring by the master input device (mouse, joystick, etc). In other words, a vector is projected out of the particular camera to a point where the pilot's mouse has been placed in the user interface; then a linear and angular velocity may be calculated to match the particular circular arc and navigate the remote mobile workstation where the mouse is affirmatively clicked (the user interface may be configured to turn the active overlaid arc to a different color or brightness when it is being utilized to navigate the remote mobile workstation). Thus to move around an obstacle, the pilot need only orient the graphical overlay around the obstacle, and engage the forward drive by clicking with a mouse, advancing with a joystick or other device, or steering/advancing with a keypad; to move in reverse, the same process may be utilized, and an appropriate circular arc may be overlaid onto the user interface in the reverse direction (mainly viewable in the lower navigational camera). FIGS. 6D-6G show screens representative of connectivity check button engagement (254—a small window appears overlaid onto the user interface featuring network communications related information such as incoming bandwidth, outgoing bandwidth, ping time, incoming packet loss, outgoing packet loss, and general connectivity signal strength to the pertinent wireless access point, cell tower, etc.), moving the mouse to the upper screen image to get the zoom control (256—to facilitate optical and/or digital zoom of the pertinent camera), selecting the tools configuration control (226—bringing up the setup/tools dialog box as described above in reference to login), and placing a session on hold (258) to stop the cameras and microphones on each end while also retaining the connectivity for selectable re-activation of the session with active cameras and microphones on each end.

Figure 7A:
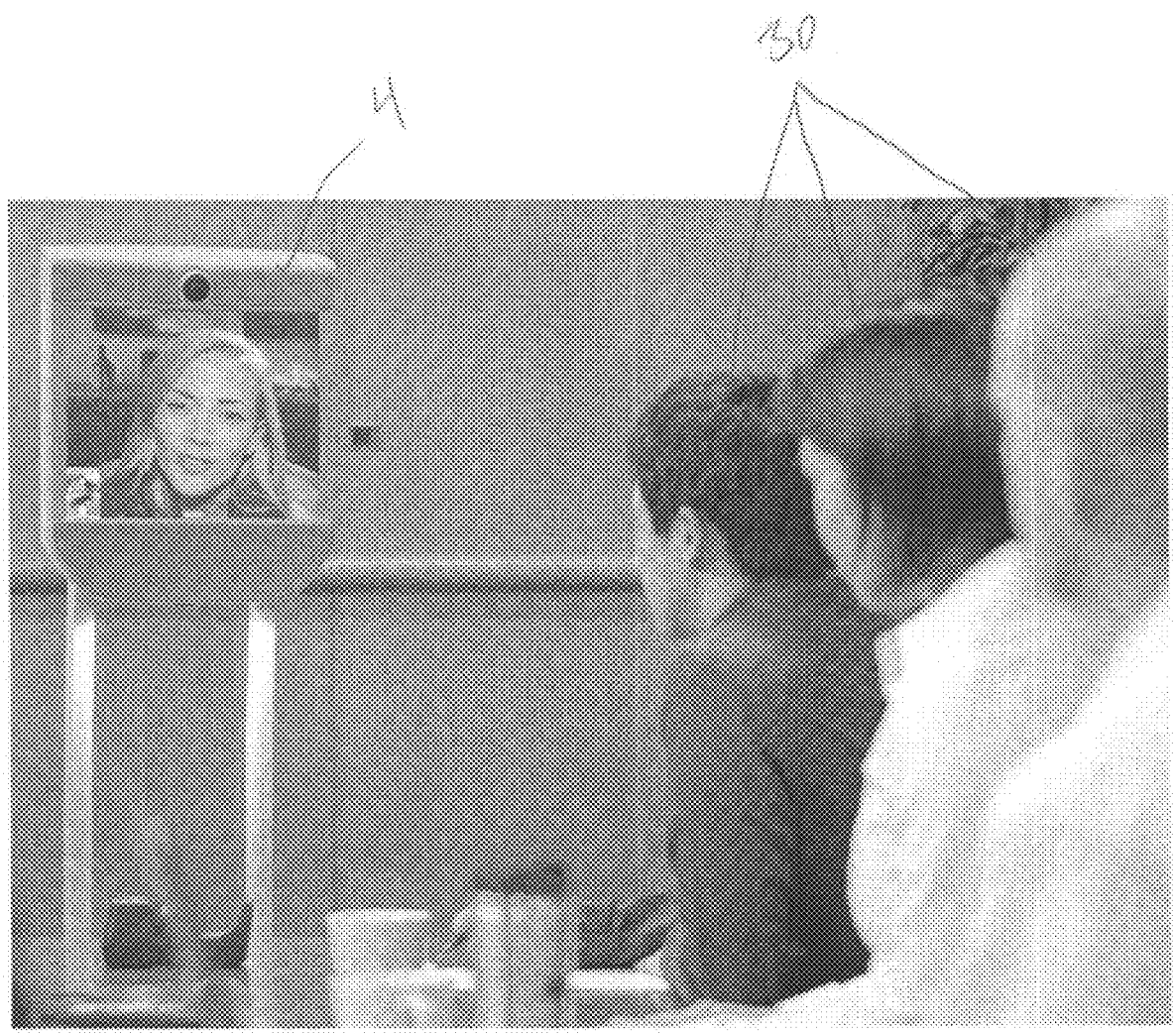
FIGS. 7A-7H illustrate views pertinent to embodiments of a remote mobile workstation and charging dock for a remote presence system in accordance with the present invention.
Figure 7B:
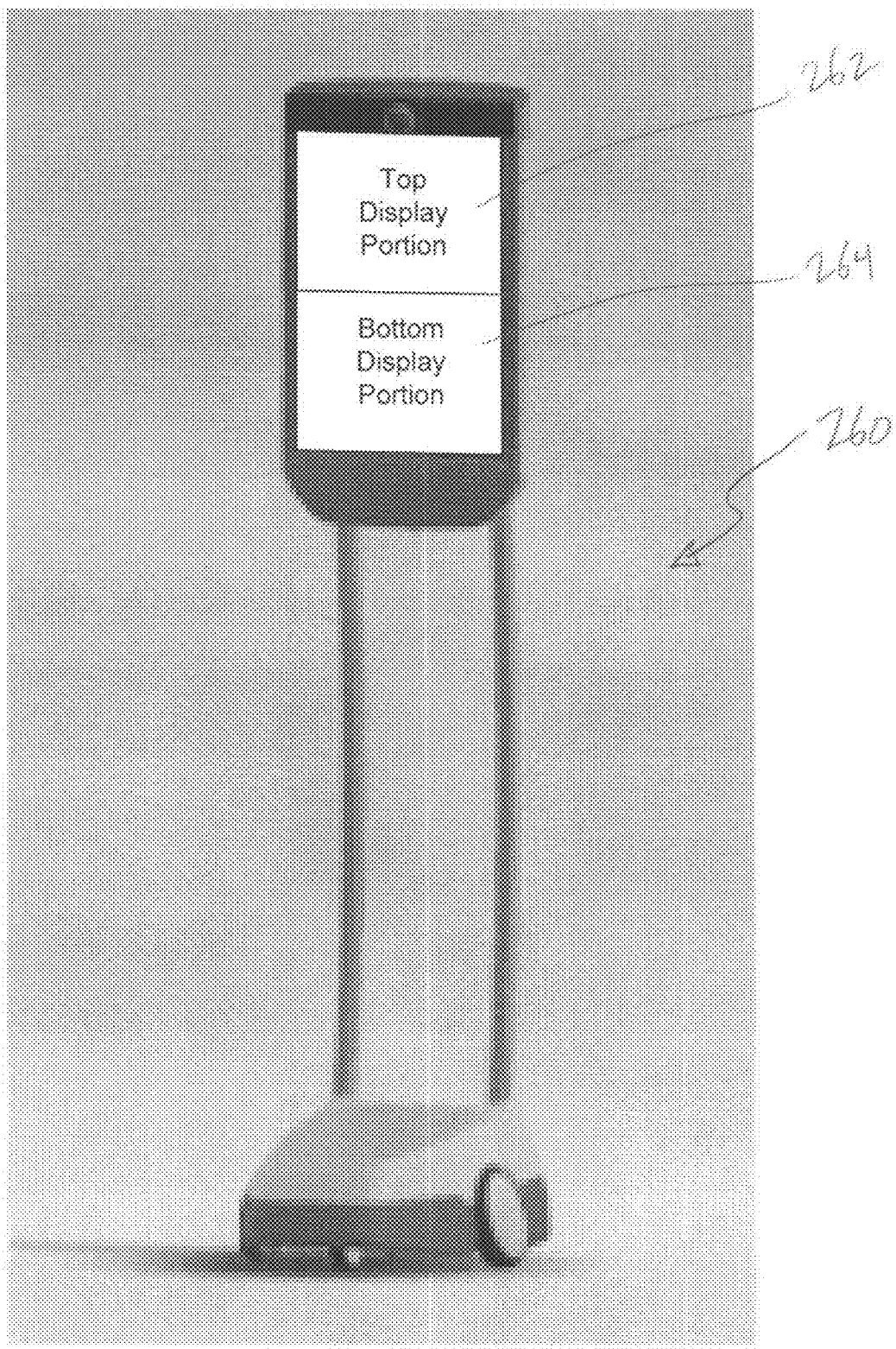

Referring to FIG. 7A, a pilot is operating a remote mobile workstation (4) in a conference room setting with locals (30). In one embodiment, in one of the corners of the display, a small window shows video feedback to the locals regarding what is being captured by the nearby main camera, so that such locals may have some feedback regarding what is being viewed by the remote pilot, how the scene appears to the pilot, etc. FIG. 7B illustrates an embodiment (260) with a longer display to facilitate split-screen type of presentation, wherein the top screen portion (262) may be utilized to project the pilot's face image, and the lower screen portion to project some other desired image or video, such as an image of the pilot's screen or one or more graphical user interface windows presented therein, a document, photo, whiteboard, passenger (as described below), or the like, or videos thereof.

Figure 7C:
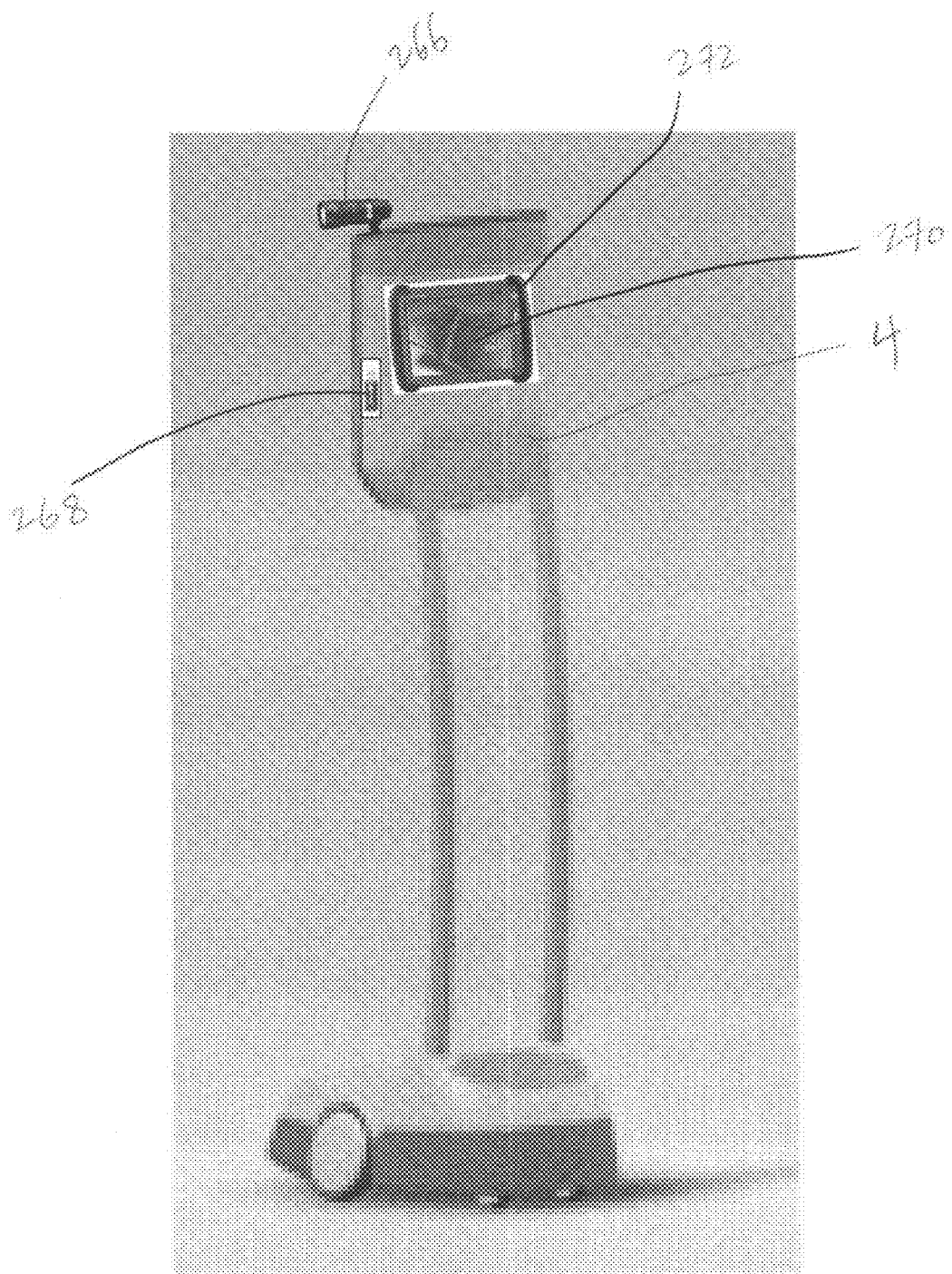
Figure 7D:
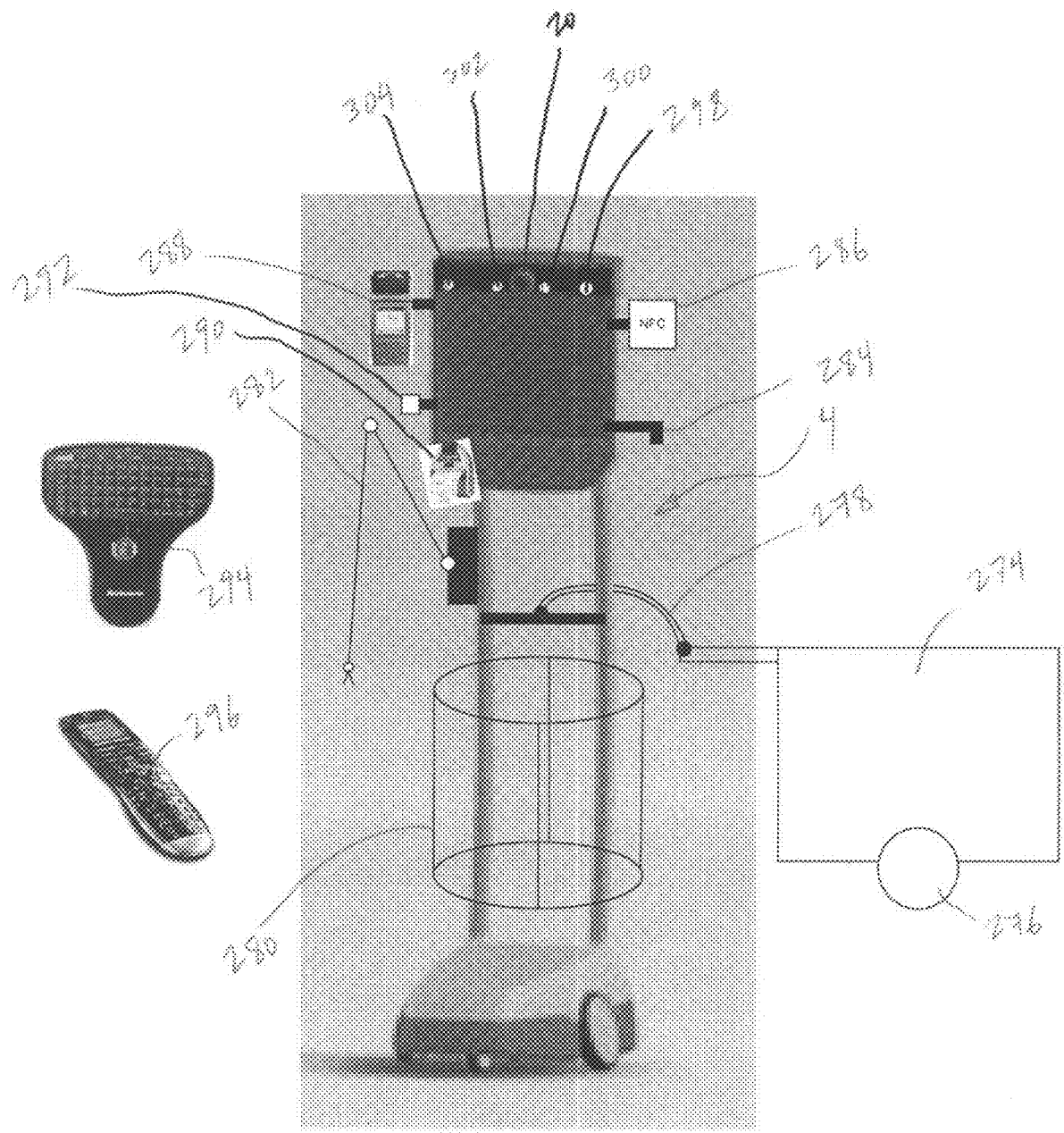
Figure 7E:
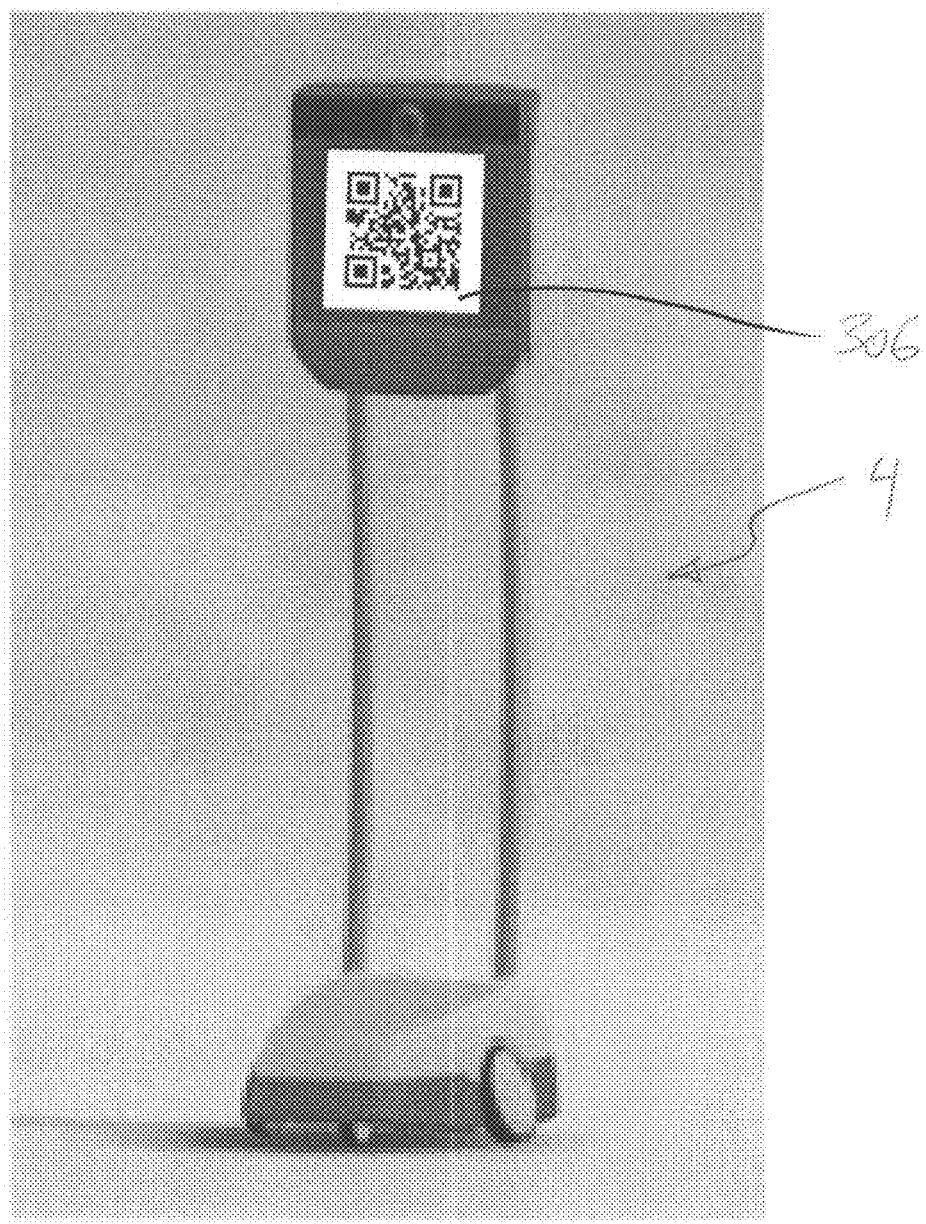

Referring to FIG. 7C, an embodiment features a projector (266) configured to project upon a wall or other object, under the control of the remote pilot. A wireless (such as Bluetooth™ enabled) removable USB dongle (268) may be configured to pass video or other images or information to a nearby projector, screen, or computing device from the remote mobile workstation (4) at the control of the pilot. One or more tablet computers (270) may be removably housed (272) and wirelessly connected to the remote mobile workstation, such as by using the remote mobile workstation as a wireless access point, to provide locals with further connectivity and sharing of documents and images/videos with the pilot (in other words, the remote mobile workstation itself may be utilized in a manner akin to being a mobile wireless access point through which the locals may connect tablets to the internet, or simply connect tablets to the remote mobile workstation or to the pilot for sharing of information). In one embodiment the tablets may be tethered to the mobile workstation (4) to prevent them from being taken too far away from the mobile workstation (4). Referring to FIG. 7D, for illustrative purposes a remote mobile workstation (4) embodiment is equipped with many extra features, including a wheeled (276) trailer (274) that may be towed by a towing hitch (278) to allow for storage of items such as in a shopping environment; a basket (280) directly coupled to the remote mobile workstation (4) for additional or optional storage; a lightweight robotic arm with grasper (282) for light manipulation of items such as elevator buttons and ADA-compliant doors; a small thermal printer (290) which may be utilized to print small documents such as receipts; a credit card point of sale transaction device (288) for processing transactions; a Square® credit card point of sale transaction device (292) for processing transactions; a near field communications device (286) for near field communications with enabled credit cards or other devices; a bar code reader (284); an infrared camera (300) for visualizing heat and in darkness; a relatively high-quality zoom camera (298); a smoke detector (302); a carbon monoxide detector (304). Given the mobile platform with onboard power and connectivity to nearby networks, many sensors and components may be integrated and/or coupled with a remote mobile workstation (4). In one embodiment, one or more laser pointers or projectors, or one or more cameras or imaging devices, may be operatively coupled to the arm to allow the pilot to direct projection or image capture of such devices in the room that is local to the remote mobile workstation (4). Wireless devices, such as Bluetooth™ or RF remote controllers (296) or keyboards/mice (294) may be utilized by locals to adjust the remote mobile workstation (4) or provide various inputs. For example, in a conference room environment, it may be desirable for the locals around a conference table to have a wireless remote (296) capable of turning up or down the volume, or muting the speaker and/or microphone, of the remote mobile workstation as it virtually represents the pilot. Similarly, a wireless remote may be utilized to interact with the remote mobile workstation and/or the pilot. Referring to FIG. 7E, in one embodiment the system may be configured to display a QR code (306) for locals to capture and understand better a diagnostic challenge or error with the remote mobile workstation (4); such QR code may be captured by a cellphone camera or similar device, and utilized to connect with a networked information system to provide further information to the pertinent local. One or more wireless microphones (not shown), such as lapel style microphones may be removably coupled to the remote mobile workstation (4) to be removed and placed upon or adjacent to speakers participating in a given discussion, to provide relatively direct source isolation and noise reduction. In one embodiment, a pilot may have the functional equivalent of a mixing board in his or her pilot workstation interface, such that the pilot may raise or lower the relative volume of various speakers who have such wireless microphones. In another embodiment, the lightweight robotic arm (282) may be utilized to hold a microphone toward a selected source, in a manner akin to what television reporters are accustomed to doing with interviewees to manage noise and focus on the sound source. In one such embodiment, a microphone may be integrated into the structure of the robotic arm to be on the ready when needed, but unobtrusive when not needed.

Figure 7F:
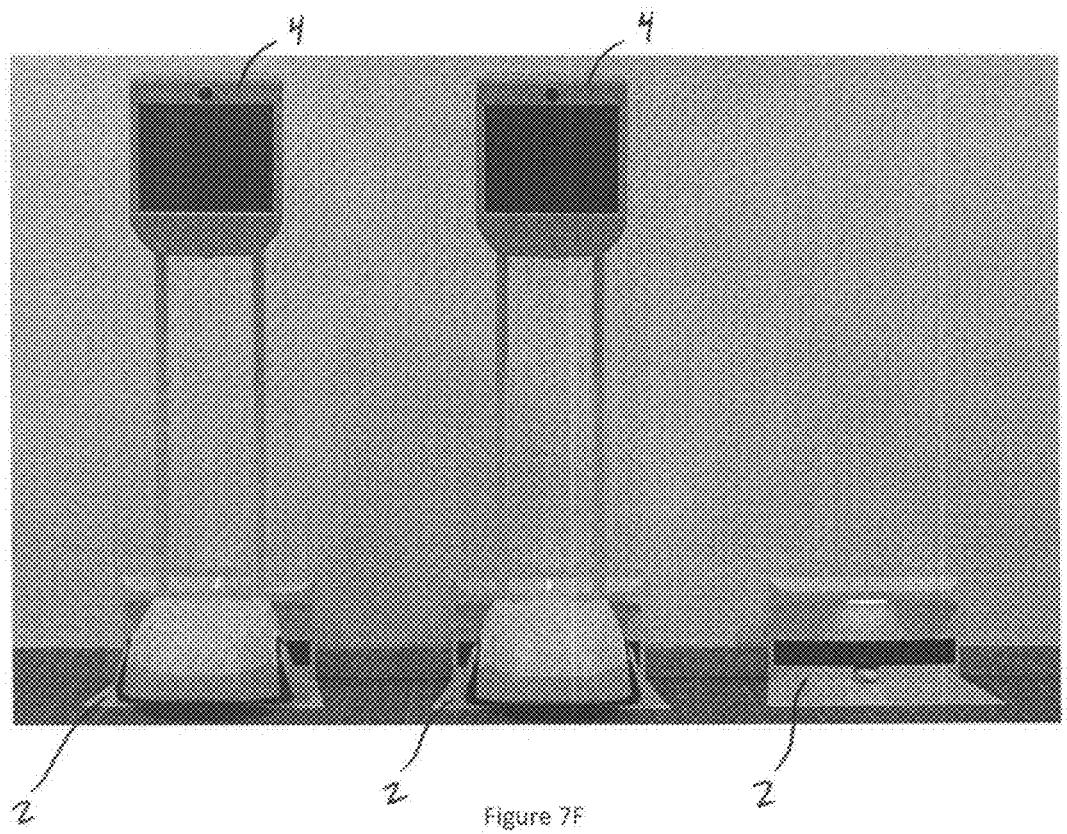
Figure 7G:
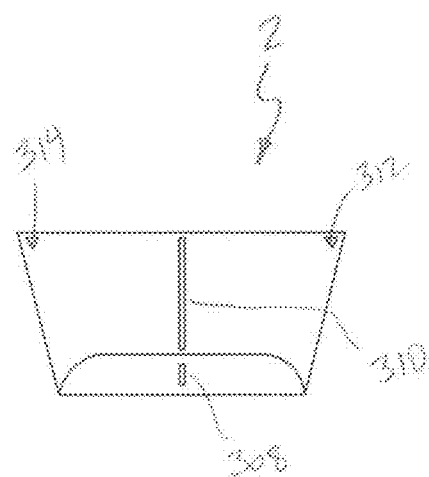
Figure 7H:
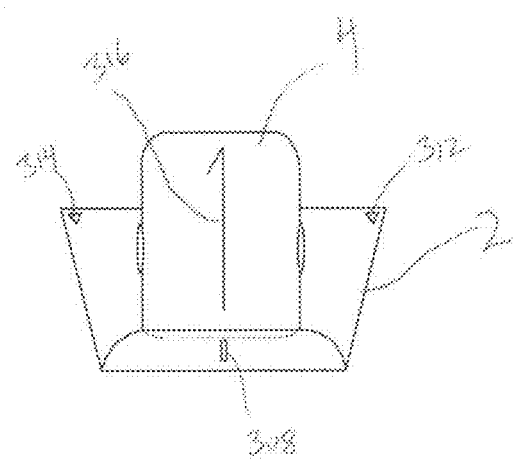

Referring to FIGS. 7F-7H, a combination of a light (308) aligned with a stripe feature (310) on the base (2) and/or a stripe feature (316) on the remote mobile workstation (4), as well as reflective corner markers (312, 314), assist the pilot with parking the remote mobile workstation while using the lower navigational camera. In other words, as a pilot is attempting to park a remote mobile workstation (4) onto a charging dock (2) in the orientation required to connect the charging interface of the charging dock with the charging contacts of the bottom of the remote mobile workstation, it may be helpful for the pilot, likely examining the output of the downward-oriented navigational camera (22), to have some geometric cues as to his state of alignment with the remote mobile workstation relative to the charging dock. In another embodiment, an "auto parking" feature may assist a pilot in parking correctly on the dock through the selection of a user interface control that preferably only is enabled if the pilot has reached a required proximity with a charging dock (which may be confirmed by a near field sensor or other sensing configuration).

Figure 8A:
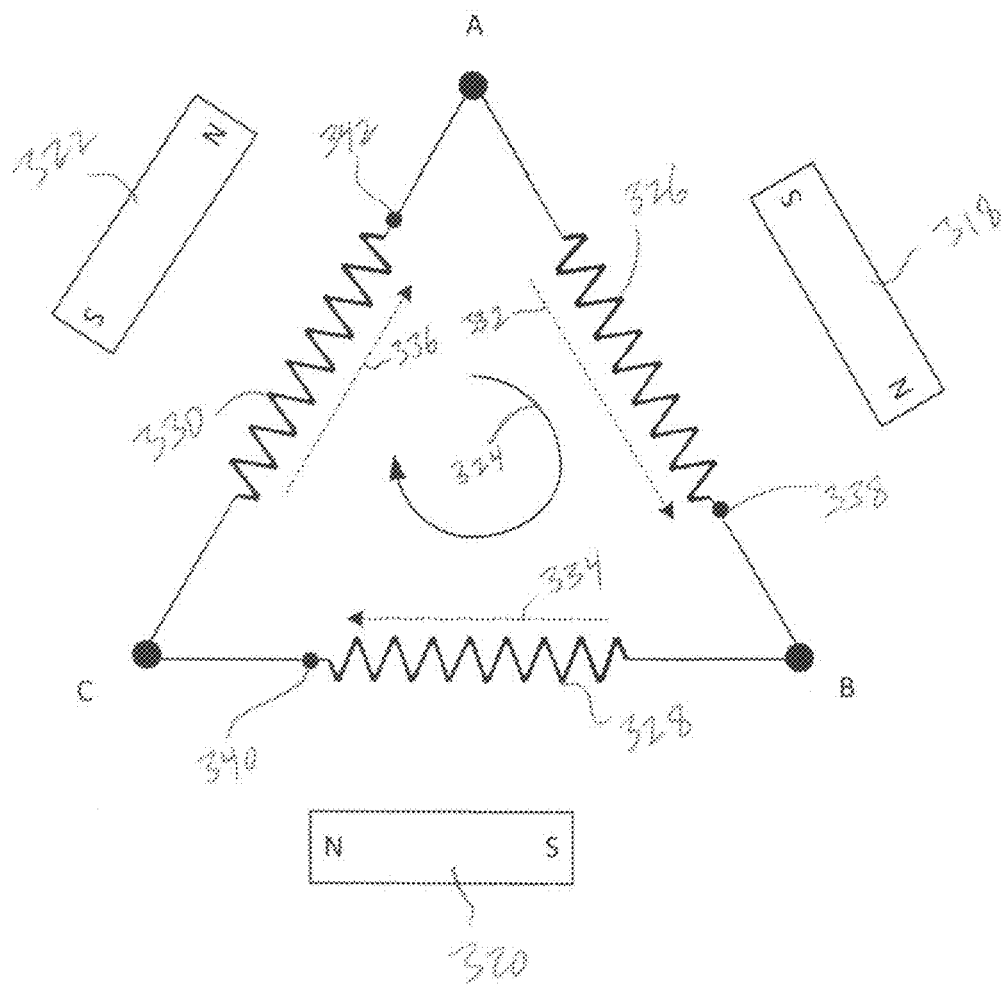
FIGS. 8A-8C illustrate schematics pertinent to embodiments of a drive motor configuration for a remote presence system in accordance with the present invention.
Figure 8B:
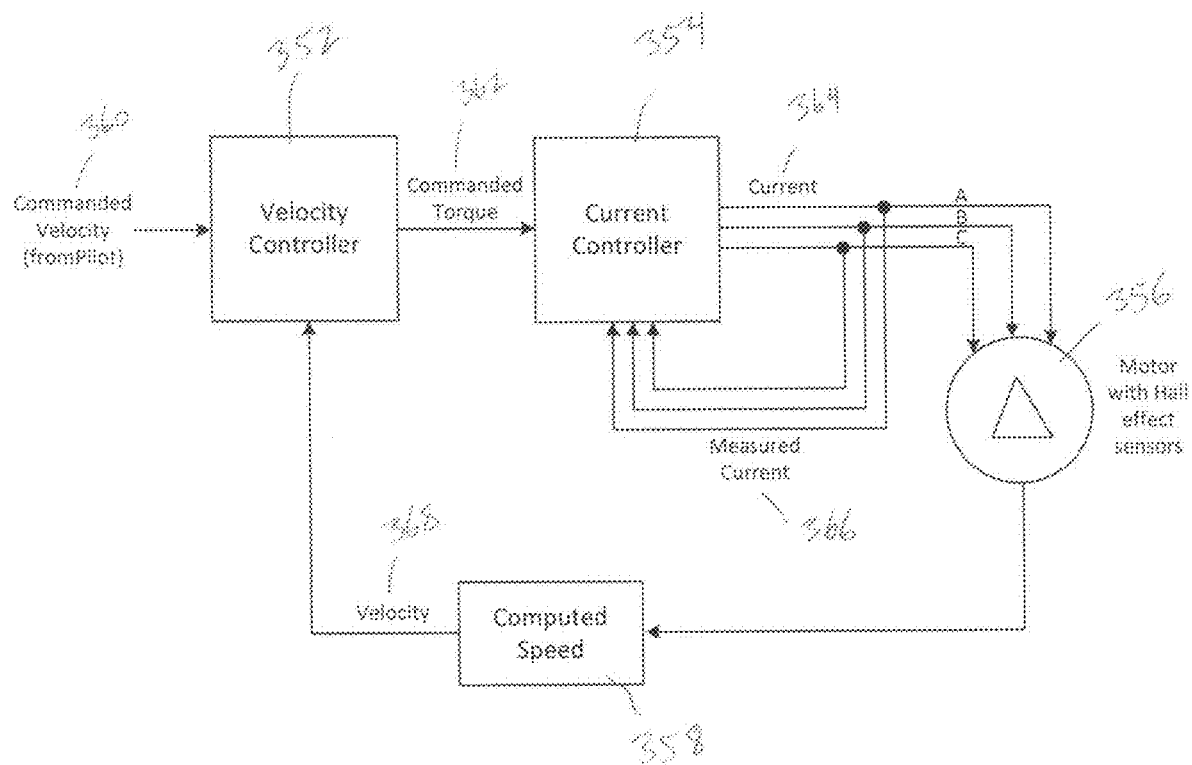
Figure 8C:
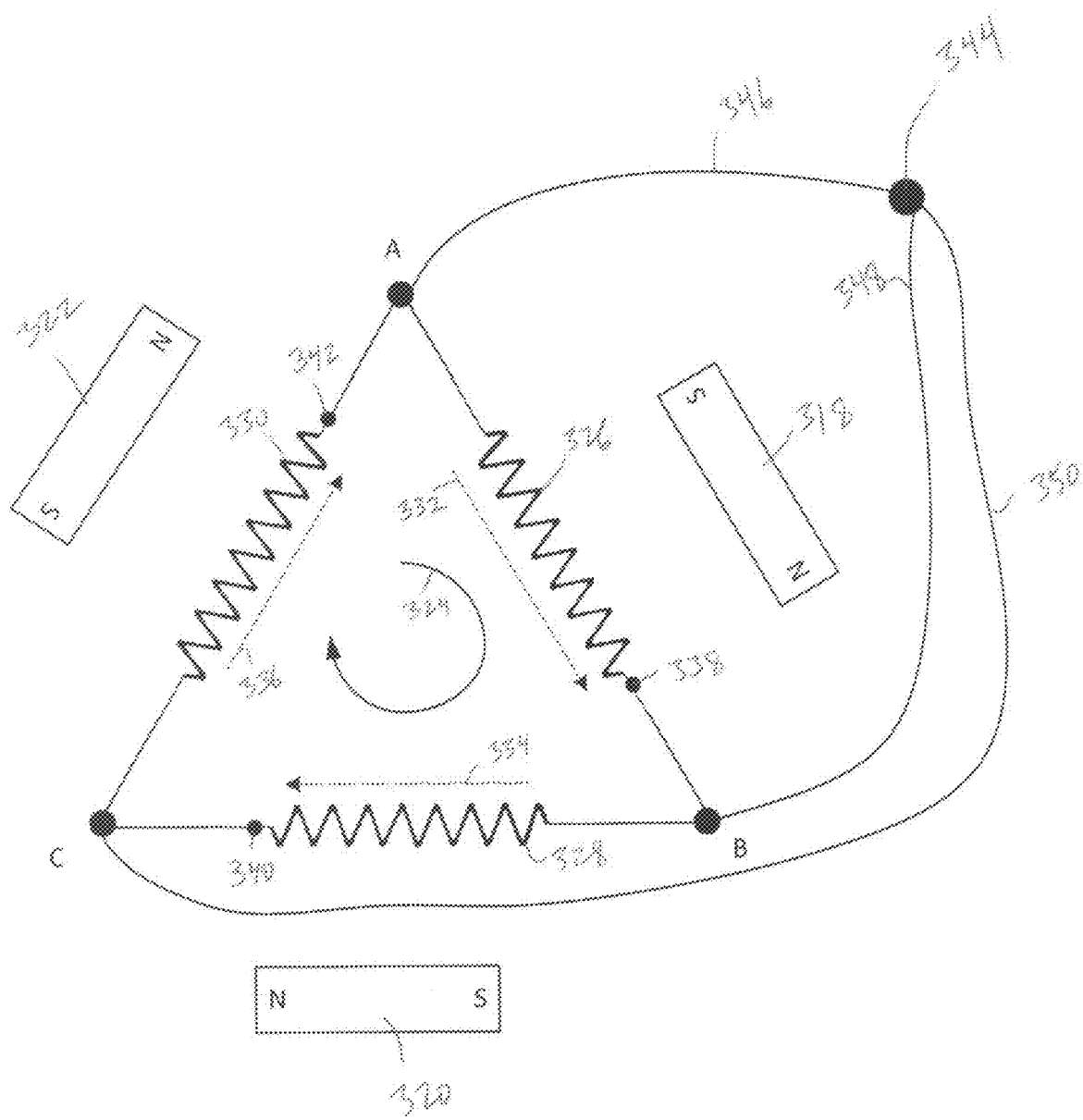
Figure 9:
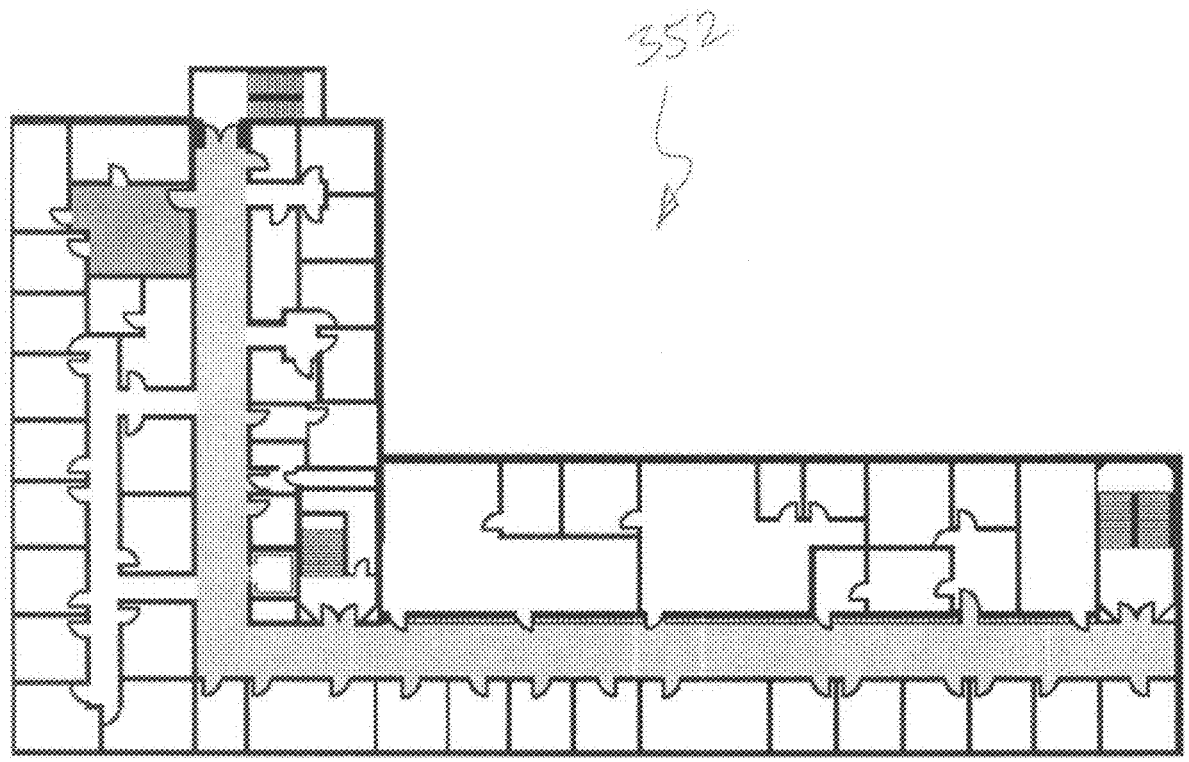
Figure 10:
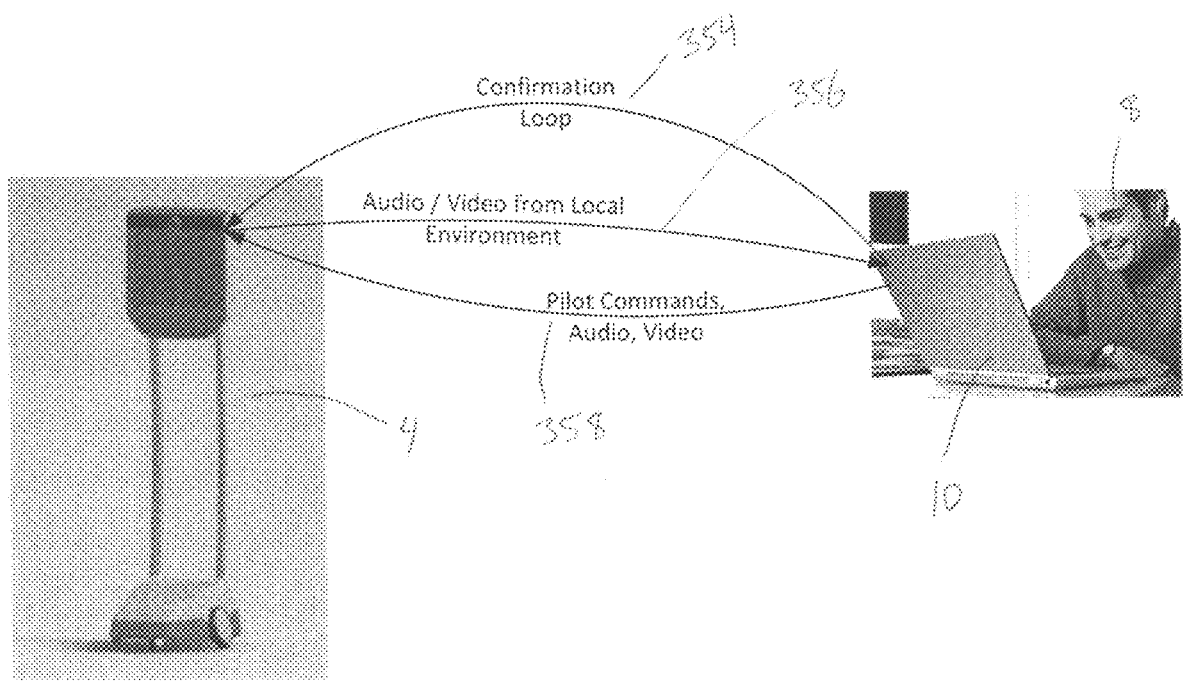
Figure 11:
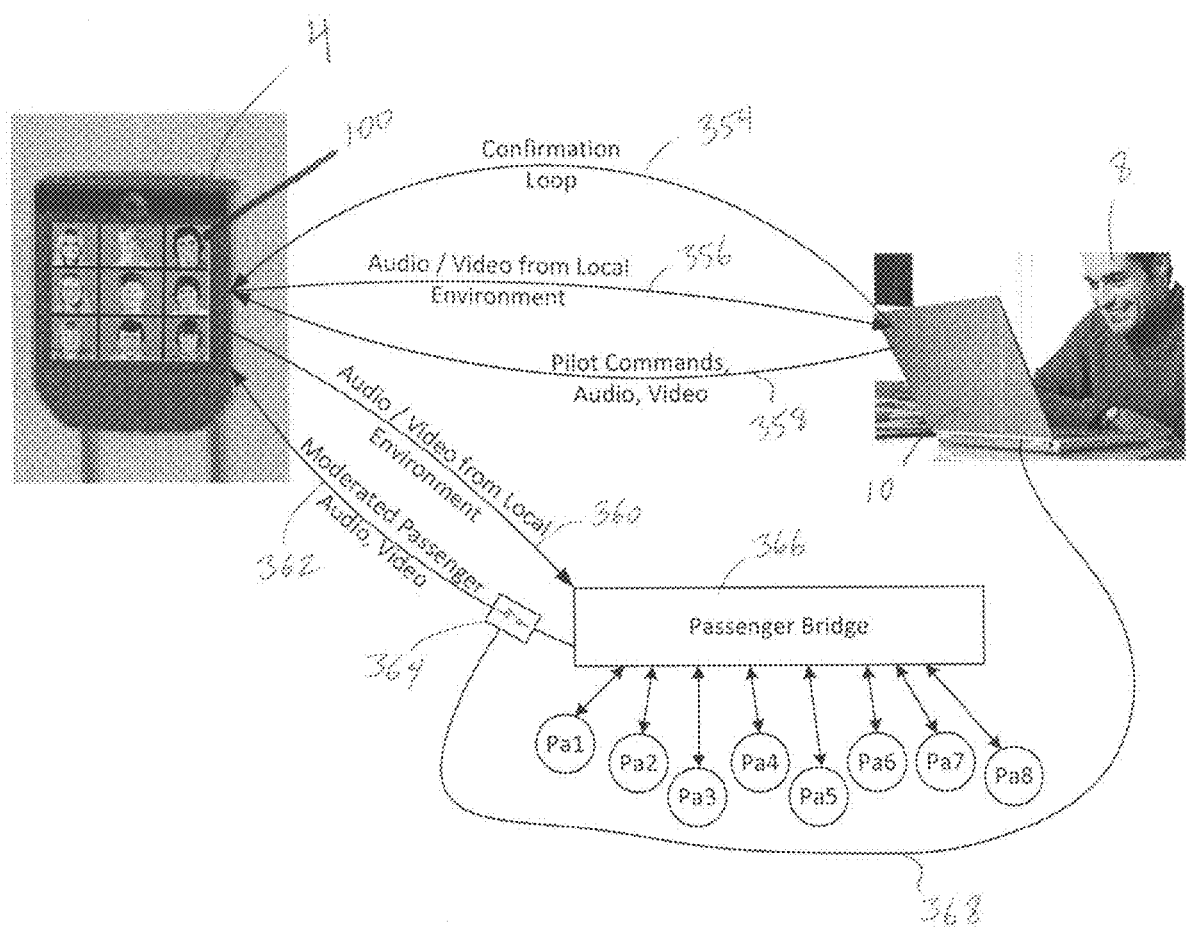

Referring to FIGS. 8A-8C, brushless hubmotors, such as those available from Suzhou Bafang Electric Motor Science-Technology Co., LTD of China, may be utilized in the differential drive system of the remote mobile workstation to provide quiet, inexpensive navigation actuation. Brushless motors typically have three phases (A, B, C), with coils (326, 328, 330) in between the phases and permanent magnets (318, 320, 322) in a ringlike configuration around the perimeter. The motor rotates (324) by changing the magnetic field in the coils and changing the direction of current (332, 334, 336). The motors preferably comprise three Hall effect sensors (338, 340, 342) that may be utilized to detect rotational orientation within about 60 degrees. 60 out of 360 degrees may be an acceptable factor of navigational precision with a wheel that is about 5 inches in diameter operating on a typical carpeted or hard floor surface, but to further smooth out driving (i.e., to avoid jerkiness and snakelike patterns where smooth and relatively straight or arcuate driving is preferred between two points), the 2 axis gyro and 3 axis accelerometer of the board in the mobile base may be utilized in the control loop. The gyro and accelerometer may be operated at approximately 2 kilohertz, to have high update rates for smoothing control features. One of the unique aspects of this relatively high-torque hub-motor drive system is that it does not feature high-precision optical encoders as may be typical in certain other electromechanical systems such as robots. Thus the blending of some motor position feedback from the Hall effector sensors, as well as general navigational dynamic feedback from the gyro and accelerometer, may be desirable in retaining a smoothness of driving, to the benefit of not only the remote pilot viewing the world of the locals through one or more camera mounted to the dynamic vehicle, but also to the locals who generally are sitting, walking, and standing around the remote mobile workstation in the remote location.

Referring to FIG. 8C, a motor shunting circuit (344, 346, 348, 350) may be configured to shunt the motors with one or more relays when the system power is lost, allowing for relatively low motor velocity to push the system out of the way, but not high velocities that could lead to a runaway system on a slope (due to the fact that a "short" or shunted circuit will allow substantially unlimited current to flow between the phase points out-of-phase, which results in a form of velocity-dependent electromagnetic braking: the permanent magnets moving past coils will produce currents that will become a rolling resistance means by producing torque; thus at relatively low velocity, low current will provide low electromechanical resistance; if a higher velocity is attempted, there will be more current and more electromechanical resistance; thus a remote mobile workstation left unpowered on a hill is likely to only slowly move downhill, if at all).

A motor control loop is featured in FIG. 8B. In one embodiment, the bottom layer of the control loop is torque based; at first the torque of the motor may be controlled, and this may be accomplished by controlling the current. Given the 3 phase motor configuration of the above described embodiment, that means that there are three control loops that control current through each of the three different phases/coils. Mathematically it sums up to approximately zero because they are all interconnected. The current that is actually put through the motor windings is measured, and this facilitates commanding the amount of torque that is demanded for the particular scenario. Once torque has been controlled, the position of the rotor is desirably controlled as well. In one embodiment, a super high precision understanding of rotational motor position is not required; the position can be used to commutate the motor using a fixed 60-degree control algorithm, which some would refer to as a "square wave controller", as opposed to a "sine wave controller". In such a configuration, the electrical phase is always being kept 60 degrees ahead of the position for peak torque and efficiency, and the velocity definitely is of interest, as a pilot of a particular remote mobile workstation typically may be trying to command the remote mobile workstation to "go here", "now go over there . . . fast"—so it is desirable to have a velocity controller that sits on top of the torque controller and commutation/square wave controller. The velocity controller may be configured to take the output of the motor's commutation (i.e., the above embodiment uses Hall effect sensors), do some conventional integration and measurement, and determine the angular velocity of the wheel. The operatively coupled 3-axis accelerometer may be utilized to measure actual rotational velocity of the remote mobile workstation as an overall dynamic structure. All of this information may be examined relative to what the pilot is commanding in the pilot software from the pilot workstation, and in the end, torque commands are created. Preferably the torque and velocity controllers are proportional-integral-derivative, or "PID", controllers. Some tuning of the algorithms may be useful in finding smoothness in particular states such as standing still with active motors in the aforementioned differential drive configuration. For example, if it is desirable to be able to accelerate from zero velocity up to a top speed of between 1 and 3 meters/second, it may be useful to have a lot of gain in the controller, but then such relatively high gains may result in detectable oscillation of the system (i.e., when it is oscillating due to bouncing by 60 degrees between two phases) as it is sitting in an attempted "still" position, which may be relatively undesirable. Thus in one embodiment, the controller may be configured to turn down the gains at lower velocities (a "dynamic gain profile" configuration). Given that the torque and velocity loops are PID loops, they may be made more or less reactive by changing the P, I, and/or D values, to, for example, turn down the torque to let the drive system be more relaxed. In one embodiment there may be a performance gain realized by adding a feed-forward term to the PID controller to allow for enhanced control of velocity and acceleration within prescribed ramp-up parameters when slowing down and accelerating the mobile workstation (4).

Referring back to the control loop of FIG. 8B, a commanded velocity (360) is input to a velocity controller (352), which outputs a commanded torque (362) to the current controller (354). The current controller (354) outputs current (364) to the motor (356) that is measured (366) in the upper loop. Speed (358) of the motor (356) is computed and fed back (368) to the velocity controller (352).

Using such a control loop, if the pilot is not commanding anything, then there is zero velocity command, and with zero velocity commanded, if a local were to push against the remote mobile workstation to get it to move out of the way, for example, it would actually push back against such person, because it would be trying to neutralize the velocity being physically put into the system; this may not be desirable if an objective is to allow locals to move the system manually. To address this issue, in one embodiment the velocity controller may be basically turned off—say after an externally-applied torque passes a given preset threshold amount, with fallback to doing torque control. If the threshold is set to zero torque, then an external load could push the remote mobile workstation around with little or no resistance. This would be the equivalent of turning off the controller and having zero current flowing through the motors—which may be nice for energy savings, but may not be good for a remote mobile workstation sitting on a sloped ramp, which could lose connectivity and start rolling/moving undesirably. The gyro and accelerometer may be used to mitigate such issues. For example, it is known that we have 1G of gravity pointing gravity down. Typically we have zero G forward with the remote mobile workstation sitting still on level ground. If the remote mobile workstation is on a 30 degree slope (very steep—unrealistic scenario for illustrative purposes) sitting still while it loses connectivity to a pilot, it will be sensing a forward acceleration from gravity alone of about ½ G. This may be fed back into the torque controller locally, and thus the current may be elevated to keep the remote mobile workstation from rolling downhill. Thus a predefined configuration may be created wherein acceleration is still read while the controller is attempting to hold the system still, and this acceleration may be fed back into the controller. So if connectivity is lost, the system may remain substantially in place, but if the ½ G threshold is exceeded (say, for example, a local wants to push the system out of the way while it is sitting still on the slope), the local can, indeed, push it out of the way—in a manner similar to pushing it to move it as if it were on level ground—and the local may let go of the system and it will controllably decelerate back down to zero again to hold its position.

In a "touch control" embodiment, the control system may be configured to only allow the system to go into freewheeling mode (i.e., wherein it may be easily pushed by a local) when a local depresses a particular hardware switch or software switch. In one embodiment, a capacitive or resistance switching configuration may allow the system to go into freewheeling mode only when the touch of a local on a particular portion of the system is detected, such as on a particular pull or push handle—and the system may be further configured to return to control mode and decelerate back to zero velocity once such "touch sensing" is no longer detected.

Figures 2, 2Z, 3, 4, 5, 6, 7, 8, 9:
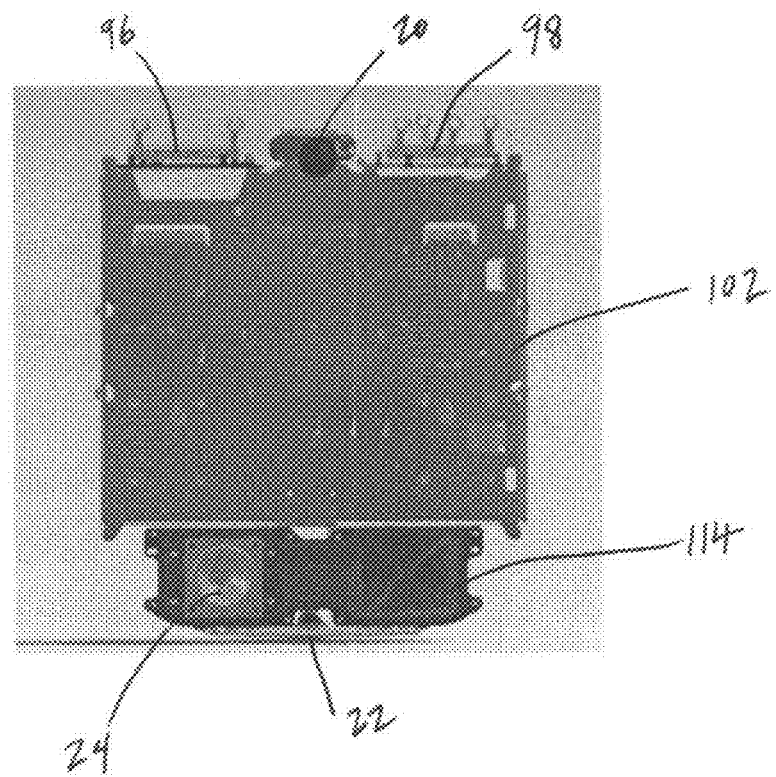
FIG. 9 illustrates a typical office environment map.

Referring to FIG. 9, a typical office scenario map is depicted—it may be mapped manually by a pilot operating a remote mobile workstation, or may be mapped by a mapping system configured autonomously explore and map. A remote mobile workstation or other system may use various techniques to gain an understanding of where it is relative to such map, such as by contacting nearby Bluetooth™ LE, Bluetooth™ 4.0, WiFi, infrared, or other beacons which may be placed at various locations and configured to transmit map coordinate information. A remote mobile workstation may also be configured to detect various wireless access points and associate predetermined locations with them, to triangulate based upon various wireless access point locations, similar to the manner in which cell tower triangulation may be utilized to localize a cellphone, but at a smaller and preferably more exacting scale. Various charging docks (2), each of which may be configured to have and broadcast a unique identification name or number, and each of which may be located at a known location, may serve as indoor localization beacons, with technologies such as Bluetooth ™ LE, nearfield communication, WiFi, or infrared data transmission to transmit and transceive with a local remote mobile workstation. In one embodiment, an autonomous system such as a mapping robot with laser scanning and other detecting sensing may be sent into an office environment such as that depicted in FIG. 9 to map such environment and provide such information to one or more remote mobile workstation systems configured to operate within such environment. Simultaneous localization and mapping, or "SLAM", techniques may be utilized in such mapping configurations.

In one embodiment, with multiple different WiFi adaptor radios and at least one cellular mobile adaptor, such as a 4G adaptor, operated within a head unit of a particular remote mobile workstation, loss of signal may be less likely. Further, known geometric differences in location of two or more adaptors physically coupled to the same remote mobile workstation may be utilized for time-of-flight based localization of the remote mobile workstation.

In one embodiment, one particular remote mobile workstation with relatively high levels of connectivity (such as multiple 4G mobile wireless connections, multiple WiFi adaptors at multiple frequencies with relatively high-exposure external antennae, etc) may be utilized to seek a remote mobile workstation that has become "stuck" due to loss of connectivity, and to function as a mobile wireless access point local to the stuck remote mobile workstation, such that pilot-based control of the stuck remote mobile workstation may be regained, and in one embodiment, so that the stuck remote mobile workstation may be navigated out of the local wireless networking "hole" and back into a location of good connectivity with infrastructure other than the local connectivity to the rescuing remote mobile workstation.

Figures 2, 2Z, 3, 4, 5, 6, 7, 8, 9, 10:
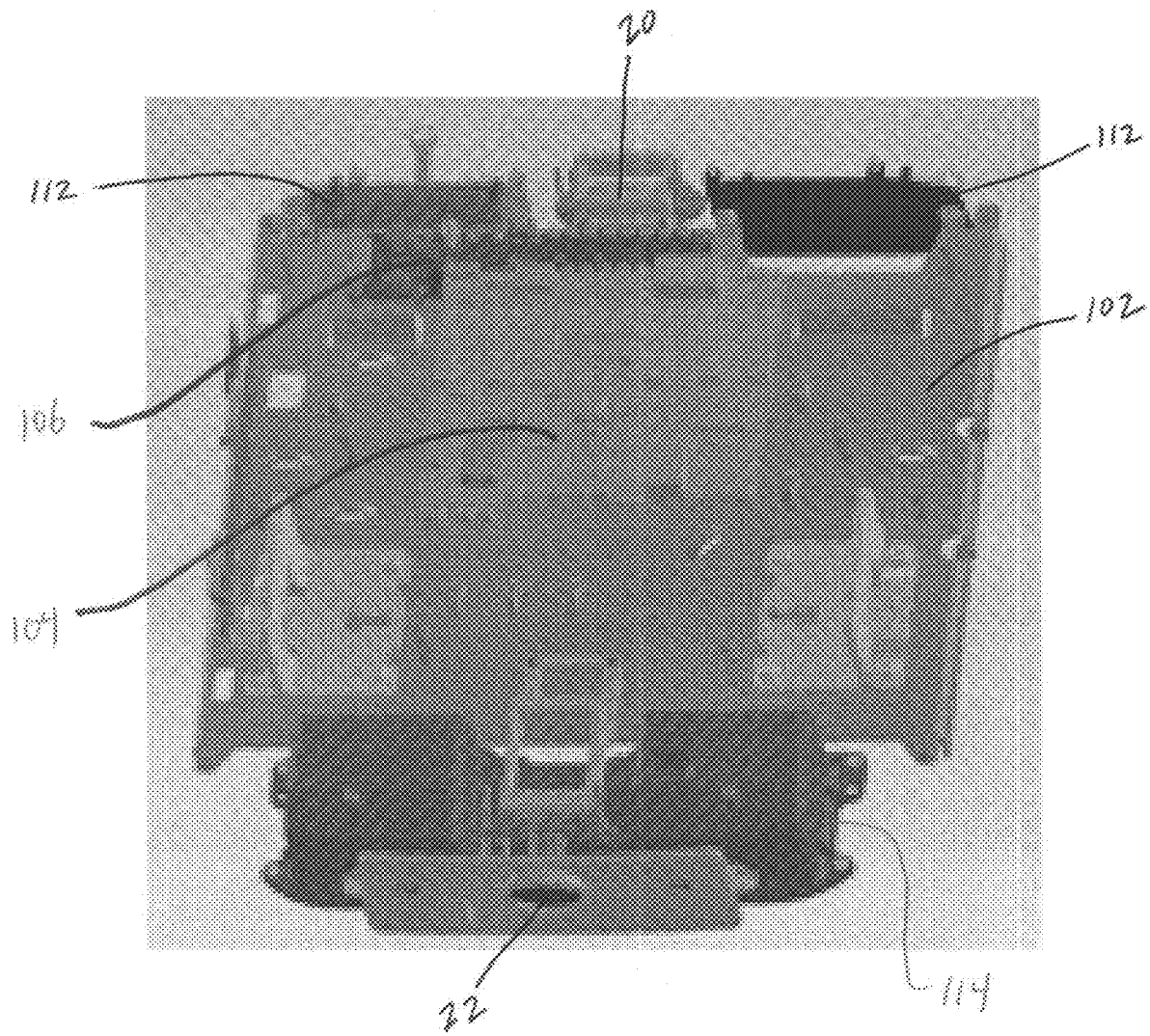
FIG. 10 illustrates one embodiment of a connectivity configuration between a remote mobile workstation and a pilot workstation in accordance with the present invention.

Referring to FIG. 10, a peer to peer network is set up between the pilot and the remote mobile workstation after lobby authentication, and audio and video from the local environment may be passed back to the pilot system using a customized implementation of VP8 (356) which may be described as a configuration that is related to VP8, but that goes significantly beyond VP8 (indeed, some of the configurations described below are not compatible with VP8). Similarly, pilot commands and audio/video from the pilot are passed back (358) to the remote mobile workstation (4). A confirmation loop (354) confirms what is being received at the pilot station (10), and provides related input to the outgoing packet stream formation directed toward the pilot workstation. Each frame has a timing tag that may be utilized to ensure that "stale" or outdated commands are not obeyed at the remote mobile workstation.

In further detail, in one embodiment, initially a pilot goes through a lobby to be authenticated, as described above. If successfully past the lobby and a particular remote mobile workstation is selected by a particular pilot, a peer to peer channel is opened using a protocol such as Jingle, which is a well-known extension to the extensible messaging and presence protocol ("XMPP"). Once a peer to peer (or "p2p") channel is open between a remote mobile workstation and a pilot workstation, video and audio may flow back and forth between the remote mobile workstation and the pilot workstation using a video/audio compression format such as VP8, which is publicly available from Google, Inc. VP8 generally is relatively open-loop, so the confirmation loop (354) may be established to understand, back at the remote mobile workstation, which frames have been received by the pilot's computing station, and which frames have not been received. In one embodiment, we can control at the remote mobile workstation how we encode the frames back at the pilot workstation, based upon what is actually being received at the pilot workstation. VP8 has standard compression configurations and keeps one or two frames in the buffer/cache that can be utilized for further processing, but in one embodiment, that is inadequate. For example, in one embodiment, video transmission is started with an all-gray colored image (in between white and black for each pixel); the the first image may be built completely from imported data, which is relatively "expensive" in terms of processing and time. Subsequent to this initial build, the system preferably is configured to only bring in changes or "delta" to the subsequent frames thereafter. In one embodiment, video transmission between the pilot workstation and remote mobile workstation is at about 30 frames per second, which is a lot of data moving back and forth. In one embodiment, a frames going back to about 10 seconds back are stored so that intermediary frames may be essentially created by averaging, interpolating, and the like. For example, in one embodiment, the system is configured to save frames 2, 4, 8, 16, 32, 64, 128, and 256 back from the current frame at issue, this being a relatively efficient way to provide data back about 10 seconds in a 30 frames per second environment. If there is a problem with a current frame, rather than just dropping the connectivity between pilot and remote mobile workstation, the system may be configured to first go back into the memory and search for a pertinent nearby frame to present. If such frame is not available, the system may be configured to return to the all gray frame and rebuild forward form there, or interpolate or average between known good frames stored in memory. In one embodiment, when frames are sent using VP8, each is assigned a time stamp or time tag. At the receiving location (such as the pilot workstation), that tag gets transferred to the outgoing command tags to enable the remote mobile workstation to see not only the commands, but also what time stamp the commands are based upon—which enables a control paradigm wherein the more "stale" or old a command is (as determined by the time stamp or tag), the less it is to be obeyed at the remote mobile workstation. So the system may be configured to avoid control by outdated commands, and a monitoring or confirmation loop (354) is in place to report back to the remote mobile workstation how the frame receiving is going at the pilot workstation—if this receiving is not going well, preferably the system is configured to have mitigating measures in place to avoid simply terminating the session between the pilot and remote mobile workstation.

For example, the confirmation loop (354) may tell the remote mobile workstation (4) that the pilot workstation did receive frames 4 and 6, but missed frame 5. In such case, the system may be configured to create a substitute frame at the space that was to be occupied by the missing frame 5 (by interpolation, averaging, motion vector analysis, etc; for example: in one embodiment the system may be configured to take the received frame 4 and add part of the calculated motion vector between frames 4 and 6). The substitute frame may not be perfect, but it may be desirable relative to having a pause or gap between frames, which may disrupt the flow of communication between a connected pilot and locals. The substitute frame may be called 5' or "5 prime" so that it is labeled as a non-actual frame that was created to fill a gap. In one embodiment, the fact that the pilot computing system software just created a "prime" in the frame 5 slot will be reported back in the confirmation loop (354) to the remote mobile workstation (4). If the pilot workstation does not receive frames 6, 7, or 8 either, the pilot workstation will be pretty far out into potential inaccuracy in terms of creating primes for those spots—and at some point may be configured to decide that it is guessing too much (say at the position of frame 9), and may be configured to just return to a re-presentation of a somewhat stale frame 4, the last real frame in possession of the pilot workstation. In one embodiment, if frame 5 did not show up as expected, and so a 6 prime and 7 prime are created and presented, and then later the actual frame 5 shows up at the pilot workstation, the system may be configured to catch up as fast as possible to reality (for example, it may be configured to calculate the vectors and compute an actual frame 6 and actual frame 7, and hope to have those in time to present actual frame 8 instead of a manufactured 8-prime. In one embodiment a "relay server" may be implemented to rapidly send lost packets for catch up.

In another embodiment, rather than creating a "prime" frame based upon only one or two previous real frames, multiple frames could be referenced to identify trends in the movement of aspects of the various images, etc., subject to processing and timing constraints.

In one embodiment wherein the implementation is related to VP8, VP8 features may be utilized dictate how to encode motion vectors, but not how to determine them. In one embodiment, a technique called "Optical Flow" (http://en.wikipedia.org/wiki/Optical_flow) is implemented along with VP8, which enables an efficient form of image to image correlation, finding the iterative position of various portions of a frame which leads to determination of the delta or change between two frames. In other words, to determine where something moved to from frame to frame, it is useful to find out where the item is located from one frame to the next. An iterative pattern analyzing subportions of an image (say a 16×16 pixel portion for grayscale or 8×8 pixel portion for color) using slight jog up, down, left, right, and dead center may be utilized to determine where the subportion of the original frame went in the next subsequent frame. Once this has been determined, the motion vector may be determined.

In one embodiment, to save processing time, a "pyramid" style analysis may be conducted wherein the original image is downsampled into sequentially smaller/lower-resolution images. For example, if the original frame is 640×480 pixels, the system may be configured to make a "pyramid" stack of images that get sequentially lower resolution: 320×240, 160×120, 80×60; and initially start doing motion vector analysis on the smallest resolution image in each stack of each "pyramid"—to get a rough estimate fast about the motion vector. Once the system has the answer from the lowest resolution image, this result may be utilzed as a first guess to address analysis of the next larger image. As it turns out, such a configuration saves the system lot of the iteration steps (because in each small iterative process, the system starts with a guess—and it's preferable/faster to be able to start with an "educated" guess from the previous round of resolution, which may be computed relatively rapidly). VP8 may require encoding with the highest resolution image in each stack (generally it requires a motion vector that is pertinent to the actual resolution of fixed size blocks of the actual image at issue, such as 16×16 pixels for grayscale).

In one embodiment, image processing may be utilized to recognize the eyes of an imaged face in various frames, and whenever a "prime" frame is being fabricated to address a gap in received frames, an open-eye view may be selected over a closed-eye view, to prevent the receiving party from interpreting from the presented stream of images that the person is blinking in a way that may be distracting to the receiving party.

Video resolution and frame rate for various devices, such as the pilot camera, remote mobile workstation main camera, remote mobile workstation downward-facing navigation camera, and other devices, such as a possible remote mobile workstation-based projector, may be optimized to allow prioritization of bandwidth to a particular function. For example, if a pilot is presenting slides using a projector operatively coupled to a remote mobile workstation, and if the remote mobile workstation is stationary and there is no desire to move it during the presentation, frame rate and/or resolution of the navigation camera on the remote mobile workstation may be decreased or made near zero.

Figures 2, 2Z, 3, 4, 5, 6, 7, 8, 9, 10, 11:
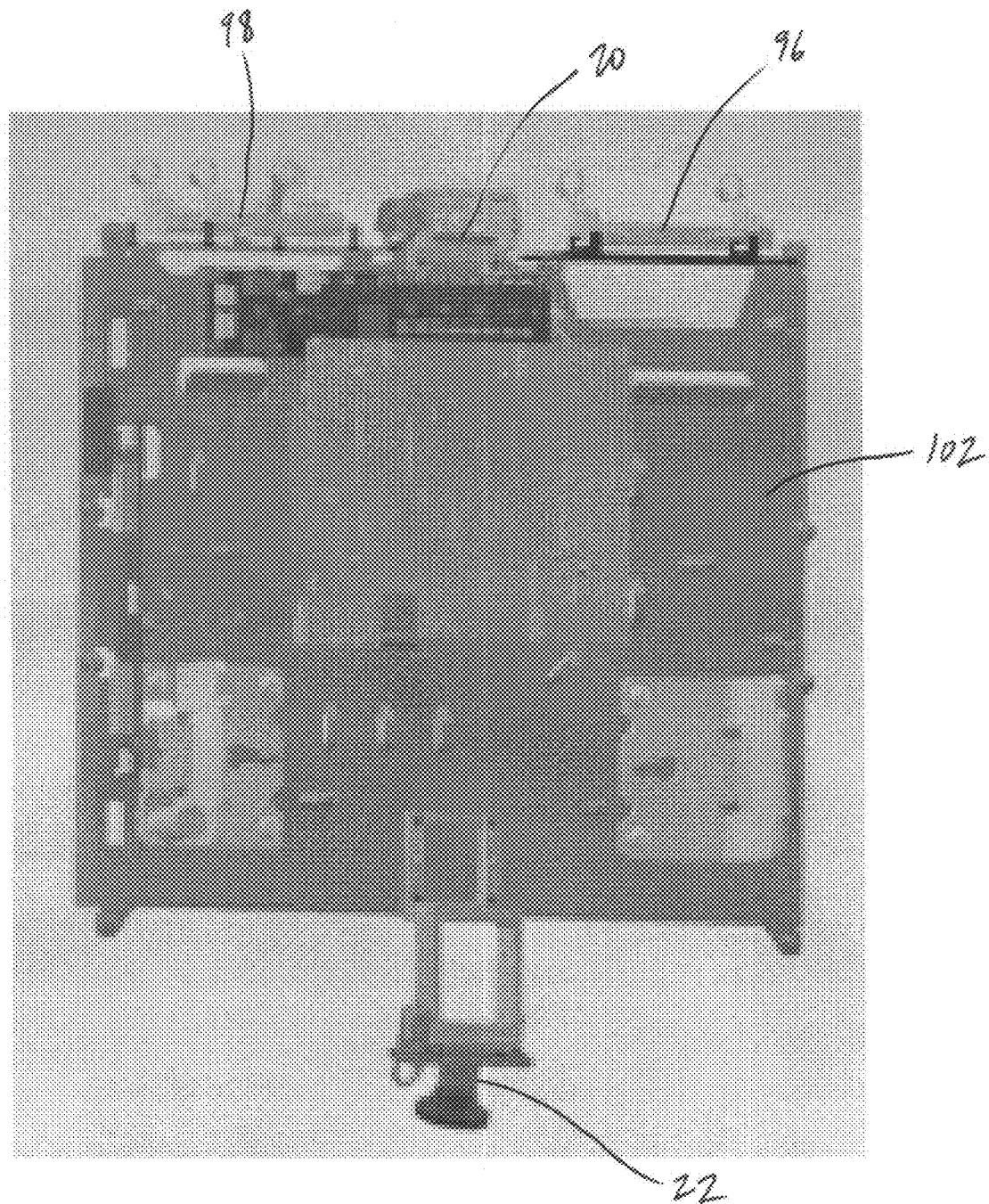
FIG. 11 illustrates one embodiment of a connectivity configuration between a remote mobile workstation, a pilot workstation, and a passenger bridge in accordance with the present invention.
Figures 2, 2Z, 3, 4, 5, 6, 7, 8, 9, 10, 11, 12:
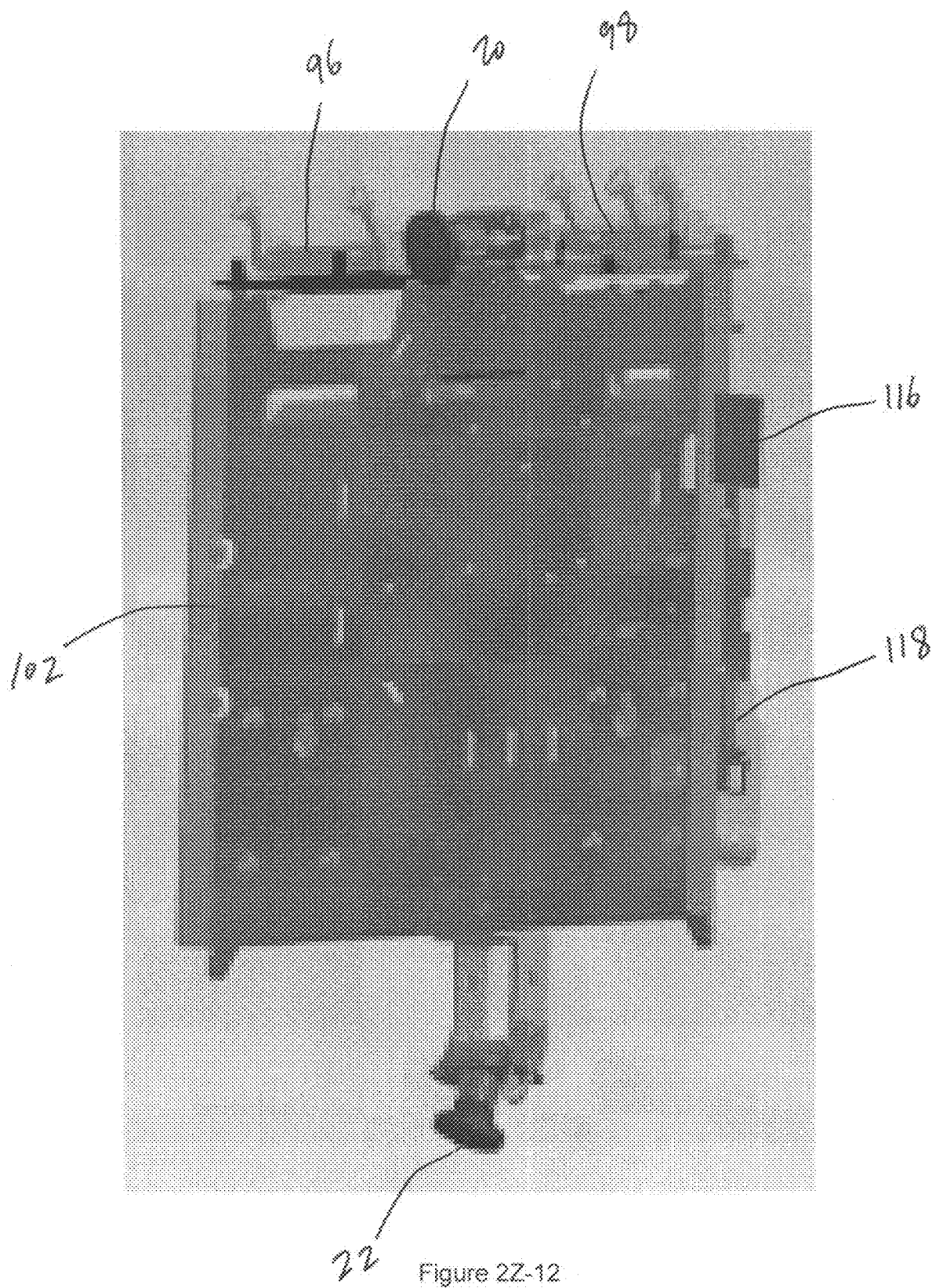

Referring to FIG. 11, a passenger bridge (366) may be added to facilitate other remotely located persons in observing and participating in a discussion. Bridges are available from suppliers such as www.bluejeans.com, to enable passengers to utilize various video conferencing systems, such as those available from PolyCom, Inc., Cisco Systems, Inc., and others, to join a conference. One pilot workstation (10) equipped with software specifically configured to interact with a remote mobile workstation must be available for the pilot (8), and in a typical bridge configuration, the "passengers" will be "along for the ride" from an audio and video perspective due to the connectivity through the bridge, but will not be in control of the remote mobile workstation without the pilot-side software configuration.

Many specific embodiments may be assembled to address particular needs using various aspects of the aforementioned embodiments. For example, in one embodiment, a remote mobile workstation may be integrated with local building security to allow motion sensors on an alarm system within the vicinity of an operating remote mobile workstation to be temporarily disabled (i.e., to not set of the building alarm while the remote mobile workstation is navigating about indoors as allowed by login authentication and privileges), based upon the location of the remote mobile workstation as determined by mapping and/or localization features of the system, such as those described above. In another embodiment, control features of the physical environment of the remote mobile workstation (4), such as elevator buttons, light switches, and door opener actuation buttons may be integrated with the controls paradigm of the pilot workstation through network connectivity configuration such that the pilot may operate such functions of the remote environment as he navigates around such environment with the remote mobile workstation (4). In another embodiment, a system with features such as those described in reference to FIG. 7D may be used for point of sale commerce (to avoid ever having to wait in a checkout line, a person may simply accompany or meet up with such a system). In another embodiment, pertinent advice from an expert (for example, an expert plumber may assist a customer with merchandise questions in a hardware store) may be delivered in-store by a remote pilot with such a configuration. In another embodiment, firefighters may be allowed to check out a building using smoke detectors, carbon monoxide detectors, video, audio, and the like, from a location remote to a particular building that may be under fire alarm. In one embodiment, certain authorities or personnel may be given circumstantial access to one or more (or all) remote mobile workstations (4) in a particular building or environment. For example, in the event of a fire or burglar alarm, local fire and/or police authorities may be given instant access to all operational mobile workstations (4) at the location of the sounding alarm so that certain fire and/or law enforcement personnel may inspect the area through pilot workstations as other members of their staff get in vehicles and approach more conventionally.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices and/or systems. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The invention claimed is:

1. A remote presence system, comprising:
   a remote mobile workstation comprising a controller and a drive system; and
   a pilot workstation operatively coupled to the remote mobile workstation in a peer-to-peer network configuration, the pilot workstation comprising a first input device and a second input device, such that navigation commands configured to be input from a pilot operating on the first input device and the second input device are communicated to the remote mobile workstation and utilized to provide navigation control of the drive system by the controller;
   wherein the controller of the remote mobile workstation is configured to
      switch from a first state of navigation control of the drive system, wherein the first state of navigation control is based upon receiving, at a first time, a first navigation command generated by and communicated from the first input device of the pilot workstation at the remote mobile workstation, to a second state of navigation control of the drive system, wherein switching to the second state of navigation control is based upon an operation failure of the first input device during the first state of navigation control of the drive system, and receiving, at a second time later than the first time, a second navigation command generated by and communicated from the second input device of the pilot workstation at the remote mobile workstation, and
      upon switching to the second state of navigation control, disregard any subsequent navigation commands at the remote mobile workstation received after the second time communicated from the first input device of the pilot workstation having the operational failure.

2. The remote presence system of claim 1, wherein the controller of the remote mobile workstation is configured to require a third live-man input device to be activated by the user at the pilot workstation at a same time as the navigation commands input from the first input device and the second input device in order for the navigation commands to be interpreted as drive commands to the drive system of the remote mobile workstation.

* * * * *